(12) United States Patent
Schellenberg et al.

(10) Patent No.: US 7,687,554 B2
(45) Date of Patent: Mar. 30, 2010

(54) WATER BASED CONCENTRATED PRODUCT FORMS OF LIGHT STABILIZERS MADE BY A HETEROPHASE POLYMERIZATION TECHNIQUE

(75) Inventors: Carsten Schellenberg, Freiburg (DE); Clemens Auschra, Freiburg (DE); Wolfgang Peter, Neuenburg am Rhein (DE); Delphine Kimpel, Mulhouse (FR); Pascal Hayoz, Hofstetten (CH)

(73) Assignee: Ciba Specialty Chemicals Corporation, Tarrytown, NY (US)

( * ) Notice: Subject to any disclaimer, the term of this patent is extended or adjusted under 35 U.S.C. 154(b) by 0 days.

(21) Appl. No.: 10/570,736

(22) PCT Filed: Sep. 1, 2004

(86) PCT No.: PCT/EP2004/051980
§ 371 (c)(1),
(2), (4) Date: Mar. 7, 2006

(87) PCT Pub. No.: WO2005/023878
PCT Pub. Date: Mar. 17, 2005

(65) Prior Publication Data
US 2006/0287416 A1    Dec. 21, 2006

(30) Foreign Application Priority Data
Sep. 11, 2003  (EP) ................... 03103348

(51) Int. Cl.
*C08K 5/34*  (2006.01)
(52) U.S. Cl. .................. 523/223; 523/351; 524/100; 524/720

(58) Field of Classification Search ............ 524/100, 524/720; 523/223, 351
See application file for complete search history.

(56) References Cited

U.S. PATENT DOCUMENTS

| | | | |
|---|---|---|---|
| 5,476,882 A | 12/1995 | Berner et al. | 523/223 |
| 6,214,929 B1 | 4/2001 | Haremza et al. | 524/849 |
| 6,531,117 B2 | 3/2003 | Heger et al. | 424/59 |
| 2002/0045681 A1* | 4/2002 | Weier et al. | 523/201 |
| 2002/0131941 A1 | 9/2002 | Habeck et al. | 424/401 |
| 2004/0072941 A1 | 4/2004 | Nickolaus et al. | 524/507 |

FOREIGN PATENT DOCUMENTS

| | | |
|---|---|---|
| EP | 0 226 538 | 6/1987 |
| EP | 0 942 037 | 9/1999 |
| EP | 1 191 041 | 3/2002 |
| WO | 01/54809 | 8/2001 |
| WO | 02/064692 | 8/2002 |

* cited by examiner

*Primary Examiner*—Peter D Mulcahy
(74) *Attorney, Agent, or Firm*—Joseph C. Suhadolnik

(57) ABSTRACT

The instant invention pertains to a concentrated aqueous dispersion of organic light stabilizers with a particle size of less than 1000 nm, prepared by heterophase radical polymerization of ethylenically unsaturated monomers in the presence of the light stabilizers, wherein the weight ratio of light stabilizer to polymeric carrier is greater than 50/100. Another aspect of the invention is a process for the preparation of such aqueous dispersions with high light stabilizer content. Aqueous dispersions prepared according to this process are useful ingredients for adhesives, aqueous emulsions of natural or synthetic rubbers, water based inks or a water based coating compositions, which are consequently also subjects of the invention.

21 Claims, No Drawings

WATER BASED CONCENTRATED PRODUCT FORMS OF LIGHT STABILIZERS MADE BY A HETEROPHASE POLYMERIZATION TECHNIQUE

The instant invention pertains to a concentrated aqueous polymer dispersion with a particle size of less than 1000 nm containing organic light stabilizers, prepared by heterophase radical polymerization of ethylenically unsaturated monomers in the presence of the light stabilizers, wherein the weight ratio of light stabilizer to polymeric carrier is greater than 50 parts light stabilizer per 100 parts polymer carrier. Another aspect of the invention is a process for the preparation of such aqueous dispersions with high light stabilizer content. Aqueous dispersions prepared according to this process are useful ingredients for adhesives, aqueous emulsions of natural or synthetic rubbers, water based inks or water based coating compositions, which are consequently also subjects of the invention.

Non-polar light stabilizers like organic UV-absorbers (UVA) or sterically hindered amines (HALS) are well known additives and frequently used to protect coatings from degradation, especially with respect to outdoor weathering. Paints or coatings for demanding applications typically contain up to 5% by weight of organic light stabilizers, based on total binder solids. But unlike in solvent-based coatings, in modern water based coatings, many of the well-established non-polar light stabilizers are difficult to incorporate due to insolubility and/or incompatibility with the aqueous coating or paint formulations. Depending on the type of coating or paint formulation and the type of light stabilizers, it can be impossible to generate a stable uniform mixture. In other cases it may occur that the initial homogeneous formulations show instability upon storage leading to separation of the light stabilizers and/or other components. Therefore, typical undesired phenomena, such as floating, sedimentation, serum formation, gelation, etc may occur. Such phenomena caused by the incompatibility of the light stabilizers are detrimental, for example, for a coatings performance. Accordingly several attempts have been made to overcome the incompatibility problems mentioned above.

Non-polar light stabilizers, such as UV-absorbers, have been chemically modified with polar groups in order to enhance water solubility/compatibility and to provide the light stabilizers molecules with self-emulsifying properties in water. This approach has the disadvantage that the chemical modification is usually complex, rather expensive, and the surfactant-like behavior of polar modified light stabilizers can cause environmental problems as well as a lower performance due to washing out of the light stabilizers under humid conditions and outdoor weathering.

Attempts have also been made to incorporate the light stabilizers already into the binder polymers at the stage of manufacture of the binder polymer, in order to achieve a uniform distribution of the light stabilizers already in the binder raw material. However, this approach is very inflexible, because it requires that the light stabilizers do not interfere with any process stage during the manufacture of the binder polymer. The target amount of light stabilizer is already fixed with the binder polymer and no degree of freedom is left to adjust or enhance the light stabilizer level during or after formulation of the paint. To cover a broader range of coating formulations with different binders and various types and/or amounts of light stabilizers, an extended stock of light stabilizer-modified binder resins would be necessary. This is usually very impractical for a paint producer.

Non-polar light stabilizers can be formulated to concentrated stable aqueous emulsions or dispersion by the use of relatively high amounts of emulsifiers or surfactants, typically with more than 10-20% emulsifier or surfactant relative to active UVA. Such concentrated light stabilizer emulsions or dispersions can be used in different aqueous formulations, but the relative high amount of surfactants can impair water sensitivity or lack of adhesion to the substrate of the final coating.

EP 0 942 037 discloses polymer dispersions containing a polymer phase into which a polymer stabilizer is incorporated. Incorporation of the stabilizer is carried out by swelling the final aqueous polymer dispersion with an organic solvent in which the stabilizer has been dissolved. A polymerization step in presence of the light stabilizer is not involved. The approach is limited to certain light stabilizer/polymer combinations because not every light stabilizer penetrates easily into a more or less swollen polymer.

Recently EP 1 191 041 disclosed aqueous polymer dispersions, which have been prepared by radical miniemulsion polymerization of an ethylenically unsaturated monomer in which a dye, UV-absorber or optical brightener is dissolved. The polymerization is carried out in the presence of a non-ionic, surface active compound and an amphiphilic polymer. The amount of dye, UV-absorber or optical brightener ranges from 0.5 to 50% by weight based on the weight of the final polymer matrix. The aqueous dispersions are useful as ingredients for cosmetic applications.

As mentioned above, the polymer dispersions disclosed in EP 1 191 041 provide the desired additive in a concentration of 0.5 to 50% by weight, based on the polymer matrix. In other words the polymer, which does not contribute to the desired effect, is present in a by far higher amount than the additive. Exemplified are less than 20% UV-absorber based on the monomer weight. Although this may be acceptable for cosmetic formulations, the requirements for coatings, inks and plastic applications are different.

For instance the concentration of light stabilizer in the polymer matrix, which serves as a carrier, should be as high as possible in order to add as little as possible of undesired material, which can adversely affect weathering properties, to the coating, ink or plastic composition.

It has now been found that concentrated aqueous polymer dispersions with a particle size of less than 1000 nm can be prepared by heterophase radical polymerization of ethylenically unsaturated monomers in the presence of light stabilizers, wherein the weight ratio between light stabilizer and polymer carrier is greater than 50 parts of light stabilizer to 100 parts of the polymer carrier.

One aspect of the invention is a concentrated aqueous polymer dispersion with an average particle size of less than 1000 nm comprising
  a) a polymer carrier prepared by heterophase radical polymerization of at least one ethylenically unsaturated monomer in the presence of
  b) a non-polar organic light stabilizer wherein the weight ratio of non-polar organic light stabilizer to polymer carrier is greater than 50 parts of light stabilizer per 100 parts of polymer carrier.

Optionally a non-ionic, cationic or anionic surfactant, preferably a non-ionic or cationic one may be added.

Preferably more than one ethylenically unsaturated monomer is used. When the polymerization is carried out with two or more monomers, at least one may carry two unsaturated functionalities in order to provide a certain degree of crosslinking. For example the amount of the difunctional monomer may vary from 0.5 to 20% by weight based on the total weight of the monomer mixture.

Preferred is a concentrated aqueous polymer dispersion wherein the weight ratio of non-polar organic light stabilizer to polymer carrier is equal or greater than 80 parts per 100 parts, more preferred greater 100 parts per 100 parts and most preferred greater 120 parts per 100 parts.

In a specific embodiment of the invention, the weight ratio of light stabilizer to polymer carrier is from 120 parts of the light stabilizer per 100 parts of polymer carrier to 200 parts of the light stabilizer to 100 parts of polymer carrier.

Preferably the average particle size is less than 500 nm, more preferably less than 250 nm.

Droplet (oil/water emulsion) as well as particle (polymer dispersion) size can be measured by using dynamic light scattering (DLS) technique (also known as photon correlation spectroscopy (PSC) or quasi-elastic light scattering (QELS)). For this kind of measurement a NICOMP particle sizer (NICOMP Model 380, Particle Sizing System, Santa Barbara, Calif., USA) with a fixed scattering angle of 90° can be used for example. The measurement leads to the mean diameter $D_{INT}$ (intensity weighted).

The total solids content of the concentrated aqueous polymer dispersion is for example more than 20%, for instance more than 30% and preferably more than 40% by weight based on the total weight of the aqueous dispersion. In a particularly preferred embodiment the total solids content is more than 50% by weight based on the total weight of the aqueous dispersion.

For example the non-polar organic light stabilizer is selected from the group consisting of a hydroxyphenyl benzotriazol UV-absorber, a hydroxyphenyl triazine UV-absorber, a hydroxybenzophenone UV-absorber, an oxalic anilide UV-absorber and a sterically hindered amine light stabilizer or mixtures thereof.

In a preferred embodiment the non-polar organic light stabilizer has a water solubility of less than 1% preferably less than 0.1% and most preferably of less than 0.01% by weight at room temperature and atmospheric pressure.

The right balance between solubility in water and solubility in the monomer droplets influences strongly the polymerization result. Therefore the polarity of the non-polar organic light stabilizer can also be expressed in terms of log p.

The partition coefficient log p (octanol/water) is a widely used parameter for example in rating the environmental impact of chemical compounds. Its calculation is described by W. M. Meylan, P. H. Howard in J. Pharmaceutical Sciences 84, (1995), 83-92.

In the context of the present invention the non-polar organic light stabilizer has preferably a log p value of more than log p=2.

For example the ethylenically unsaturated monomer is selected from the group consisting of styrene, substituted styrene, conjugated dienes, acrolein, vinyl acetate, vinylpyrolidone, vinylimidazole, maleic anhydride, (alkyl)acrylic acidanhydrides, (alkyl)acrylic acid salts, (alkyl)acrylic esters, (alkyl)acrylonitriles, (alkyl)acrylamides, vinyl halides or vinylidene halides.

For instance the ethylenically unsaturated monomer is a compound of formula $CH_2=C(R_a)-(C=Z)-R_b$, wherein Z is O or S; $R_a$ is hydrogen or $C_1$-$C_4$alkyl, $R_b$ is $NH_2$, $O^-(Me^+)$, glycidyl, unsubstituted $C_1$-$C_{18}$alkoxy, $C_2$-$C_{100}$alkoxy interrupted by at least one N and/or O atom, or hydroxy-substituted $C_1$-$C_{18}$alkoxy, unsubstituted $C_1$-$C_{18}$alkylamino, di($C_1$-$C_{18}$alkyl)amino, hydroxy-substituted $C_1$-$C_{18}$alkylamino or hydroxy-substituted di($C_1$-$C_{18}$alkyl)amino, $-O-CH_2-CH_2-N(CH_3)_2$ or $-O-CH_2-CH_2N^+H(CH_3)_2An^-$;

$An^-$ is a anion of a monovalent organic or inorganic acid;

Me is a monovalent metal atom or the ammonium ion.

Examples for specific ethylenically unsaturated monomers are styrene, isobutylmethacrylate, cyclohexylmethacrylate, hydroxyethylmethacrylate, methylmethacrylate, benzylmethacrylate, vinyl toluene, n-butylacrylate, tert-butylacrylate, methylacrylate, ethylacrylate, propylacrylate, hexylacrylate or hydroxyethylacrylate.

A particular suitable monomer mixture is a mixture of hydroxyethylmethacrylate, methylmethacrylate, cyclohexylmethacrylate, vinyl toluene, methylmethacrylate, isobutylmethacrylate.

Examples of acids from which the anion $An^-$ is derived are $C_1$-$C_{12}$carboxylic acids, organic sulfonic acids such as $CF_3SO_3H$ or $CH_3SO_3H$, mineralic acids such as HCl, HBr or HI, oxo acids such as $HClO_4$ or complex acids such as $HPF_6$ or $HBF_4$.

Examples for $R_a$ as $C_2$-$C_{100}$alkoxy interrupted by at least one O atom are of formula

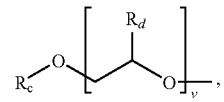

wherein $R_c$ is $C_1$-$C_{25}$alkyl, phenyl or phenyl substituted by $C_1$-$C_{18}$alkyl, $R_d$ is hydrogen or methyl and v is a number from 1 to 50. These monomers are for example derived from non ionic surfactants by acrylation of the corresponding alkoxylated alcohols or phenols. The repeating units may be derived from ethylene oxide, propylene oxide or mixtures of both.

Further examples of suitable acrylate or methacrylate monomers are given below.

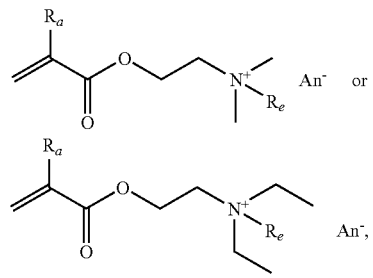

wherein $An^-$ and $R_a$ have the meaning as defined above and $R_e$ is methyl or benzyl. $An^-$ is preferably $Cl^-$, $Br^-$ or $^-O_3S-CH_3$.

Further acrylate monomers are

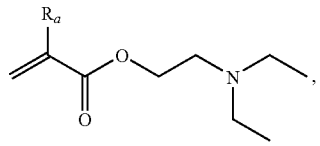

-continued

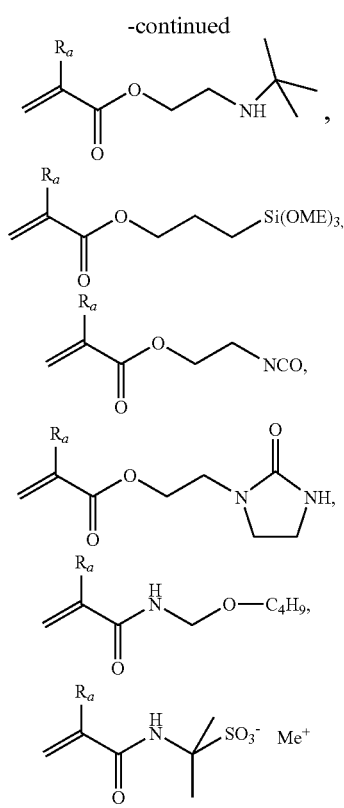

Examples for suitable monomers other than acrylates are

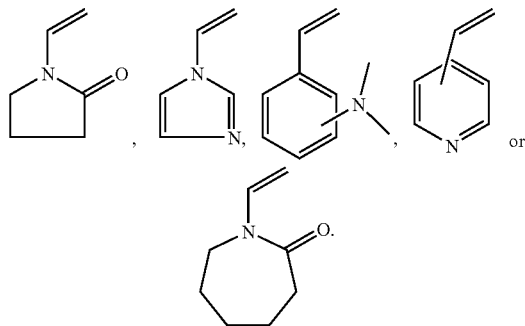

Preferably $R_a$ is hydrogen or methyl, $R_b$ is $NH_2$, glycidyl, unsubstituted or with hydroxy substituted $C_1$-$C_4$alkoxy, unsubstituted $C_1$-$C_4$alkylamino, di($C_1$-$C_4$alkyl)amino, hydroxy-substituted $C_1$-$C_4$alkylamino or hydroxy-substituted di($C_1$-$C_4$alkyl)amino; and Z is oxygen.

Acrylic acid esters and methacrylic acid esters are typically $C_1$-$C_{18}$alkyl esters.

Preferred is a concentrated aqueous polymer dispersion wherein the ethylenically unsaturated monomer is selected from the group consisting of $C_1$-$C_{18}$acrylates, $C_1$-$C_{18}$methacrylates, acrylic acid, (meth)acrylic acid, styrene, vinyltoluene, hydroxy-functional acrylates or (meth)acrylates, acrylates or (meth)acrylates derived from alkoxylated alcohols and multifunctional acrylates or (meth)acrylates or mixtures thereof.

Particularly useful methacrylates are iso-butylmethacrylate, cyclohexylmethacrylate.

In a specific embodiment the concentrated aqueous polymer dispersion is prepared from a mixture of at least two of the above monomers and at least one monomer which is bifunctional, so that a crosslinked polymer is obtained. The amount of bifunctional monomer is for example from 0.5 to 20 weight-%, based on the weight of the sum of monomers.

Typical examples for bifunctional monomers are divinylbenzene, ethyleneglycol diacrylate, butyleneglycol diacrylate or diethyleneglycol diacrylate.

The monomers or monomer mixtures have preferably a low water solubility, which is below 5%, more preferred below 0.5% and most preferred below 0.1% by weight.

Preferably in the concentrated aqueous polymer dispersion the hydroxybenzophenone is of formula I

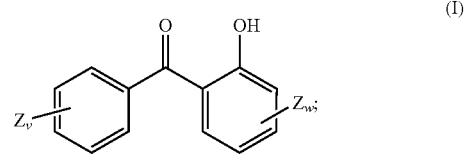

the 2-hydroxyphenylbenzotriazole is of formula IIa, IIb or IIc

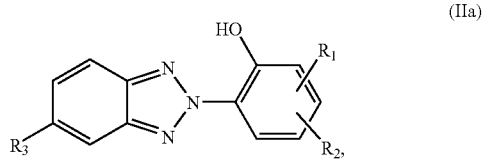

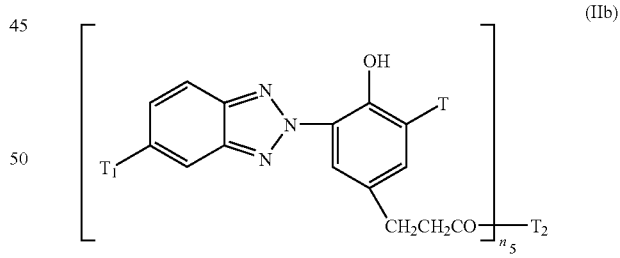

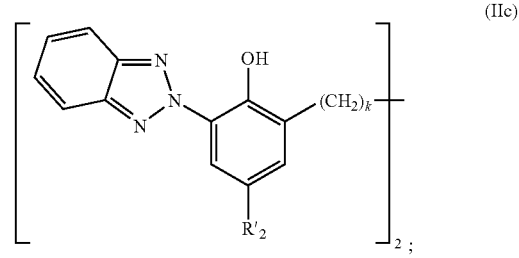

the 2-hydroxyphenyltriazine is of formula III

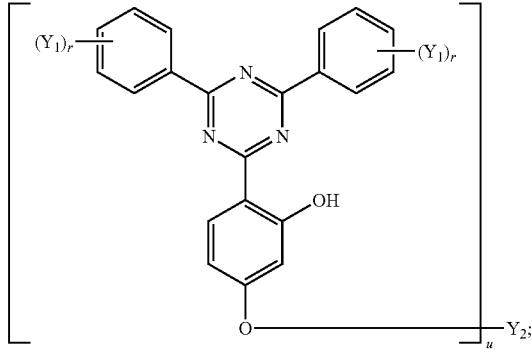

and the oxanilide is of formula (IV)

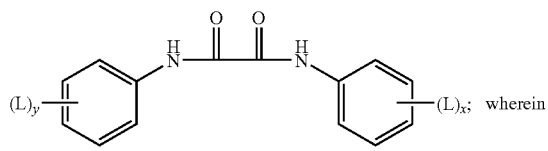; wherein in the compounds of the formula (I) v is an integer from 1 to 3 and w is 1 or 2 and the substituents Z independently of one another are hydrogen, halogen, hydroxyl or alkoxy having 1 to 12 carbon atoms;

in the compounds of the formula (IIa), $R_1$ is hydrogen, alkyl having 1 to 24 carbon atoms, phenylalkyl having 1 to 4 carbon atoms in the alkyl moiety, cycloalkyl having 5 to 8 carbon atoms or a radical of the formula

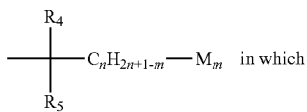

$R_4$ and $R_5$ independently of one another are alkyl having in each case 1 to 5 carbon atoms, or $R_4$, together with the radical $C_nH_{2n+1-m}$, forms a cycloalkyl radical having 5 to 12 carbon atoms, m is 1 or 2, n is an integer from 2 to 20 and M is a radical of the formula —$COOR_6$ in which $R_6$ is hydrogen, alkyl having 1 to 12 carbon atoms, alkoxyalkyl having in each case 1 to 20 carbon atoms in the alkyl moiety and in the alkoxy moiety or phenylalkyl having 1 to 4 carbon atoms in the alkyl moiety, $R_2$ is hydrogen, halogen, alkyl having 1 to 18 carbon atoms, and phenylalkyl having 1 to 4 carbon atoms in the alkyl moiety, and $R_3$ is hydrogen, chlorine, alkyl or alkoxy having in each case 1 to 4 carbon atoms or —$COOR_6$ in which $R_6$ is as defined above, at least one of the radicals $R_1$ and $R_2$ being other than hydrogen;

in the compounds of the formula (IIb)

T is hydrogen or alkyl having 1 to 6 carbon atoms, $T_1$ is hydrogen, chlorine or alkyl or alkoxy having in each case 1 to 4 carbon atoms, n is 1 or 2 and, if n is 1, $T_2$ is chlorine or a radical of the formula —$OT_3$ or

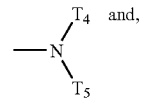 and, if n is 2, $T_2$ is a radical of the formula

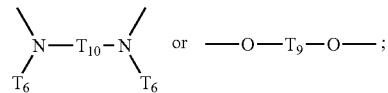 or —O—$T_9$—O—;

in which $T_3$ is hydrogen, alkyl which has 1 to 18 carbon atoms and is unsubstituted or substituted by 1 to 3 hydroxyl groups or by —$OCOT_6$, alkyl which has 3 to 18 carbon atoms, is interrupted once or several times by —O— or —$NT_6$- and is unsubstituted or substituted by hydroxyl or —$OCOT_6$, cycloalkyl which has 5 to 12 carbon atoms and is unsubstituted or substituted by hydroxyl and/or alkyl having 1 to 4 carbon atoms, alkenyl which has 2 to 18 carbon atoms and is unsubstituted or substituted by hydroxyl, phenylalkyl having 1 to 4 carbon atoms in the alkyl moiety, or a radical of the formula —$CH_2CH(OH)$-$T_7$ or

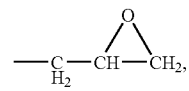

$T_4$ and $T_5$ independently of one another are hydrogen, alkyl having 1 to 18 carbon atoms, alkyl which has 3 to 18 carbon atoms and is interrupted once or several times by —O— or —$NT_6$-, cycloalkyl having 5 to 12 carbon atoms, phenyl, phenyl which is substituted by alkyl having 1 to 4 carbon atoms, alkenyl having 3 to 8 carbon atoms, phenylalkyl having 1 to 4 carbon atoms in the alkyl moiety or hydroxyalkyl having 2 to 4 carbon atoms, $T_6$ is hydrogen, alkyl having 1 to 18 carbon atoms, cycloalkyl having 5 to 12 carbon atoms, alkenyl having 3 to 8 carbon atoms, phenyl, phenyl which is substituted by alkyl having 1 to 4 carbon atoms, phenylalkyl having 1 to 4 carbon atoms in the alkyl moiety, $T_7$ is hydrogen, alkyl having 1 to 18 carbon atoms, phenyl which is unsubstituted or substituted by hydroxyl, phenylalkyl having 1 to 4 carbon atoms in the alkyl moiety, or —CH$_2$OT$_8$, $T_8$ is alkyl having 1 to 18 carbon atoms, alkenyl having 3 to 8 carbon atoms, cycloalkyl having 5 to 10 carbon atoms, phenyl, phenyl which is substituted by alkyl having 1 to 4 carbon atoms, or phenylalkyl having 1 to 4 carbon atoms in the alkyl moiety, $T_9$ is alkylene having 2 to 8 carbon atoms, alkenylene having 4 to 8 carbon atoms, alkynylene having 4 carbon atoms, cyclohexylene, alkylene which has 2 to 8 carbon atoms and is interrupted once or several times by —O—, or a radical of the formula —CH$_2$CH(OH)CH$_2$OT$_{11}$OCH$_2$CH(OH)CH$_2$— or —CH$_2$—C(CH$_2$OH)$_2$—CH$_2$—, $T_{10}$ is alkylene which has 2 to 20 carbon atoms and can be interrupted once or several times by —O—, or cyclohexylene, $T_{11}$ is alkylene having 2 to 8 carbon atoms, alkylene which has 2 to 18 carbon atoms and is interrupted once or several times by —O—, 1,3-cyclohexylene, 1,4-cyclohexylene, 1,3-phenylene or 1,4-phenylene, or $T_{10}$ and $T_6$, together with the two nitrogen atoms, are a piperazine ring;

in the compounds of formula (IIc)

R'$_2$ is C$_1$-C$_{12}$alkyl and k is a number from 1 to 4;

in the compounds of the formula (III)

u is 1 or 2 and r is an integer from 1 to 3, the substituents $Y_1$ independently of one another are hydrogen, hydroxyl, phenyl or halogen, halogenomethyl, alkyl having 1 to 12 carbon atoms, alkoxy having 1 to 18 carbon atoms, alkoxy having 1 to 18 carbon atoms which is substituted by a group —COO(C$_1$-C$_{18}$alkyl);

if u is 1, $Y_2$ is alkyl having 1 to 18 carbon atoms, phenyl which is unsubstituted or substituted by hydroxyl, halogen, alkyl or alkoxy having 1 to 18 carbon atoms;

alkyl which has 1 to 12 carbon atoms and is substituted by —COOH, —COOY$_8$, —CONH$_2$, —CONHY$_9$, —CONY$_9$Y$_{10}$, —NH$_2$, —NHY$_9$, —NY$_9$Y$_{10}$, —NHCOY$_{11}$, —CN and/or —OCOY$_{11}$;

alkyl which has 4 to 20 carbon atoms, is interrupted by one or more oxygen atoms and is unsubstituted or substituted by hydroxyl or alkoxy having 1 to 12 carbon atoms, alkenyl having 3 to 6 carbon atoms, glycidyl, cyclohexyl which is unsubstituted or substituted by hydroxyl, alkyl having 1 to 4 carbon atoms and/or —OCOY$_{11}$, phenylalkyl which has 1 to 5 carbon atoms in the alkyl moiety and is unsubstituted or substituted by hydroxyl, chlorine and/or methyl, —COY$_{12}$ or —SO$_2$Y$_{13}$, or, if u is 2, $Y_2$ is alkylene having 2 to 16 carbon atoms, alkenylene having 4 to 12 carbon atoms, xylylene, alkylene which has 3 to 20 carbon atoms, is interrupted by one or more —O— atoms and/or is substituted by hydroxyl, —CH$_2$CH(OH)CH$_2$—O—Y$_{15}$—OCH$_2$CH(OH)CH$_2$—, —CO—Y$_{16}$—CO—, —CO—NH—Y$_{17}$—NH—CO— or —(CH$_2$)$_m$—CO$_2$—Y$_{18}$—OCO—(CH$_2$)$_m$, in which m is 1, 2 or 3, $Y_8$ is alkyl having 1 to 18 carbon atoms, alkenyl having 3 to 18 carbon atoms, alkyl which has 3 to 20 carbon atoms, is interrupted by one or more oxygen or sulfur atoms or —NT$_6$- and/or is substituted by hydroxyl, alkyl which has 1 to 4 carbon atoms and is substituted by —P(O)(OY$_{14}$)$_2$, —NY$_9$Y$_{10}$ or —OCOY$_{11}$ and/or hydroxyl, alkenyl having 3 to 18 carbon atoms, glycidyl, or phenylalkyl having 1 to 5 carbon atoms in the alkyl moiety, $Y_9$ and $Y_{10}$ independently of one another are alkyl having 1 to 12 carbon atoms, alkoxyalkyl having 3 to 12 carbon atoms, dialkylaminoalkyl having 4 to 16 carbon atoms or cyclohexyl having 5 to 12 carbon atoms, or $Y_9$ and $Y_{10}$ together are alkylene, oxaalkylene or azaalkylene having in each case 3 to 9 carbon atoms, $Y_{11}$ is alkyl having 1 to 18 carbon atoms, alkenyl having 2 to 18 carbon atoms or phenyl, $Y_{12}$ is alkyl having 1 to 18 carbon atoms, alkenyl having 2 to 18 carbon atoms, phenyl, alkoxy having 1 to 12 carbon atoms, phenoxy, alkylamino having 1 to 12 carbon atoms or phenylamino, $Y_{13}$ is alkyl having 1 to 18 carbon atoms, phenyl or alkylphenyl having 1 to 8 carbon atoms in the alkyl radical, $Y_{14}$ is alkyl having 1 to 12 carbon atoms or phenyl, $Y_{15}$ is alkylene having 2 to 10 carbon atoms, phenylene or a group -phenylene-M-phenylene- in which M is —O—, —S—, —SO$_2$—, —CH$_2$— or —C(CH$_3$)$_2$—, $Y_{16}$ is alkylene, oxaalkylene or thiaalkylene having in each case 2 to 10 carbon atoms, phenylene or alkenylene having 2 to 6 carbon atoms, $Y_{17}$ is alkylene having 2 to 10 carbon atoms, phenylene or alkylphenylene having 1 to 11 carbon atoms in the alkyl moiety, and $Y_{18}$ is alkylene having 2 to 10 carbon atoms or alkylene which has 4 to 20 carbon atoms and is interrupted once or several times by oxygen;

in the compounds of the formula (IV) x is an integer from 1 to 3 and the substituents L independently of one another are hydrogen, alkyl, alkoxy or alkylthio having in each case 1 to 22 carbon atoms, phenoxy or phenylthio.

C$_1$-C$_{18}$alkyl may be linear or branched. Examples of alkyl having up to 18 carbon atoms are methyl, ethyl, propyl, isopropyl, n-butyl, sec-butyl, isobutyl, tert-butyl, 2-ethylbutyl, n-pentyl, isopentyl, 1-methylpentyl, 1,3-dimethylbutyl, n-hexyl, 1-methylhexyl, n-heptyl, isoheptyl, 1,1,3,3-tetramethylbutyl, 1-methylheptyl, 3-methylheptyl, n-octyl, 2-ethylhexyl, 1,1,3-trimethylhexyl, 1,1,3,3-tetramethylpentyl, nonyl, decyl, undecyl, 1-methylundecyl, dodecyl, 1,1,3,3,5,5-hexamethylhexyl, tridecyl, tetradecyl, pentadecyl, hexadecyl, heptadecyl and octadecyl.

In the compounds of the formula (IIa) R$_1$ can be hydrogen or alkyl having 1 to 24 carbon atoms, such as methyl, ethyl, propyl, butyl, hexyl, octyl, nonyl, dodecyl, tetradecyl, hexadecyl, octadecyl, nonadecyl and eicosyl and also corresponding branched isomers. Furthermore, in addition to phenylalkyl having 1 to 4 carbon atoms in the alkyl moiety, for example benzyl, R$_1$ can also be cycloalkyl having 5 to 8 carbon atoms, for example cyclopentyl, cyclohexyl and cyclooctyl, or a radical of the formula

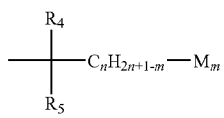

in which $R_4$ and $R_5$ independently of one another are alkyl having in each case 1 to 5 carbon atoms, in particular methyl, or $R_4$, together with the $C_nH_{2n+1-m}$ radical, forms a cycloalkyl radical having 5 to 12 carbon atoms, for example cyclohexyl, cyclooctyl and cyclodecyl. M is a radical of the formula —$COOR_6$ in which $R_6$ is not only hydrogen but also alkyl having 1 to 12 carbon atoms or alkoxyalkyl having 1 to 20 carbon atoms in each of the alkyl and alkoxy moieties. Suitable alkyl radicals $R_6$ are those enumerated for R. Examples of suitable alkoxyalkyl groups are —$C_2H_4OC_2H_5$, —$C_2H_4OC_8H_{17}$ and —$C_4H_8OC_4H_9$. As phenylalkyl having 1 to 4 carbon atoms, $R_6$ is, for example, benzyl, cumyl, α-methylbenzyl or phenylbutyl.

In addition to hydrogen and halogen, for example chlorine and bromine, $R_2$ can also be alkyl having 1 to 18 carbon atoms. Examples of such alkyl radicals are indicated in the definitions of $R_1$. $R_2$ can also be phenylalkyl having 1 to 4 carbon atoms in the alkyl moiety, for example benzyl, a-methylbenzyl and cumyl.

Halogen as a substituent means in all cases fluorine, chlorine, bromine or iodine, preferably chlorine or bromine and more preferably chlorine.

At least one of the radicals $R_1$ and $R_2$ must be other than hydrogen.

In addition to hydrogen or chlorine, $R_3$ is also alkyl or alkoxy having in each case 1 to 4 carbon atoms, for example methyl, butyl, methoxy and ethoxy, and also —$COOR_8$.

In the compounds of the formula (IIb) T is hydrogen or alkyl having 1 to 6 carbon atoms, such as methyl and butyl, $T_1$ is not only hydrogen or chlorine, but also alkyl or alkoxy having in each case 1 to 4 carbon atoms, for example methyl, methoxy and butoxy, and, if n is 1, $T_2$ is chlorine or a radical of the formula —$OT_3$ or —$NT_4T_5$. $T_3$ is here hydrogen or alkyl having 1 to 18 carbon atoms (cf. the definition of $R_1$). These alkyl radicals can be substituted by 1 to 3 hydroxyl groups or by a radical —$OCOT_6$. Furthermore, $T_3$ can be alkyl having 3 to 18 carbon atoms (cf. the definition of $R_1$) which is interrupted once or several times by —O— or —$NT_6$- and is unsubstituted or substituted by hydroxyl or —$OCOT_6$. Examples of $T_3$ as cycloalkyl are cyclopentyl, cyclohexyl or cyclooctyl. $T_3$ can also be alkenyl having 2 to 18 carbon atoms.

Suitable alkenyl radicals are derived from the alkyl radicals enumerated in the definitions of $R_1$. These alkenyl radicals can be substituted by hydroxyl. Examples of $T_3$ as phenylalkyl are benzyl, phenylethyl, cumyl, α-methylbenzyl or benzyl. $T_3$ can also be a radical of the formula

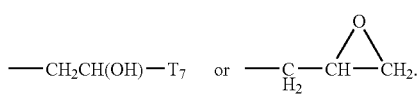

Like $T_3$, $T_4$ and $T_5$ can, independently of one another, be not only hydrogen but also alkyl having 1 to 18 carbon atoms or alkyl which has 3 to 18 carbon atoms and is interrupted once or several times by —O— or —$NT_6$-. $T_4$ and $T_5$ can also be cycloalkyl having 5 to 12 carbon atoms, for example cyclopentyl, cyclohexyl and cyclooctyl. Examples of $T_4$ and $T_5$ as alkenyl groups can be found in the illustrations of $T_3$. Examples of $T_4$ and $T_5$ as phenylalkyl having 1 to 4 carbon atoms in the alkyl moiety are benzyl or phenylbutyl. Finally, these substituents can also be hydroxyalkyl having 1 to 3 carbon atoms.

If n is 2, $T_2$ is a divalent radical of the formula

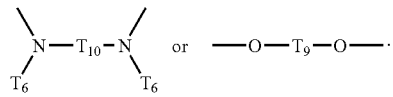

In addition to hydrogen, $T_6$ (see above also) is alkyl, cycloalkyl, alkenyl, aryl or phenylalkyl; examples of such radicals have already been given above.

In addition to hydrogen and the phenylalkyl radicals and long-chain alkyl radicals mentioned above, $T_7$ can be phenyl or hydroxyphenyl and also —$CH_2OT_8$ in which $T_8$ can be one of the alkyl, alkenyl, cycloalkyl, aryl or phenylalkyl radicals enumerated.

The divalent radical $T_9$ can be alkylene having 2 to 8 carbon atoms, and such radicals can also be branched. This also applies to the alkenylene and alkynylene radicals $T_9$. As well as cyclohexylene, $T_9$ can also be a radical of the formula —$CH_2CH(OH)CH_2OT_{11}OCH_2CH(OH)CH_2$— or —$CH_2$—$C(CH_2OH)_2$—$CH_2$—.

$T_{10}$ is a divalent radical and, in addition to cyclohexylene, is also alkylene which has 2 to 20 carbon atoms and which can be interrupted once or several times by —O—. Suitable alkylene radicals are derived from the alkyl radicals mentioned in the definitions of $R_1$.

$T_{11}$ is also an alkylene radical. It contains 2 to 8 carbon atoms or, if it is interrupted once or several times by —O—, 4 to 10 carbon atoms. $T_{11}$ is also 1,3-cyclohexylene, 1,4-cyclohexylene, 1,3-phenylene or 1,4-phenylene.

Together with the two nitrogen atoms, $T_6$ and $T_{10}$ can also be a piperazine ring.

Examples of alkyl, alkoxy, phenylalkyl, alkylene, alkenylene, alkoxyalkyl and cycloalkyl radicals and also alkylthio, oxaalkylene or azoalkylene radicals in the compounds of the formulae (I), (IIa), (IIb), (IIc), (III) and (IV) can be deduced from the above statements.

Within the benzotriazole UV-absorbers those according to formula IIa are in general preferred.

The UV absorbers of the formulae (I), (IIa), (IIb), (IIc), (III) and (IV) are known per se and are described, together with their preparation in, for example, WO 96/28431, EP-A-323 408, EP-A-57 160, U.S. Pat. No. 5,736,597 (EP-A-434 608), U.S. Pat. No. 4,619,956, DE-A 31 35 810 and GB-A 1 336 391. Preferred meanings of substituents and individual compounds can be deduced from the documents mentioned.

In another embodiment the UV-absorbers of the class of hydroxyphenyl triazines are of formula (IIIa)

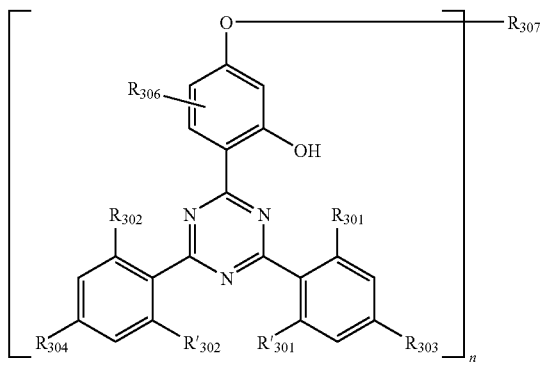

in which n is 1 or 2;

$R_{301}$, $R'_{301}$, $R_{302}$ and $R'_{302}$, independently of one another, are H, OH, $C_1$-$C_{12}$alkyl; $C_2$-$C_8$alkenyl; $C_1$-$C_{12}$alkoxy; $C_2$-$C_{18}$alkenoxy; halogen; trifluoromethyl; $C_7$-$C_{11}$phenylalkyl; phenyl; phenyl which is substituted by $C_1$-$C_{18}$alkyl, $C_1$-$C_{18}$alkoxy or halogen; phenoxy; or phenoxy which is substituted by $C_1$-$C_{18}$alkyl, $C_1$-$C_{18}$alkoxy or halogen;

$R_{303}$ and $R_{304}$, independently of one another, are H, $C_1$-$C_{12}$alkyl; $OR'_{307}$; $C_2$-$C_6$alkenyl; $C_2$-$C_{18}$alkenoxy; halogen; trifluoromethyl; $C_7$-$C_{11}$phenylalkyl; phenyl; phenyl which is substituted by $C_1$-$C_{18}$alkyl, $C_1$-$C_{18}$alkoxy or halogen; phenoxy; or phenoxy which is substituted by $C_1$-$C_{18}$alkyl, $C_1$-$C_{18}$alkoxy or halogen;

$R_{306}$ is hydrogen, $C_1$-$C_{24}$alkyl, $C_5$-$C_{12}$cycloalkyl or $C_7$-$C_{15}$phenylalkyl;

$R_{307}$, in the case where n=1, and $R'_{307}$, independently of one another, are hydrogen or $C_1$-$C_{18}$alkyl; or are $C_1$-$C_{12}$alkyl which is substituted by OH, $C_1$-$C_{18}$alkoxy, allyloxy, halogen, —COOH, —COOR$_{308}$, —CONH$_2$, —CONHR$_{309}$, —CON(R$_{309}$)(R$_{310}$), —NH$_2$, —NHR$_{309}$, —N(R$_{309}$)(R$_{310}$), —NHCOR$_{311}$, —CN, —OCOR$_{311}$, phenoxy and/or phenoxy which is substituted by $C_1$-$C_{18}$alkyl, $C_1$-$C_{18}$alkoxy or halogen; or $R_{307}$ is $C_3$-$C_{50}$alkyl which is interrupted by —O— and may be substituted by OH; or $R_7$ is $C_3$-$C_6$alkenyl; glycidyl; $C_5$-$C_{12}$cycloalkyl which is substituted by OH, $C_1$-$C_4$alkyl or —OCOR$_{311}$; $C_7$-$C_{11}$phenylalkyl which is unsubstituted or substituted by OH, Cl or CH$_3$; —CO—R$_{312}$ or —SO$_2$—R$_{313}$;

$R_{307}$, in the case where n=2, is $C_2$-$C_{16}$alkylene, $C_4$-$C_{12}$alkenylene, xylylene, $C_3$-$C_{20}$alkylene which is interrupted by O and/or substituted by OH, or is a group of the formula —CH$_2$CH(OH)CH$_2$O—R$_{320}$—OCH$_2$CH(OH)CH$_2$—, —CO—R$_{321}$—CO—, —CO—NH—R$_{322}$—NH—CO— or —(CH$_2$)$_m$—COO—R$_{323}$—OOC—(CH$_2$)$_m$— in which m is a number in the range from 1 to 3, or is

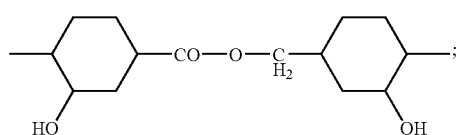

$R_{308}$ is $C_1$-$C_{18}$alkyl; $C_2$-$C_{18}$alkenyl; hydroxyethyl; $C_3$-$C_{50}$alkyl which is interrupted by O, NH, NR$_{309}$ or S and/or is substituted by OH; $C_1$-$C_4$alkyl which is substituted by —P(O)(OR$_{314}$)$_2$, —N(R$_{309}$)(R$_{310}$) or —OCOR$_{311}$ and/or OH; glycidyl; $C_5$-$C_{12}$cycloalkyl; phenyl; $C_7$-$C_{14}$alkylphenyl or $C_7$-$C_{11}$phenylalkyl;

$R_{309}$ and $R_{310}$, independently of one another, are $C_1$-$C_{12}$alkyl; $C_3$-$C_{12}$alkoxyalkyl; $C_4$-$C_{16}$dialkylaminoalkyl or $C_5$-$C_{12}$cycloalkyl, or $R_{309}$ and $R_{310}$ together are $C_3$-$C_9$alkylene or -oxaalkylene or -azaalkylene;

$R_{311}$ is $C_1$-$C_{18}$alkyl; $C_2$-$C_{18}$alkenyl or phenyl; $C_2$-$C_{12}$hydroxyalkyl; cyclohexyl; or is $C_3$-$C_{50}$alkyl which is interrupted by —O— and may be substituted by OH;

$R_{312}$ is $C_1$-$C_{18}$alkyl; $C_2$-$C_{18}$alkenyl; phenyl; $C_1$-$C_{18}$alkoxy; $C_3$-$C_{18}$alkenyloxy; $C_3$-$C_{50}$alkoxy which is interrupted by O, NH, NR$_{309}$ or S and/or substituted by OH; cyclohexyloxy; $C_7$-$C_{14}$alkylphenoxy; $C_7$-$C_{11}$phenylalkoxy; phenoxy; $C_1$-$C_{12}$alkylamino; phenylamino; tolylamino or naphthylamino;

$R_{313}$ is $C_1$-$C_{12}$alkyl; phenyl; naphthyl or $C_7$-$C_{14}$alkylphenyl;

$R_{314}$ is $C_1$-$C_{12}$alkyl, methylphenyl or phenyl;

$R_{320}$ is $C_2$-$C_{10}$alkylene; $C_4$-$C_{50}$alkylene which is interrupted by O, phenylene or a -phenylene-X-phenylene- group, in which X is —O—, —S—, —SO$_2$—, —CH$_2$— or —C(CH$_3$)$_2$—;

$R_{321}$ is $C_2$-$C_{10}$alkylene, $C_2$-$C_{10}$oxaalkylene, $C_2$-$C_{10}$thiaalkylene, $C_6$-$C_{12}$arylene or $C_2$-$C_6$alkenylene;

$R_{322}$ is $C_2$-$C_{10}$alkylene, phenylene, tolylene, diphenylenemethane or a

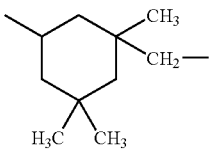

group; and $R_{323}$ is $C_2$-$C_{10}$alkylene or $C_4$-$C_{20}$alkylene which is interrupted by O.

Halogen is in all cases fluorine, chlorine, bromine or iodine.

Examples of alkyl are methyl, ethyl, propyl, isopropyl, n-butyl, sec-butyl, isobutyl, tert-butyl, 2-ethylbutyl, n-pentyl, isopentyl, 1-methylpentyl, 1,3-dimethylbutyl, n-hexyl, 1-methylhexyl, n-heptyl, isoheptyl, 1,1,3,3-tetramethylbutyl, 1-methylheptyl, 3-methylheptyl, n-octyl, 2-ethylhexyl, 1,1,3-trimethylhexyl, 1,1,3,3-tetramethylpentyl, nonyl, decyl, undecyl, 1-methylundecyl, dodecyl.

Examples of alkoxy having up to 12 carbon atoms are methoxy, ethoxy, propoxy, isopropoxy, butoxy, isobutoxy, pentoxy, isopentoxy, hexoxy, heptoxy, octoxy, decyloxy, dodecyloxy.

Examples of alkenoxy are propenyloxy, butenyloxy, pentenyloxy and hexenyloxy.

Examples of $C_5$-$C_{12}$cycloalkyl are cyclopentyl, cyclohexyl, cycloheptyl, cyclooctyl and cyclododecyl. $C_5$-$C_8$Cycloalkyl, especially cyclohexyl, is preferred.

$C_1$-$C_4$Alkyl-substituted $C_5$-$C_{12}$cycloalkyl is for example methylcyclohexyl or dimethylcyclohexyl.

OH— and/or $C_1$-$C_{10}$alkyl-substituted phenyl is for example methylphenyl, dimethylphenyl, trimethylphenyl, tert-butylphenyl or 3,5-di-tert-butyl-4-hydroxyphenyl.

Alkoxy-substituted phenyl is for example methoxyphenyl dimethoxyphenyl or trimethoxyphenyl.

Examples of $C_7$-$C_9$phenylalkyl are benzyl and phenylethyl.

$C_7$-$C_9$phenylalkyl which is substituted on the phenyl radical by —OH and/or by alkyl having up to 10 carbon atoms is for example methylbenzyl, dimethylbenzyl, trimethylbenzyl, tert-butylbenzyl or 3,5-di-tert-butyl-4-hydroxybenzyl.

Examples of alkenyl are allyl, 2-methallyl, butenyl, pentenyl and hexenyl. Allyl is preferred. The carbon atom in position 1 is preferably saturated.

Examples of alkylene are methylene, ethylene, propylene, trimethylene, tetramethylene, pentamethylene, 2,2-dimethyltrimethylene, hexamethylene, trimethylhexamethylene, octamethylene and decamethylene.

Examples of alkenylene are butenylene, pentenylene and hexenylene.

$C_6$-$C_{12}$ arylene is preferably phenylene.

Alkyl interrupted by O is for example —$CH_2$—$CH_2$—O—$CH_2CH_3$, —$CH_2$—$CH_2$—O—$CH_3$— or —$CH_2$—$CH_2$—O—$CH_2$—$CH_2$—$CH_2$—O—$CH_2$—$CH_3$—. It is preferably derived from polyethlene glycol. A general description is —$((CH_2)_a$—$O)_b$—$H/CH_3$, wherein a is a number from 1 to 6 and b is a number from 2 to 10.

$C_2$-$C_{10}$ oxaalkylene and $C_2$-$C_{10}$thiaalkylene can be deduced from the above mentioned alkylene groups by substituting one or more carbon atoms by an oxygen atom or a sulphur atom.

Specific examples of 2-hydroxybenzophenones are for example the 4-hydroxy, 4-methoxy, 4-octyloxy, 4-decyloxy; 4-dodecyloxy, 4-benzyloxy and 2'-hydroxy-4,4'-dimethoxy derivatives.

Specific examples of 2-(2'-hydroxyphenyl)benzotriazoles are for example 2-(2'-hydroxy-5'-methylphenyl)-benzotriazole, 2-(3',5'-di-tert-butyl-2'-hydroxyphenyl)benzotriazole, 2-(5'-tert-butyl-2'-hydroxyphenyl)benzotriazole, 2-(2'-hydroxy-5'-(1,1,3,3-tetramethylbutyl)phenyl)benzotriazole, 2-(3',5'-di-tert-butyl-2'-hydroxyphenyl)-5-chloro-benzotriazole, 2-(3'-tert-butyl-2'-hydroxy-5'-methylphenyl)-5-chloro-benzotriazole, 2-(3'-sec-butyl-5'-tert-butyl-2'-hydroxyphenyl)benzotriazole, 2-(2'-hydroxy-4'-octyloxyphenyl) benzotriazole, 2-(3',5'-di-tert-amyl-2'-hydroxyphenyl) benzotriazole, 2-(3',5'-bis-(α,α-dimethylbenzyl)-2'-hydroxyphenyl)benzotriazole, 2-(3'-tert-butyl-2'-hydroxy-5'-(2-octyloxycarbonylethyl)phenyl)-5-chloro-benzotriazole, 2-(3'-tert-butyl-5'-[2-(2-ethylhexyloxy)-carbonylethyl]-2'-hydroxyphenyl)-5-chloro-benzotriazole, 2-(3'-tert-butyl-2'-hydroxy-5'-(2-methoxycarbonylethyl) phenyl)-5-chloro-benzotriazole, 2-(3'-tert-butyl-2'-hydroxy-5'-(2-methoxycarbonylethyl)phenyl)benzotriazole, 2-(3'-tert-butyl-2'-hydroxy-5'-(2-octyloxycarbonylethyl)phenyl) benzotriazole, 2-(3'-tert-butyl-5'-[2-(2-ethylhexyloxy) carbonylethyl]-2'-hydroxyphenyl)benzotriazole, 2-(3'-dodecyl-2'-hydroxy-5'-methylphenyl)benzotriazole, 2-(3'-tert-butyl-2'-hydroxy-5'-(2-isooctyloxycarbonylethyl) phenylbenzotriazole, 2,2'-methylene-bis[4-(1,1,3,3-tetramethylbutyl)-6-benzotriazole-2-ylphenol]; the transesterification product of 2-[3'-tert-butyl-5'-(2-methoxycarbonylethyl)-2'-hydroxyphenyl]-2H-benzotriazole with polyethylene glycol 300; [R—$CH_2CH_2$—COO—$CH_2CH_2$—$]_2$ where R=3'-tert-butyl-4'-hydroxy-5'-2H-benzotriazol-2-ylphenyl, 2-[2'-hydroxy-3'-(α,α-dimethylbenzyl)-5'-(1,1,3,3-tetramethylbutyl)-phenyl]benzotriazole; 2-[2'-hydroxy-3'-(1,1,3,3-tetramethylbutyl)-5'-(α,αdimethylbenzyl)-phenyl]benzotriazole.

Specific examples of 2-(2-hydroxyphenyl)-1,3,5-triazines are for example 2,4,6-tris(2-hydroxy-4-octyloxyphenyl)-1,3, 5-triazine, 2-(2-hydroxy-4-octyloxyphenyl)-4,6-bis(2,4-dimethylphenyl)-1,3,5-triazine, 2-(2,4-dihydroxyphenyl)-4, 6-bis(2,4-dimethylphenyl)-1,3,5-triazine, 2,4-bis(2-hydroxy propyloxyphenyl)-6-(2,4-dimethylphenyl)-1,3,5-triazine, 2-(2-hydroxy-4-octyloxyphenyl)-4,6-bis(4-methylphenyl)-1,3,5-triazine, 2-(2-hydroxy-4-dodecyloxyphenyl)-4,6-bis (2,4-dimethylphenyl)-1,3,5-triazine, 2-(2-hydroxy-4-tridecyloxyphenyl)-4,6-bis(2,4-dimethylphenyl)-1,3,5-triazine, 2-[2-hydroxy-4-(2-hydroxy-3-butyloxy-propoxy)phenyl]-4, 6-bis(2,4-dimethylyl)-1,3,5-triazine, 2-[2-hydroxy-4-(2-hydroxy-3-octyloxy-propyloxy)phenyl]-4,6-bis(2,4-dimethyl)-1,3,5-triazine, 2-[4-(dodecyloxy/tridecyloxy-2-hydroxypropoxy)-2-hydroxyphenyl]-4,6-bis(2,4-dimethylphenyl)-1,3,5-triazine, 2-[2-hydroxy-4-(2-hydroxy-4-dodecyloxypropoxy)phenyl]-4,6-bis(2,4-dimethylphenyl)-1,3,5-triazine, 2-(2-hydroxy-4-hexyloxy) phenyl-4,6-diphenyl-1,3,5-triazine, 2-(2-hydroxy-4-methoxyphenyl)-4,6-diphenyl-1,3,5-triazine, 2,4,6-tris[2-hydroxy-4-(3-butoxy-2-hydroxy-propoxy)phenyl]-1,3,5-triazine, 2-(2-hydroxyphenyl)-4-(4-methoxyphenyl)-4,6-phenyl-1,3,5-triazine, 2-{2-hydroxy-4-[3-(2-ethylhexyl-1-oxy)-2-hydroxy-propyloxy]phenyl}-4,6-bis(2,4-dimethylphenyl)-1,3,5-triazine and 2-(2-hydroxy-4-(2-ethylhexyl)oxy)phenyl-4,6-di(4-phenyl)phenyl-1,3,5-triazine.

For instance the hydroxyphenyl-triazine UV-absorbers are of formulae:

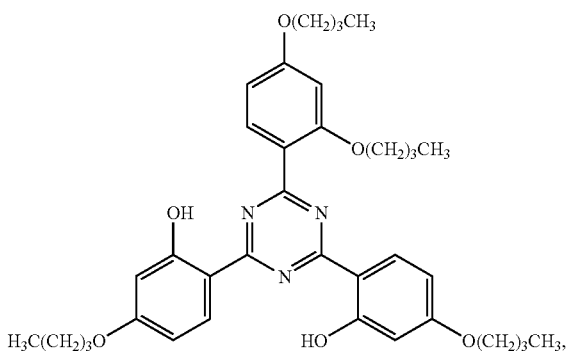

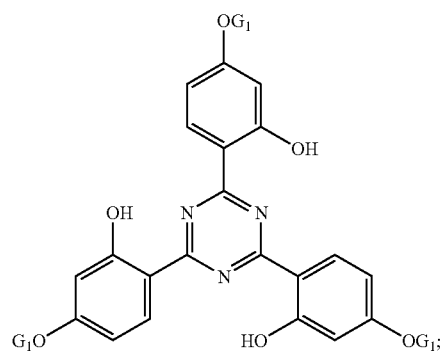

-continued
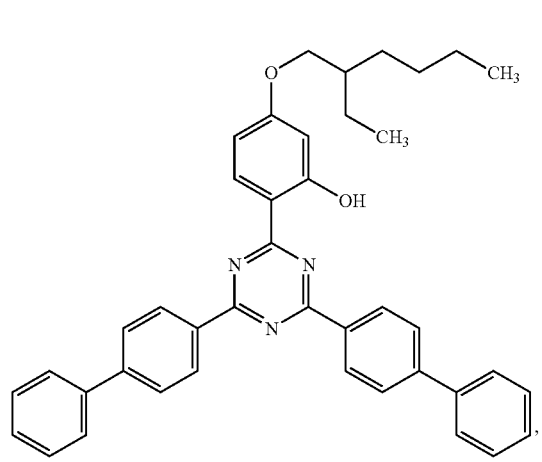
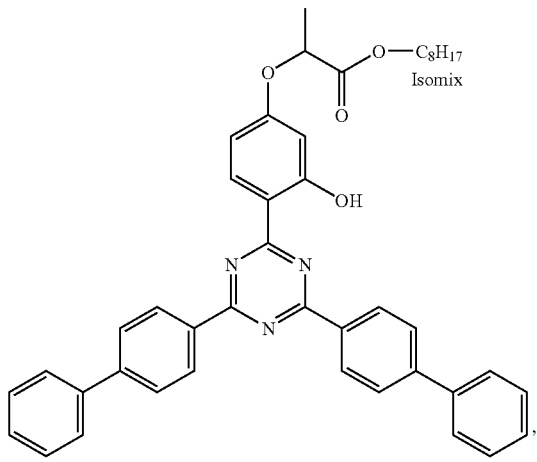
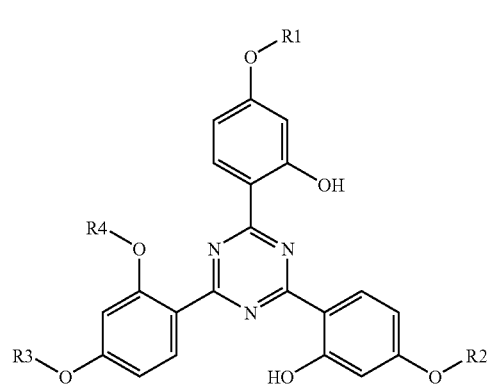
= a mixture of
a) R1 = R2 = CH(CH₃)—COO—C₈H₁₇, R3 = R4 = H;
b) R1 = R2 = R3 = CH(CH₃)—COO—C₈H₁₇, R4 = H;
c) R1 = R2 = R3 = R4 = CH(CH₃)—COO—C₈H₁₇,
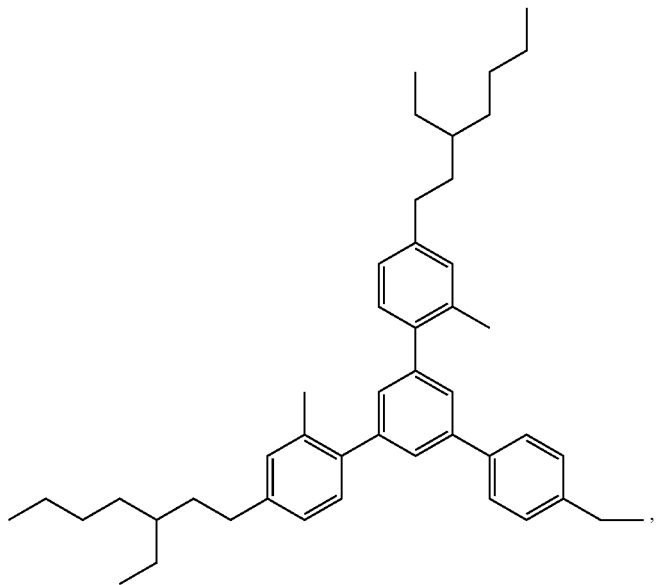
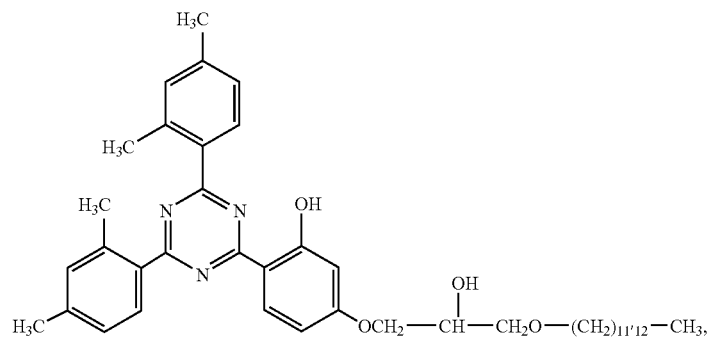

-continued

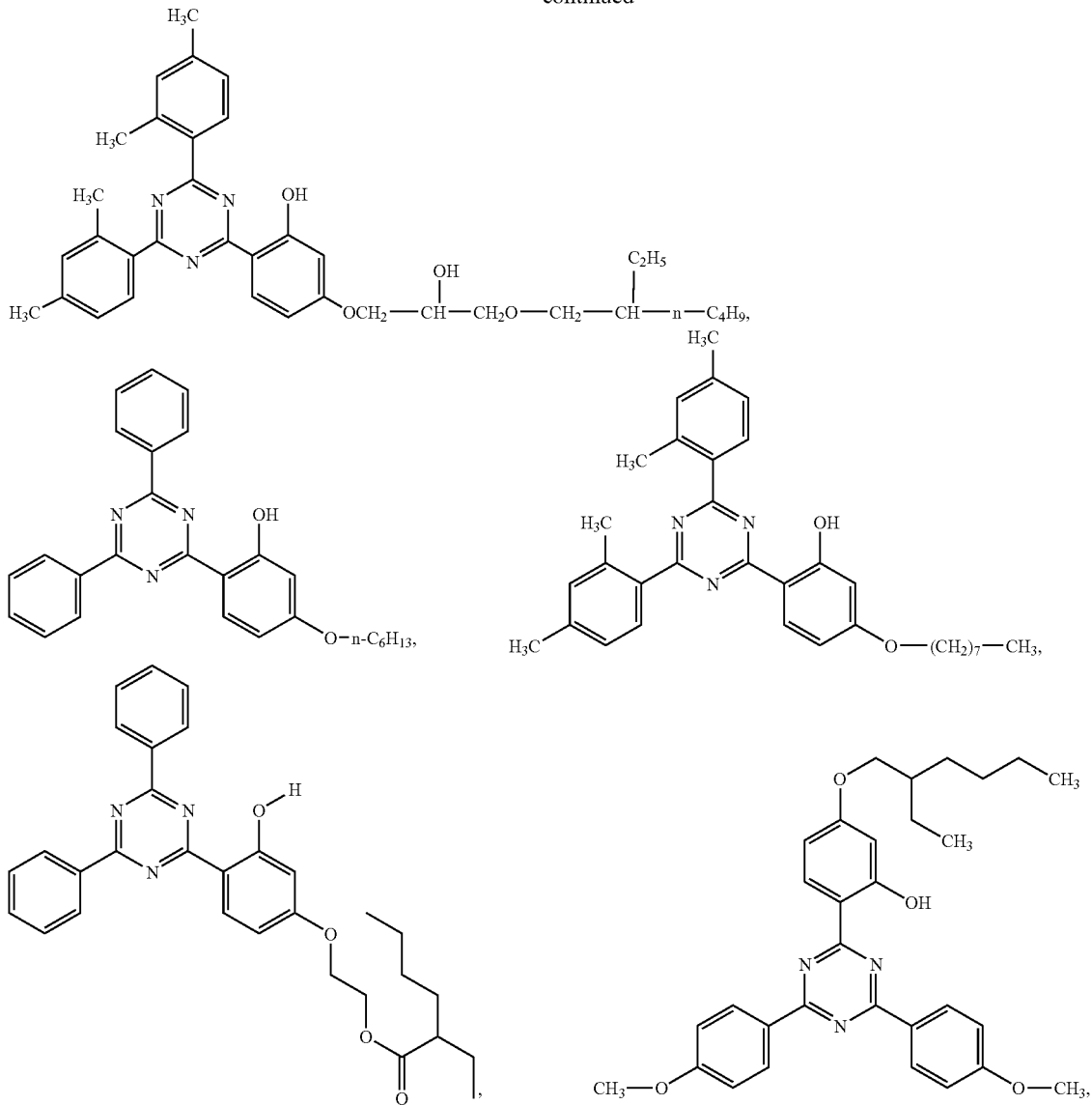

The hydroxyphenyl triazine UV-absorbers are known and partially items of commerce. They can be prepared according to the above documents.

Specific examples for oxamides are for example 4,4'-dioctyloxyoxanilide, 2,2'-diethoxyoxanilide, 2,2'-dioctyloxy-5,5'-di-tert-butoxanilide, 2,2'-didodecyloxy-5,5'-di-tert-butoxanilide, 2-ethoxy-2'-ethyloxanilide, N,N'-bis(3-dimethylaminopropyl)oxamide, 2-ethoxy-5-tert-butyl-2'-ethoxanilide and its mixture with 2-ethoxy-2'-ethyl-5,4'-di-tert-butoxanilide, mixtures of o- and p-methoxy-disubstituted oxanilides and mixtures of o- and p-ethoxy-disubstituted oxanilides.

The above mentioned UV-absorbers are largely items of commerce and for example known as Tinuvin® 109, 171, 326, 327, 328, 350, 360, 384, 400, 405, 411 or Chimassorb® 81 from Ciba Specialty Chemicals or Cyasorb® 1164 from Cytech Inc.

In many cases it may be of advantage to use a combination of UV-absorbers from different classes, such as for example a benzophenone UV-absorber with a benzotriazole UV-absorber or a hydroxyphenyltriazine UV-absorber with a benzotriazole UV-absorber. If such a combination is used, the weight ratio between both UV-absorbers is for example from 1:5 to 5:1, for instance from 1:3 to 3:1, particularly 1:1.5 to 1.5:1.

The sterically hindered amine contains at least one radical of the formula

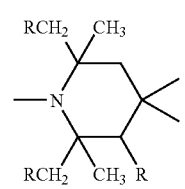

in which R is hydrogen or methyl.

The sterically hindered amine light stabilizer useful in the instant invention is preferably a compound of formulae (A-1) to (A-10) or of formulae (B-1) to (B-10);

(α-1) a compound of the formula (A-1)

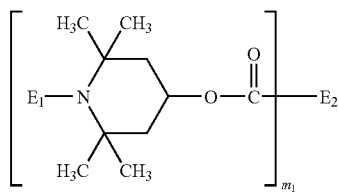
(A-1)

in which $E_1$ is hydrogen, $C_1$-$C_8$alkyl, O., —OH, —CH$_2$CN, $C_1$-$C_{18}$alkoxy, $C_5$-$C_{12}$cycloalkoxy, $C_3$-$C_6$alkenyl, $C_7$-$C_9$phenylalkyl unsubstituted or substituted on the phenyl by 1, 2 or 3 $C_1$-$C_4$alkyl; or $C_1$-$C_8$acyl, $m_1$ is 1, 2 or 4, if $m_1$ is 1, $E_2$ is $C_1$-$C_{25}$alkyl, if $m_1$ is 2, $E_2$ is $C_1$-$C_{14}$alkylene or a group of the formula (a-I)

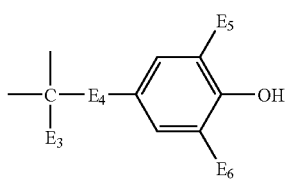
(a-I)

wherein $E_3$ is $C_1$-$C_{10}$alkyl or $C_{2-10}$alkenyl, $E_4$ is $C_1$-$C_{10}$alkylene, and $E_5$ and $E_6$ independently of one another are $C_1$-$C_4$alkyl, cyclohexyl or methylcyclohexyl, and if $m_1$ is 4, $E_2$ is $C_4$-$C_{10}$alkanetetrayl;

(α-2) a compound of the formula (A-2)

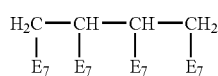
(A-2)

in which two of the radicals $E_7$ are —COO—($C_1$-$C_{20}$alkyl), and two of the radicals $E_7$ are a group of the formula (a-II)

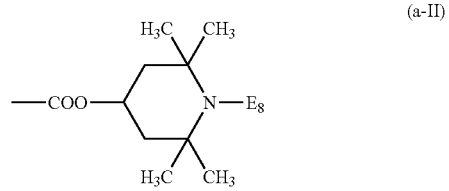
(a-II)

with $E_8$ having one of the meanings of $E_1$;

(α-3) a compound of the formula (A-3)

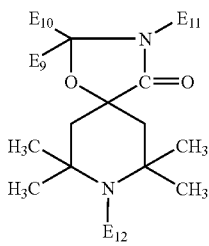
(A-3)

in which $E_9$ and $E_{10}$ together form $C_2$-$C_{14}$alkylene, $E_{11}$ is hydrogen or a group —$Z_1$—COO—$Z_2$, $Z_1$ is $C_2$-$C_{14}$alkylene, and $Z_2$ is $C_1$-$C_{24}$alkyl, and $E_{12}$ has one of the meanings of $E_1$;

(α-4) a compound of the formula (A-4)

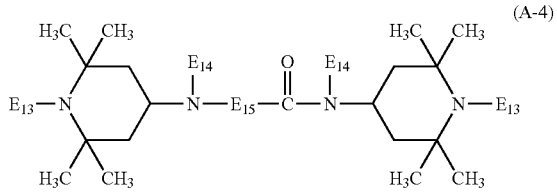
(A-4)

wherein the radicals $E_{13}$ independently of one another have one of the meanings of $E_1$, the radicals $E_{14}$ independently of one another are hydrogen or $C_1$-$C_{12}$alkyl, and $E_{15}$ is $C_1$-$C_{10}$alkylene or $C_3$-$C_{10}$alkylidene;

(α-5) a compound of the formula (A-5)

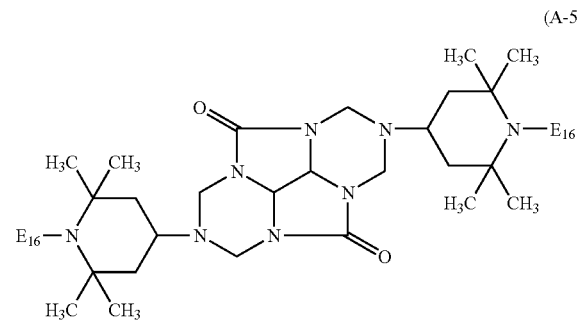

(A-5)

wherein the radicals $E_{16}$ independently of one another have one of the meanings of $E_1$;

(α-6) a compound of the formula (A-6)

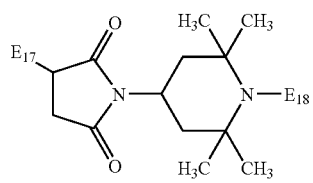

(A-6)

in which $E_{17}$ is $C_1$-$C_{24}$alkyl, and $E_{18}$ has one of the meanings of $E_1$;

(α-7) a compound of the formula (A-7)

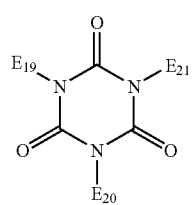

(A-7)

in which $E_{19}$, $E_{20}$ and $E_{21}$ independently of one another are a group of the formula (a-III)

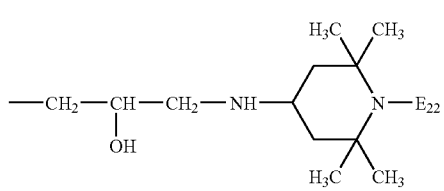

(a-III)

wherein $E_{22}$ has one of the meanings of $E_1$;

(α-8) a compound of the formula (A-8)

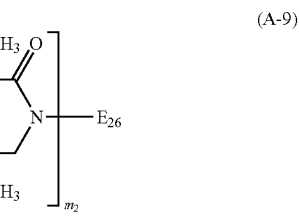

(A-8)

wherein the radicals $E_{23}$ independently of one another have one of the meanings of $E_1$, and $E_{24}$ is hydrogen, $C_1$-$C_{12}$alkyl or $C_1$-$C_{12}$alkoxy;

(α-9) a compound of the formula (A-9)

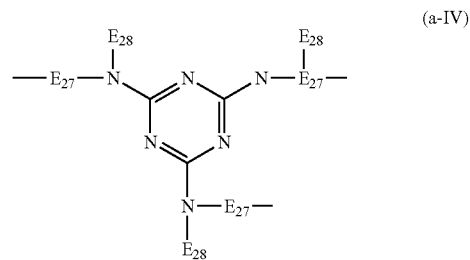

(A-9)

wherein $m_2$ is 1, 2 or 3, $E_{25}$ has one of the meanings of $E_1$, and when $m_2$ is 1, $E_{26}$ is a group

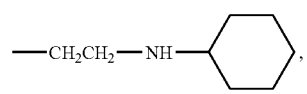

when $m_2$ is 2, $E_{26}$ is $C_2$-$C_{22}$alkylene, and when $m_2$ is 3, $E_{28}$ is a group of the formula (a-IV)

(a-IV)

wherein the radicals $E_{27}$ independently of one another are $C_2$-$C_{12}$alkylene, and the radicals $E_{28}$ independently of one another are $C_1$-$C_{12}$alkyl or $C_5$-$C_{12}$cycloalkyl;

($\alpha$-10) a compound of the formula (A-10)

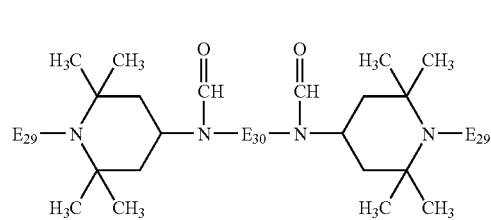

(A-10)

wherein the radicals $E_{29}$ independently of one another have one of the meanings of $E_1$, and $E_{30}$ is $C_2$-$C_{22}$alkylene, $C_5$-$C_7$cycloalkylene, $C_1$-$C_4$alkylenedi($C_5$-$C_7$cycloalkylene), phenylene or phenylenedi($C_1$-$C_4$alkylene);

($\beta$-1) a compound of the formula (B-1)

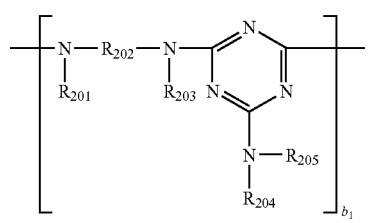

(B-1)

in which $R_{201}$, $R_{203}$, $R_{204}$ and $R_{205}$ independently of one another are hydrogen, $C_1$-$C_{12}$alkyl, $C_5$-$C_{12}$cycloalkyl, $C_1$-$C_4$-alkyl-substituted $C_5$-$C_{12}$cycloalkyl, phenyl, phenyl which is substituted by —OH and/or $C_1$-$C_{10}$alkyl; $C_7$-$C_9$phenylalkyl, $C_7$-$C_9$phenylalkyl which is substituted on the phenyl radical by —OH and/or $C_1$-$C_{10}$alkyl; or a group of the formula (b-I)

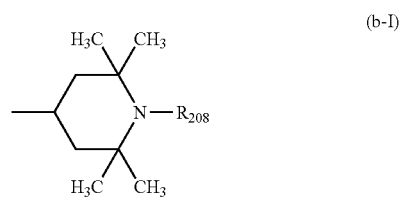

(b-I)

$R_{202}$ is $C_2$-$C_{18}$alkylene, $C_5$-$C_7$cycloalkylene or $C_1$-$C_4$alkylenedi($B_5$—$C_7$cycloalkylene), or the radicals $R_{201}$, $R_{202}$ and $R_{203}$, together with the nitrogen atoms to which they are bonded, perform a 5- to 10-membered heterocyclic ring, or $R_{204}$ and $R_{205}$, together with the nitrogen atom to which they are bonded, form a 5- to 10-membered heterocyclic ring, $R_{206}$ is hydrogen, $C_1$-$C_8$alkyl, O., —OH, —CH$_2$CN, $C_1$-$C_{18}$alkoxy, $C_5$-$C_{12}$cycloalkoxy, $C_3$-$C_6$alkenyl, $C_7$-$C_9$phenylalkyl unsubstituted or substituted on the phenyl by 1, 2 or 3 $C_1$-$C_4$alkyl; or $C_1$-$C_8$acyl, and $b_1$ is a number from 2 to 50, with the proviso that at least one of the radicals $R_{201}$, $R_{203}$, $R_{204}$ and $R_{205}$ is a group of the formula (b-I);

($\beta$-2) a compound of the formula (B-2)

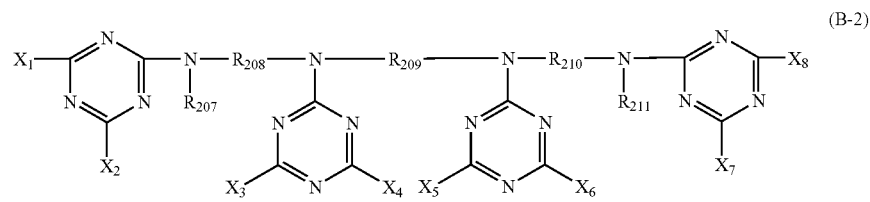

(B-2)

wherein $R_{207}$ and $R_{211}$ independently of one another are hydrogen or $C_1$-$C_{12}$alkyl, $R_{208}$, $R_{209}$ and $R_{210}$ independently of one another are $C_2$-$C_{10}$alkylene, and $X_1$, $X_2$, $X_3$, $X_4$, $X_5$, $X_6$, $X_7$ and $X_8$ independently of one another are a group of the formula (b-II),

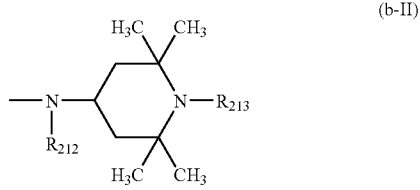

(b-II)

in which $R_{212}$ is hydrogen, $C_1$-$C_{12}$alkyl, $C_5$-$C_{12}$cycloalkyl, $C_1$-$C_4$alkyl-substituted $C_5$-$C_{12}$cycloalkyl, phenyl, —OH— and/or $C_1$-$C_{10}$alkyl-substituted phenyl, $C_7$-$C_9$phenylalkyl, $C_7$-$C_9$phenylalkyl which is substituted on the phenyl radical by —OH and/or $C_1$-$C_{10}$alkyl; or a group of the formula (b-I) as defined above, and $R_{213}$ has one of the meanings of $R_{208}$;

(β-3) a compound of the formula (B-3)

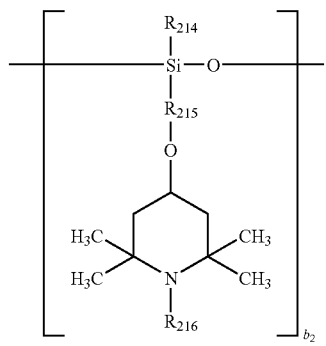

(B-3)

in which $R_{214}$ is $C_1$-$C_{10}$alkyl, $C_5$-$C_{12}$cycloalkyl, $C_1$-$C_4$alkyl-substituted $C_5$-$C_{12}$cycloalkyl, phenyl or $C_1$-$C_{10}$alkyl-substituted phenyl, $R_{215}$ is $C_3$-$C_{10}$alkylene, $R_{216}$ has one of the meanings of $R_{206}$, and $b_2$ is a number from 2 to 50;

(β1-4) a compound of the formula (B-4)

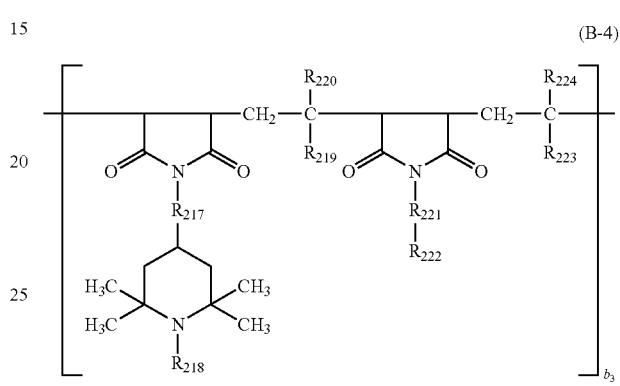

(B-4)

in which $R_{217}$ and $R_{221}$ independently of one another are a direct bond or a —N($X_9$)—CO—$X_{10}$—CO—N($X_{11}$)— group, where $X_9$ and $X_{11}$, independently of one another are hydrogen, $C_1$-$C_8$alkyl, $C_5$-$C_{12}$cycloalkyl, phenyl, $C_7$-$C_9$phenylalkyl or a group of the formula (b-I), $X_{10}$ is a direct bond or $C_1$-$C_4$alkylene, $R_{218}$ has one of the meanings of $R_{206}$, $R_{219}$, $R_{220}$, $R_{223}$ and $R_{224}$ independently of one another are hydrogen, $C_1$-$C_{30}$alkyl, $C_5$-$C_{12}$cycloalkyl or phenyl, $R_{222}$ is hydrogen, $C_1$-$C_{30}$alkyl, $C_5$-$C_{12}$cycloalkyl, phenyl, $C_7$-$C_9$phenylalkyl or a group of the formula (b-I), and $b_3$ is a number from 1 to 50;

(β-5) a compound of the formula (B-5)

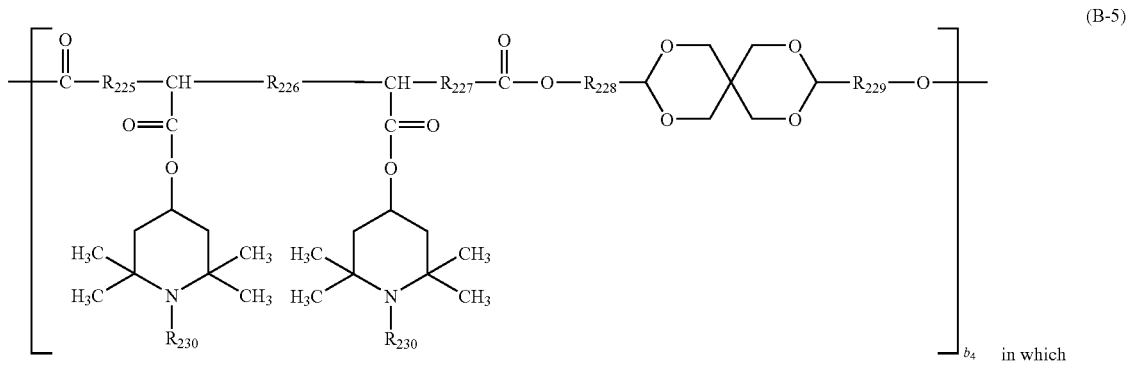

(B-5)

in which $R_{225}$, $R_{226}$, $R_{227}$, $R_{228}$ and $R_{229}$ independently of one another are a direct bond or $C_1$-$C_{10}$alkylene, $R_{230}$ has one of the meanings of $R_{208}$, and $b_4$ is a number from 1 to 50;

(β-6) a product (B-6) obtainable by reacting a product, obtained by reaction of a polyamine of the formula (B-6-1) with cyanuric chloride, with a compound of the formula (B-6-2)

$$H_2N-(CH_2)_{\overline{b'_5}}-NH-(CH_2)_{\overline{b''_5}}-NH-(CH_2)_{\overline{b'''_5}}-NH_2 \quad (B\text{-}6\text{-}1)$$

(B-6-2)

in which $b'_5$, $b''_5$ and $b'''_5$ independently of one another are a number from 2 to 12, $R_{231}$ is hydrogen, $C_1$-$C_{12}$alkyl, $C_5$-$C_{12}$cycloalkyl, phenyl or $C_7$-$C_9$phenylalkyl, and $R_{232}$ has one of the meanings of $R_{206}$;

(β-7) a compound of the formula (B-7)

(B-7)

wherein $A_1$ is hydrogen or $C_1$-$C_4$alkyl, $A_2$ is a direct bond or $C_1$-$C_{10}$alkylene, and $n_1$ is a number from 2 to 50;

(β-8) at least one compound of the formulae (B-8-a) and (B-8-b)

(B-8-a)

(B-8-b)

wherein $n_2$ and $n_2^*$ are a number from 2 to 50;

(β-9) a compound of the formula (B-9)

(B-9)

wherein $A_3$ and $A_4$ independently of one another are hydrogen or $C_1$-$C_8$alkyl, or $A_3$ and $A_4$ together form a $C_2$-$C_{14}$alkylene group, and the variables $n_3$ independently of one another are a number from 1 to 50; and (β-10) a compound of the formula (B-10)

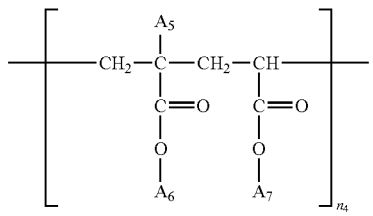

wherein $n_4$ is a number from 2 to 50, $A_5$ is hydrogen or $C_1$-$C_4$alkyl, the radicals $A_6$ and $A_7$ independently of one another are $C_1$-$C_4$alkyl or a group of the formula (b-I), with the proviso that at least 50% of the radicals $A_7$ are a group of the formula (b-I).

Examples of alkyl having up to 30 carbon atoms are methyl, ethyl, propyl, isopropyl, n-butyl, sec-butyl, isobutyl, tert-butyl, 2-ethylbutyl, n-pentyl, isopentyl, 1-methylpentyl, 1,3-dimethylbutyl, n-hexyl, 1-methylhexyl, n-heptyl, isoheptyl, 1,1,3,3-tetramethylbutyl, 1-methylheptyl, 3-methylheptyl, n-octyl, 2-ethylhexyl, 1,1,3-trimethylhexyl, 1,1,3,3-tetramethylpentyl, nonyl, decyl, undecyl, 1-methylundecyl, dodecyl, 1,1,3,3,5,5-hexamethylhexyl, tridecyl, tetradecyl, pentadecyl, hexadecyl, heptadecyl, octadecyl, eicosyl, docosyl and triacontyl. One of the preferred definitions of $E_1$, $E_8$, $E_{12}$, $E_{13}$, $E_{16}$, $E_{18}$, $E_{22}$, $E_{23}$, $E_{25}$, $E_{29}$, $R_{206}$, $R_{213}$, $R_{216}$, $R_{218}$, $R_{230}$ and $R_{232}$ is $C_1$-$C_4$alkyl, especially methyl. $R_{231}$ is preferably butyl.

Examples of alkoxy having up to 18 carbon atoms are methoxy, ethoxy, propoxy, isopropoxy, butoxy, isobutoxy, pentoxy, isopentoxy, hexoxy, heptoxy, octoxy, decyloxy, dodecyloxy, tetradecyloxy, hexadecyloxy and octadecyloxy. One of the preferred meanings of $E_1$ is octoxy. $E_{24}$ is preferably $C_1$-$C_4$alkoxy and one of the preferred meanings of $R_{206}$ is propoxy.

Examples of $C_5$-$C_{12}$cycloalkyl are cyclopentyl, cyclohexyl, cycloheptyl, cyclooctyl and cyclododecyl. $C_5$-$C_8$Cycloalkyl, especially cyclohexyl, is preferred.

$C_1$-$C_4$Alkyl-substituted $C_5$-$C_{12}$cycloalkyl is for example methylcyclohexyl or dimethylcyclohexyl.

Examples of $C_5$-$C_{12}$cycloalkoxy are cyclopentoxy, cyclohexoxy, cycloheptoxy, cyclooctoxy, cyclodecyloxy and cyclododecyloxy. $C_5$-$C_8$Cycloalkoxy, in particular cyclopentoxy and cyclohexoxy, is preferred.

—OH— and/or $C_1$-$C_{10}$alkyl-substituted phenyl is for example methylphenyl, dimethylphenyl, trimethylphenyl, tert-butylphenyl or 3,5-di-tert-butyl-4-hydroxyphenyl.

Examples of $C_7$-$C_9$phenylalkyl are benzyl and phenylethyl.

$C_7$-$C_9$phenylalkyl which is substituted on the phenyl radical by —OH and/or by alkyl having up to 10 carbon atoms is for example methylbenzyl, dimethylbenzyl, trimethylbenzyl, tert-butylbenzyl or 3,5-di-tert-butyl-4-hydroxybenzyl.

Examples of alkenyl having up to 10 carbon atoms are allyl, 2-methallyl, butenyl, pentenyl and hexenyl. Allyl is preferred. The carbon atom in position 1 is preferably saturated.

Examples of acyl containing not more than 8 carbon atoms are formyl, acetyl, propionyl, butyryl, pentanoyl, hexanoyl, heptanoyl, octanoyl, acryloyl, methacryloyl and benzoyl. $C_1$-$C_8$Alkanoyl, $C_3$-$C_8$alkenyl and benzoyl are preferred. Acetyl and acryloyl are especially preferred.

Examples of alkylene having up to 22 carbon atoms are methylene, ethylene, propylene, trimethylene, tetramethylene, pentamethylene, 2,2-dimethyltrimethylene, hexamethylene, trimethylhexamethylene, octamethylene and decamethylene.

An example of $C_3$-$C_{10}$alkylidene is the group

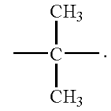

An example of $C_4$-$C_{10}$alkanetetrayl is 1,2,3,4-butanetetrayl.

An example of $C_5$-$C_7$cycloalkylene is cyclohexylene.

An example of $C_1$-$C_4$alkylenedi($C_5$-$C_7$cycloalkylene) is methylenedicyclohexylene.

An example of phenylenedi($C_1$-$C_4$alkylene) is methylene-phenylene-methylene or ethylene-phenylene-ethylene.

Where the radicals $R_{201}$, $R_{202}$ and $R_{203}$, together with the nitrogen atoms to which they are attached, form a 5- to 10-membered heterocyclic ring, this ring is for example

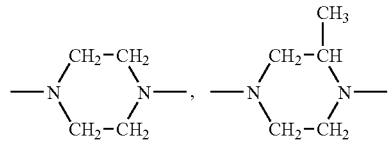

A 6-membered heterocyclic ring is preferred.

Where the radicals $R_{204}$ and $R_{205}$, together with the nitrogen atom to which they are attached, form a 5- to 10-membered heterocyclic ring, this ring is for example 1-pyrrolidyl, piperidino, morpholino, 1-piperazinyl, 4-methyl-1-piperazinyl, 1-hexahydroazepinyl, 5,5,7-trimethyl-1-homopiperazinyl or 4,5,5,7-tetramethyl-1-homopiperazinyl. Morpholino is particularly preferred.

One of the preferred definitions of $R_{219}$ and $R_{223}$ is phenyl. $R_{226}$ is preferably a direct bond.

$n_1$, $n_2$, $n_2{}^*$ and $n_4$ are preferably a number from 2 to 25, in particular 2 to 20.

$n_3$ is preferably a number from 1 to 25, in particular 1 to 20.

$b_1$ and $b_2$ are preferably a number from 2 to 25, in particular 2 to 20.

$b_3$ and $b_4$ are preferably a number from 1 to 25, in particular 1 to 20.

$b'_5$ and $b'''_5$ are preferably 3 and $b''_5$ is preferably 2.

The compounds described above are essentially known and commercially available. All of them can be prepared by known processes.

The preparation of the compounds is disclosed, for example, in U.S. Pat. No. 5,679,733, U.S. Pat. No. 3,640,928, U.S. Pat. No. 4,198,334, U.S. Pat. No. 5,204,473, U.S. Pat. No. 4,619,958, U.S. Pat. No. 4,110,306, U.S. Pat. No. 4,110, 334, U.S. Pat. No. 4,689,416, U.S. Pat. No. 4,408,051, U.S. Pat. No. 768,175 (Derwent 88-138,751/20), U.S. Pat. No. 5,049,604, U.S. Pat. No. 4,769,457, U.S. Pat. No. 4,356,307, U.S. Pat. No. 4,619,956, U.S. Pat. No. 5,182,390, GB-A-2, 269,819, U.S. Pat. No. 4,292,240, U.S. Pat. No. 5,026,849, U.S. Pat. No. 5,071,981, U.S. Pat. No. 4,547,538, U.S. Pat. No. 4,976,889, U.S. Pat. No. 4,086,204, U.S. Pat. No. 6,046, 304, U.S. Pat. No. 4,331,586, U.S. Pat. No. 4,108,829, U.S. Pat. No. 5,051,458, WO-A-94/12,544 (Derwent 94-177,274/22), DD-A-262,439 (Derwent 89-122,983/17), U.S. Pat. No. 4,857,595, U.S. Pat. No. 4,529,760, U.S. Pat. No. 4,477,615, CAS 136,504-96-6, U.S. Pat. No. 4,233,412, U.S. Pat. No. 4,340,534, WO-A-98/51,690 and EP-A-1,803.

The product (B-6) can be prepared analogously to known processes, for example by reacting a polyamine of formula (B-6-1) with cyanuric chloride in a molar ratio of from 1:2 to 1:4 in the presence of anhydrous lithium carbonate, sodium carbonate or potassium carbonate in an organic solvent such as 1,2-dichloroethane, toluene, xylene, benzene, dioxane or tert-amyl alcohol at a temperature of from −20° C. to +10° C., preferably from −10° C. to +10° C., in particular from 0° C. to +10° C., for from 2 to 8 hours, followed by reaction of the resultant product with a 2,2,6,6-tetramethyl-4-piperidylamine of the formula (B-6-2). The molar ratio of the 2,2,6, 6-tetramethyl-4-piperidylamine to polyamine of the formula (B-6-1) employed is for example from 4:1 to 8:1. The quantity of the 2,2,6,6-tetramethyl-4-piperidylamine can be added in one portion or in more than one portion at intervals of a few hours.

The molar ratio of polyamine of the formula (B-6-1) to cyanuric chloride to 2,2,6,6-tetramethyl-4-piperidylamine of the formula (B-6-2) is preferably from 1:3:5 to 1:3:6.

The following example indicates one way of preparing a preferred product (B-6-a).

Example: 23.6 g (0.128 mol) of cyanuric chloride, 7.43 g (0.0426 mol) of N,N'-bis[3-aminopropyl]ethylenediamine and 18 g (0.13 mol) of anhydrous potassium carbonate are reacted at 5° C. for 3 hours with stirring in 250 ml of 1,2-dichloroethane. The mixture is warmed at room temperature for a further 4 hours. 27.2 g (0.128 mol) of N-(2,2,6,6-tetramethyl-4-piperidyl)butylamine are added and the resultant mixture is warmed at 60° C. for 2 hours. A further 18 g (0.13 mol) of anhydrous potassium carbonate are added and the mixture is warmed at 60° C. for a further 6 hours. The solvent is removed by distillation under a slight vacuum (200 mbar) and replaced by xylene. 18.2 g (0.085 mol) of N-(2,2,6,6-tetramethyl-4-piperidyl)butylamine and 5.2 g (0.13 mol) of ground sodium hydroxide are added, the mixture is heated at reflux for 2 hours and, for a further 12 hours, the water formed during the reaction is removed by azeotropic distillation. The mixture is filtered. The solution is washed with water and dried over $Na_2SO_4$. The solvent is evaporated and the residue is dried at 120-130° C. in vacuo (0.1 mbar). The desired product is obtained as a colourless resin.

In general, the product (B-6) can, for example, be represented by a compound of the formula (B-6-α), (B-6-β) or (B-6-γ). It can also be in the form of a mixture of these three compounds.

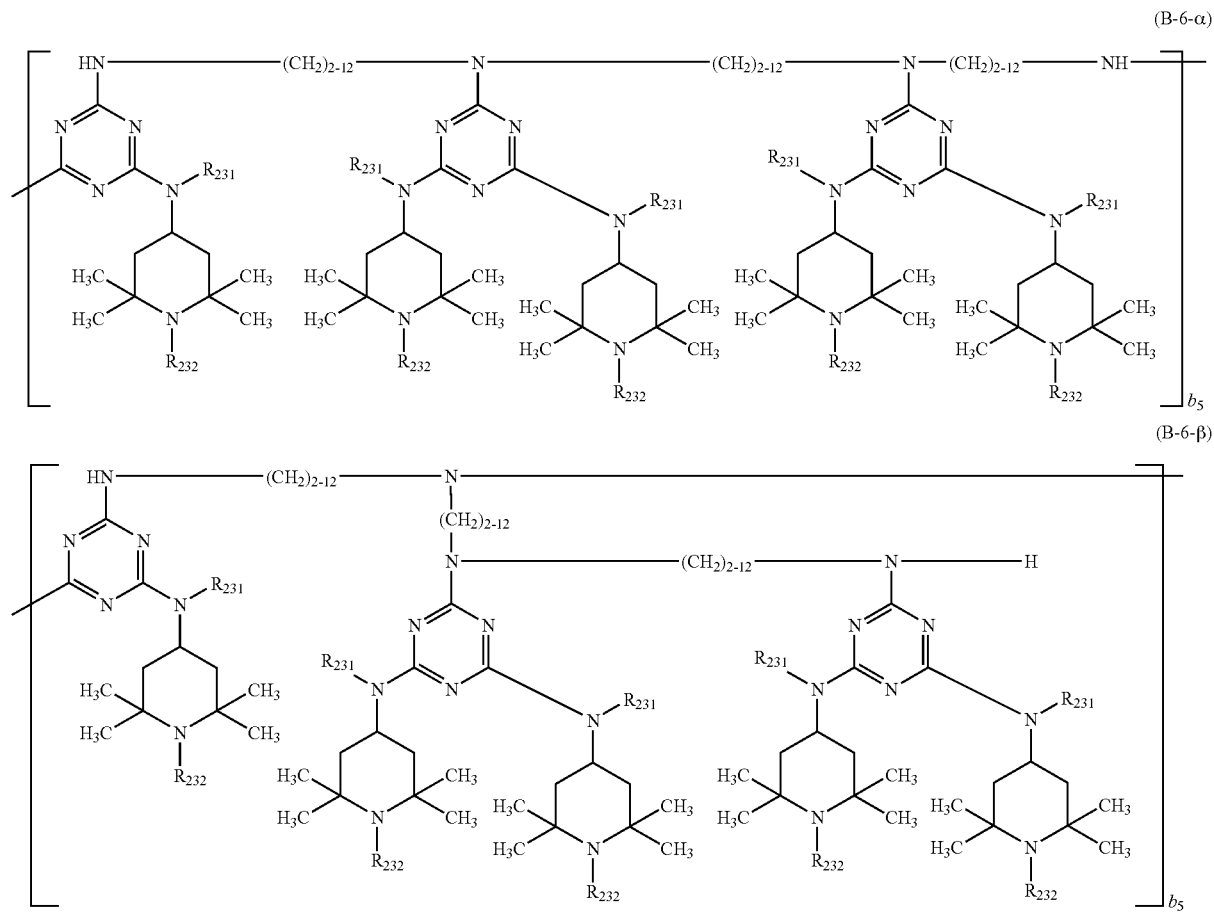

-continued
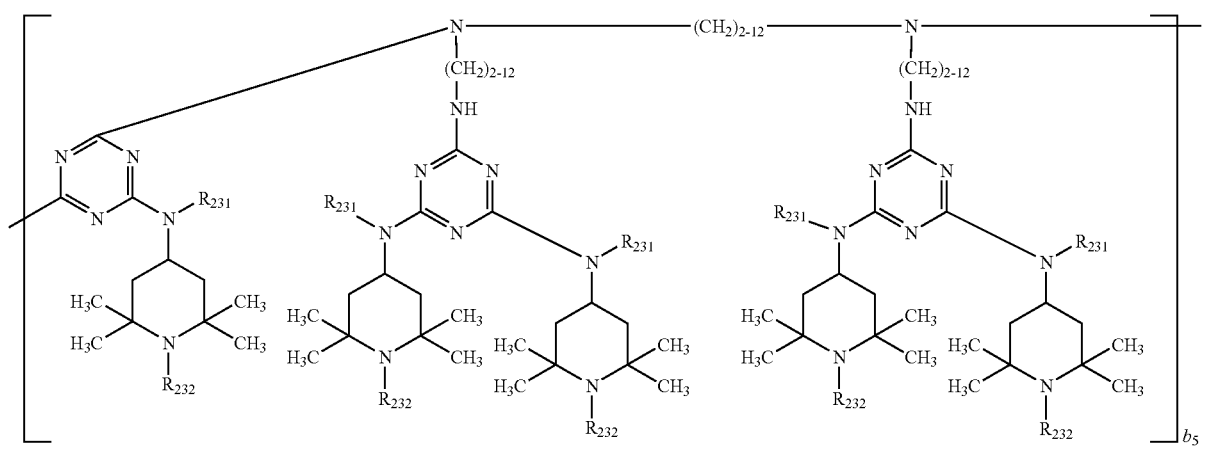
(B-6-γ)
A preferred meaning of the formula (B-6-α) is
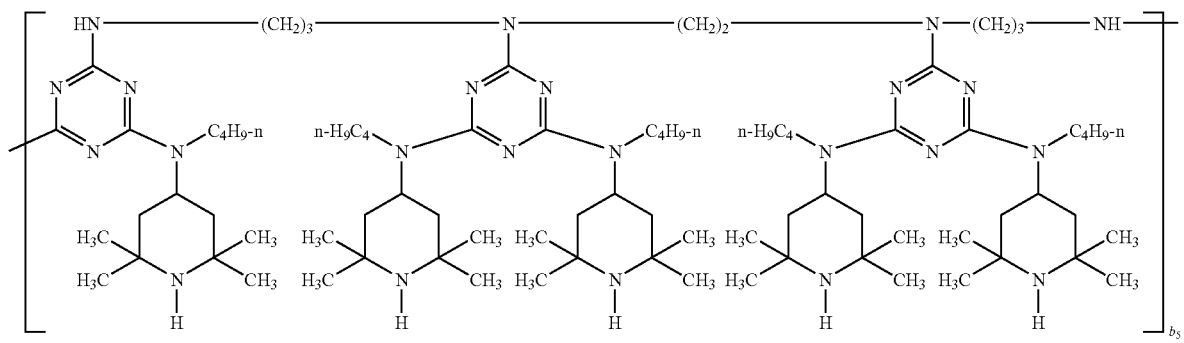
A preferred meaning of the formula (B-6-β) is
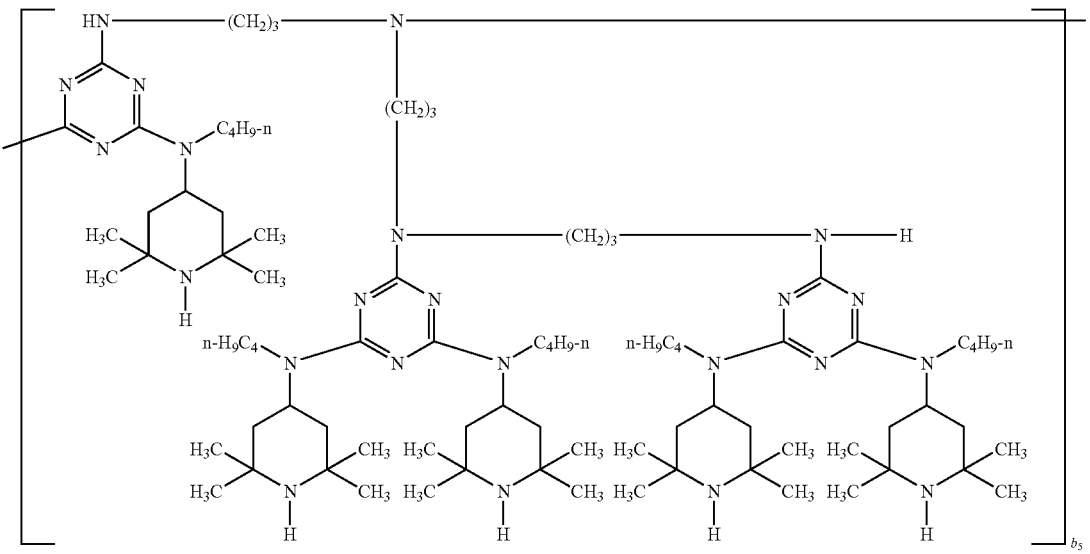

A preferred meaning of the formula (B-6-γ) is

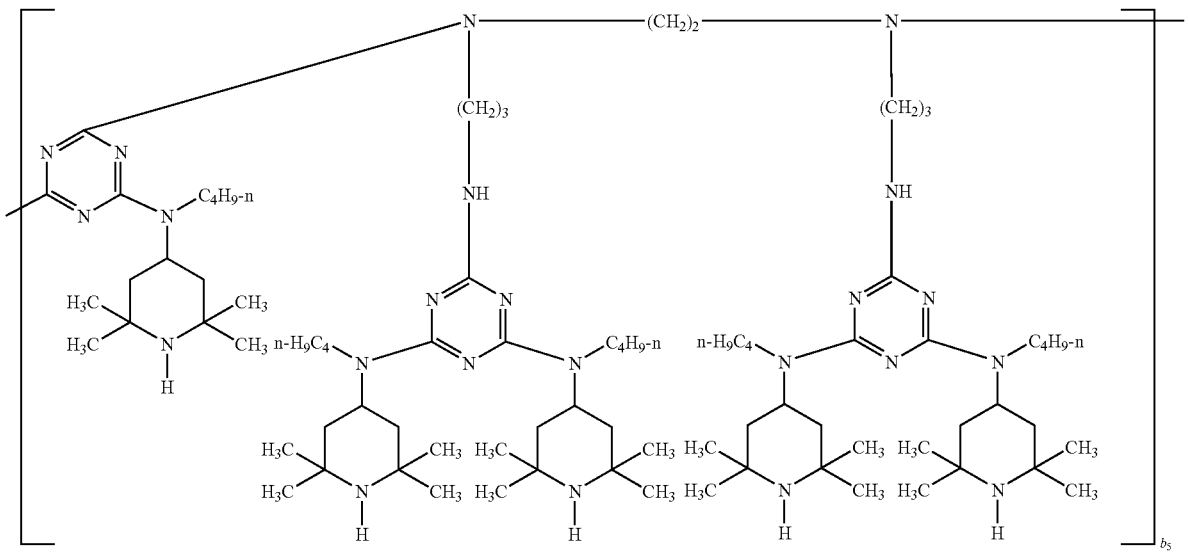

In the above formulae (B-6-α) to (B-6-γ), $b_5$ is preferably 2 to 20, in particular 2 to 10.

The sterically hindered amine compounds of component (c) are preferably selected from the group consisting of the following commercial products: DASTIB 845®, TINUVIN 770®, TINUVIN NOR 371®, TINUVIN 765®, TINUVIN 144®, TINUVIN 123®, TINUVIN 111®, TINUVIN 783®, TINUVIN 791®, MARK LA 52®, MARK LA 57®, MARK LA 62®, MARK LA 67®, HOSTAVIN N 20®, HOSTAVIN N 24®, SANDUVOR 3050®, SANDUVOR 3053®, SANDUVOR 3058®, DIACETAM 5®, SUMISORB™61®, UVINUL 4049®, SANDUVOR PR 31®, GOODRITE UV 3034®, GOODRITE UV 3150®, GOODRITE UV 3159®, GOODRITE 3110x128®, UVINUL 4050H®, CHIMASSORB 944®, CHIMASSORB 2020®, CYASORB UV 3346®, CYASORB UV 3529®, DASTIB 1082®, CHIMASSORB 119®, UVASIL 299®, UVASIL 125®, UVASIL 2000®, UVINUL 5050H®, LICHTSCHUTZSTOFF UV 31®, LUCHEM HA B 18®, MARK LA 63®, MARK LA 68®, UVASORB HA 88®, TINUVIN 622®, HOSTAVIN N 30® and FERRO AM 806®.

Particularly preferred are TINUVIN 770®, TINUVIN NOR 371®, TINUVIN 791®, TINUVIN 622®, TINUVIN 783®, CHIMASSORB 944®, CHIMASSORB 2020® and CHIMASSORB 119®.

Most preferred are Tinuvin 770®, TINUVIN 292®, TINUVIN 123®, TINUVIN 152®, TINUVIN NOR 371® and TINUVIN 791®.

The meanings of the terminal groups which saturate the free valences in the compounds of the formulae (B-1), (B-3), (B-4), (B-5), (B-6-α), (B-6-β), (B-6-γ), (B-7), (B-8-a), (B-8-b) and (B-10) depend on the processes used for their preparation. The terminal groups can also be modified after the preparation of the compounds.

If the compounds of the formula (B-1) are prepared by reacting a compound of the formula

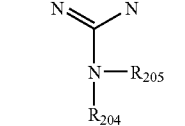

in which X is, for example, halogen, in particular chlorine, and $R_{204}$ and $R_{205}$ are as defined above, with a compound of the formula

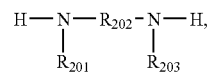

in which $R_{201}$, $R_{202}$ and $R_{203}$ are as defined above, the terminal group bonded to the diamino radical is hydrogen or

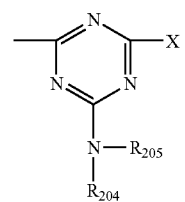

and the terminal group bonded to the triazine radical is X or

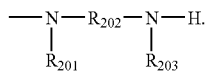

If X is halogen, it is advantageous to replace this, for example, by —OH or an amino group when the reaction is complete. Examples of amino groups which may be mentioned are pyrrolidin-1-yl, morpholino, —NH$_2$, —N(C$_1$-C$_8$ alkyl)$_2$ and —NR(C$_1$-C$_8$alkyl), in which R is hydrogen or a group of the formula (b-I).

The compounds of the formula (B-1) also cover compounds of the formula

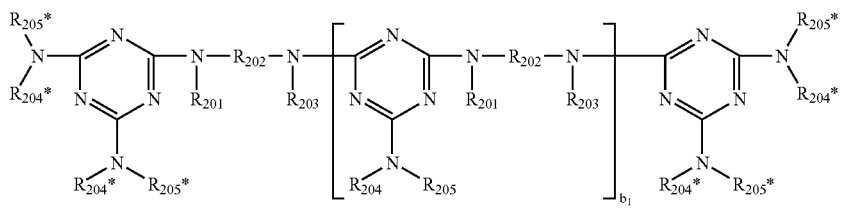

wherein R$_{201}$, R$_{202}$, R$_{203}$, R$_{204}$, R$_{205}$ and b$_1$ are as defined above and R$_{204}$* has one of the meanings of R$_{204}$ and R$_{205}$* has one of the meanings of R$_{205}$.

One of the particularly preferred compounds of the formula (B-1) is

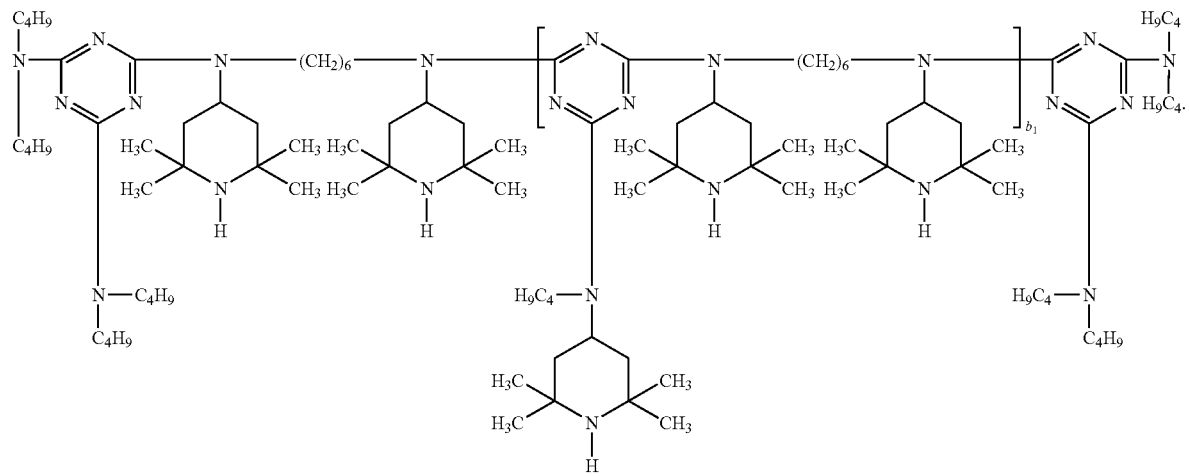

The preparation of this compound is described in Example 10 of U.S. Pat. No. 6,046,304.

In the compounds of the formula (B-3), the terminal group bonded to the silicon atom can be, for example, (R$_{14}$)$_3$Si—O—, and the terminal group bonded to the oxygen can be, for example, —Si(R$_{14}$)$_3$.

The compounds of the formula (B-3) can also be in the form of cyclic compounds if b$_2$ is a number from 3 to 10, i.e. the free valences shown in the structural formula then form a direct bond.

In the compounds of the formula (B-4), the terminal group bonded to the 2,5-dioxopyrrolidine ring is, for example, hydrogen, and the terminal group bonded to the —C(R$_{223}$)(R$_{224}$)— radical is, for example,

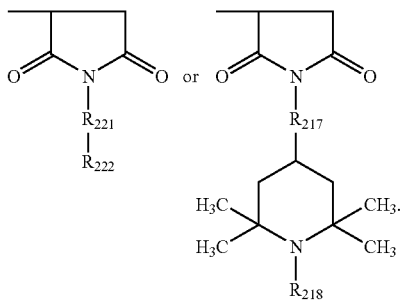

In the compounds of the formula (B-5), the terminal group bonded to the carbonyl radical is, for example,

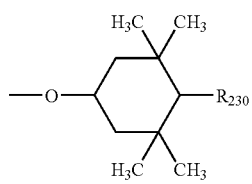

and the terminal group bonded to the oxygen radical is, for example,

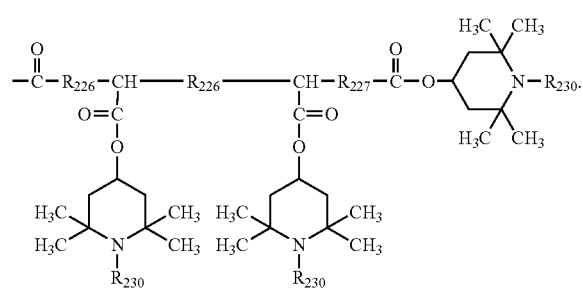

In the compounds of the formulae (B-6-α), (B-6-β) and (B-6-γ), the terminal group bonded to the triazine radical is, for example, Cl or a

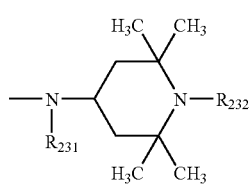

group, and the terminal group bonded to the amino radical is, for example, hydrogen or a

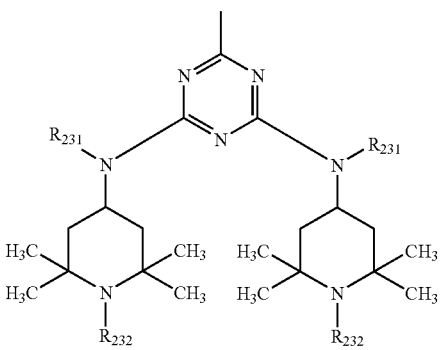

group.

If the compounds of the formula (B-7) are prepared, for example, by reacting a compound of the formula

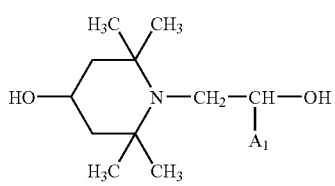

in which $A_1$ is hydrogen or methyl, with a dicarboxylic acid diester of the formula Y—OOC-$A_2$-COO—Y, in which Y is, for example, methyl, ethyl or propyl, and $A_2$ is as defined above, the terminal group bonded to the 2,2,6,6-tetramethyl-4-oxypiperidin-1-yl radical is hydrogen or —CO-$A_2$-COO—Y, and the terminal group bonded to the diacyl radical is —O—Y or

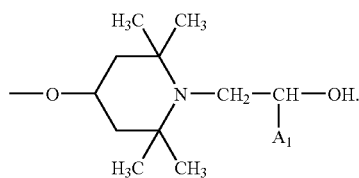

In the compounds of the formula (B-8-a), the terminal group bonded to the nitrogen can be, for example, hydrogen and the terminal group bonded to the 2-hydroxypropylene radical can be, for example, a

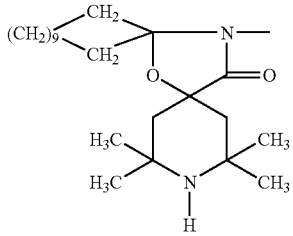

group.

In the compounds of the formula (B-8-b), the terminal group bonded to the dimethylene radical can be, for example, —OH, and the terminal group bonded to the oxygen can be, for example, hydrogen. The terminal groups can also be polyether radicals.

In the compounds of the formula (B-10), the end group bonded to the —CH₂— residue can be, for example, hydrogen and the end group bonded to the —CH(CO₂A₇) residue can be, for example, —CH═CH—COOA₇.

Specific examples for the sterically hindered amines are bis(2,2,6,6-tetramethyl-4-piperidyl)sebacate, bis(2,2,6,6-tetramethyl-4-piperidyl)succinate, bis(1,2,2,6,6-pentamethyl-4-piperidyl)sebacate, bis(1-octyloxy-2,2,6,6-tetramethyl-4-piperidyl)sebacate, bis(1,2,2,6,6-pentamethyl-4-piperidyl)n-butyl-3,5-di-tert-butyl hydroxybenzylmalonate, the condensate of 1-(2-hydroxyethyl)-2,2,6,6-tetramethyl-4-hydroxypiperidine and succinic acid, linear or cyclic condensates of N,N'-bis(2,2,6,6-tetramethyl-4-piperidyl)hexamethylenediamine and 4-tert-octylamino-2,6-dichloro-1,3,5-triazine, tris(2,2,6,6-tetramethyl-4-piperidyl)nitrilotriacetate, tetrakis(2,2,6,6-tetramethyl-4-piperidyl)-1,2,3,4-butane-tetracarboxylate, 1,1'-(1,2-ethanediyl) bis(3,3,5,5-tetramethylpiperazinone), 4-benzoyl-2,2,6,6-tetramethylpiperidine, 4-stearyloxy-2,2,6,6-tetramethylpiperidine, bis(1,2,2,6,6-pentamethylpiperidyl)-2-n-butyl-2-(2-hydroxy-3,5-di-tert-butylbenzyl)malonate, 3-n-octyl-7,7,9,9-tetramethyl-1,3,8-triazaspiro[4.5]decan-2,4-dione, bis(1-octyloxy-2,2,6,6-tetramethylpiperidyl)succinate, linear or cyclic condensates of N,N'-bis-(2,2,6,6-tetramethyl-4-piperidyl)hexamethylenediamine and 4-morpholino-2,6-dichloro-1,3,5-triazine, the condensate of 2-chloro-4,6-bis(4-n-butylamino-2,2,6,6-tetramethylpiperidyl)-1,3,5-triazine and 1,2-bis(3-aminopropylamino)ethane, the condensate of 2-chloro-4,6-di-(4-n-butylamino-1,2,2,6,6-pentamethylpiperidyl)-1,3,5-triazine and 1,2-bis-(3-aminopropylamino)ethane, 8-acetyl-3-dodecyl-7,7,9,9-tetramethyl-1,3,8-triazaspiro[4.5]-decane-2,4-dione, 3-dodecyl-1-(2,2,6,6-tetramethyl-4-piperidyl)pyrrolidin-2,5-dione, 3-dodecyl-1-(1,2,2,6,6-pentamethyl-4-piperidyl)pyrrolidine-2,5-dione, a mixture of 4-hexadecyloxy- and 4-stearyloxy-2,2,6,6-tetramethylpiperidine, a condensation product of N,N'-bis(2,2,6,6-tetramethylpiperidyl)hexamethylenediamine and 4-cyclohexylamino-2,6-dichloro-1,3,5-triazine, a condensation product of 1,2-bis(3-aminopropylamino) ethane and 2,4,6-trichloro-1,3,5-triazine as well as 4-butylamino-2,2,6,6-tetramethylpiperidine (CAS Reg. No. [136504-96-6]); N-(2,2,6,6-tetramethyl-4-piperidyl)-n-dodecylsuccinimide, N-(1,2,2,6,6-pentamethyl-4-piperidyl)-n-dodecylsuccinimide, 2-undecyl-7,7,9,9-tetramethyl-1-oxa-3,8-diaza-4-oxo-spiro[4,5]decane, a reaction product of 7,7,9,9-tetramethyl-2-cycloundecyl-1-oxa-3,8-diaza-4-oxospiro[4,5]decane und epichlorohydrin, 1,1-bis(1,2,2,6,6-pentamethyl-4-piperidyloxycarbonyl)-2-(4-methoxyphenyl) ethene, N,N'-bis-formyl-N,N'-bis(2,2,6,6-tetramethyl-4-piperidyl)hexamethylenediamine, diester of 4-methoxymethylene-malonic acid with 1,2,2,6,6-pentamethyl-4-hydroxypiperidine, poly[methylpropyl-3-oxy-4-(2,2,6,6-tetramethyl-4-piperidyl)]siloxane and reaction product of maleic acid anhydride-α-olefin-copolymer with 2,2,6,6-tetramethyl-4-aminopiperidine, 1,2,2,6,6-pentamethyl-4-aminopiperidine, 2,4-bis[N-(1-cyclohexyloxy-2,2,6,6-tetramethylpiperidine-4-yl)-N-butyl-amino]-6-(2-hydroxyethyl)-amino-1,3,5-triazine, 1-(2-Hydroxy-2-methylpropoxy)-4-octadecanoyloxy-2,2,6,6-tetramethylpiperidine, 5-(2-ethylhexanoyl)oxymethyl-3,3,5-trimethyl-2-morpholinone or a compound

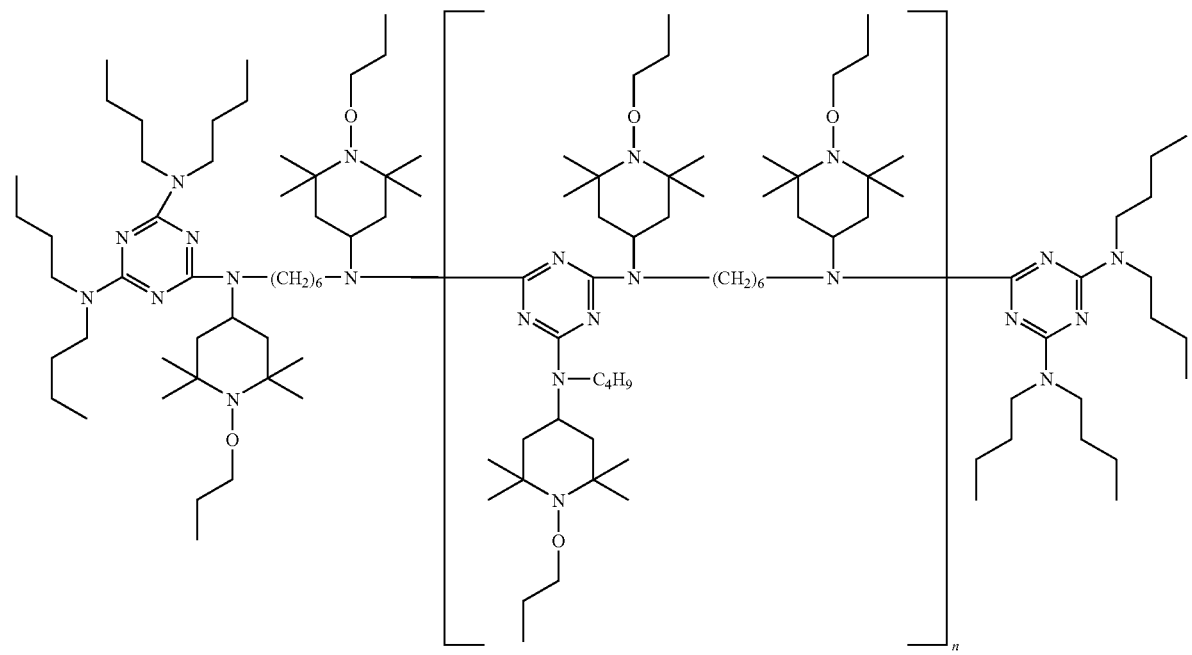

in which n is from 1 to 15, disclosed in example 2 of U.S. Pat. No. 6,117,995.

The sterically hindered amines mentioned above are known and are largely items of commerce.

A further aspect of the invention is a process for the preparation of a concentrated aqueous polymer dispersion with an average particle size of less than 1000 nm comprising the step polymerizing at least one ethylenically unsaturated monomer in the presence of a non-polar organic light stabilizer by heterophase radical polymerization;

wherein the weight ratio of non-polar organic light stabilizer to polymer carrier formed from the ethylenically unsaturated monomer is greater than 50 parts of light stabilizer per 100 parts of polymer carrier.

In a specific embodiment of the invention the process for the preparation of a concentrated aqueous polymer dispersion comprises the steps
- a) dissolving, emulsifying or dispersing a non-polar organic light stabilizer in at least one ethylenically unsaturated monomer;
- b) preparing a conventional oil in water emulsion of said light stabilizer dissolved, emulsified or dispersed in at least one ethylenically unsaturated monomer;
- c) homogenizing the conventional emulsion to a miniemulsion wherein the droplets of the organic phase have an average diameter below 1000 nm;
- d) polymerizing the miniemulsion by adding a polymerization initiator;

wherein the weight ratio of non-polar organic light stabilizer to polymer carrier formed from the ethylenically unsaturated monomer is greater than 50 parts of light stabilizer per 100 parts of polymer carrier.

In step b) preferably a non-ionic, cationic or anionic surfactant is additionally present.

In general anionic and non-ionic surfactants are preferred.

Optionally other water miscible solvents may be present usually less than 10% by weight based on the water content. Exemplary cosolvents useful in the present invention may be selected from the group consisting of aliphatic alcohols, glycols, ethers, glycol ethers, pyrrolidines, N-alkyl pyrrolidinones, N-alkyl pyrrolidones, polyethylene glycols, polypropylene glycols, amides, carboxylic acids and salts thereof, esters, organosulfides, sulfoxides, sulfones, alcohol derivatives, hydroxyether derivatives such as butyl carbitol or cellosolve, amino alcohols, ketones, and the like, as well as derivatives thereof and mixtures thereof. Specific examples include methanol, ethanol, propanol, dioxane, ethylene glycol, propylene glycol, diethylene glycol, glycerol, dipropylene glycol, tetrahydrofuran, and other water-soluble or water-miscible materials, and mixtures thereof.

Preferred are water, water alcohol mixtures, water ethylene glycol or propylene glycol mixtures, water acetone, water tetrahydrofurane, or water dimethylformamide mixtures.

Suitable surfactants or surface active compounds, which may be added are known in the art. The amounts typically used range from 0.01% by weight to 10% by weight, based on the monomer or monomers.

Typical surfactants useful in the present invention are of nonionic, cationic or anionic type.

Examples for anionic surfactants are alkali and ammonium salts of $C_{12}$-$C_{18}$alkylsulfonic acid, dialkyl esters of succinic acid or sulfuric acid halfesters of ethoxylated alkanoles. These compounds are known for example from U.S. Pat. No. 4,269,749 and largely items of commerce, such as under the trade name Dowfax® 2A1 (Dow Chemical Company).

Nonionic surfactants are for example aliphatic or araliphatic compounds such as ethoxylated phenols (mon, di, tri) with an ethoxylation degree of 3 to 50 and alkyl groups in the range from $C_4$-$C_9$, ethoxylated long chain alcohols or polyethyleneoxide/polypropyleneoxide block copolymers.

Furthermore protective colloids such as polyvinylalcohols, starch, cellulose derivatives or copolymers containing vinylpyrrolidone may be added to form a conventional oil in water emulsion according to step b). Further examples are given in "Houben-Weyl, Methoden der Organischen Chemie, Band XIV/1, Makromolekulare Stoffe, G. Thieme Verlag Stuttgart 1961, 411-420".

The homogenization step b) and c) is usually carried out by applying mechanical agitation (rotor/stator disperser) followed by using high force dispersion devices like for example a ultrasonic sound equipment (J. Dispersion Sci. Technology 2002, 23(1-3), 333-349) or a high pressure homogenizer (APV Gaulin homogenizer; Microfluidizer) The emulsification/homogenization can be carried out continuously or batchwise. Apparatus for this purpose are known in the art. This is for example described in U.S. Pat. No. 5,108,654.

The polymerization step d) is carried out by adding a free radical polymerization initiator.

Preferably the free radical initiator is present in an amount of from 0.01 weight-% to 20 weight-%, more preferably from 0.1 weight-% to 10 weight-% and most preferably from 0.2 weight-% to 5 weight-%, based on the monomer or monomer mixture.

The polymerization initiator may be added batchwise or continuously to the reaction mixture.

Preferably the free radical initiator of component b) is a bis-azo compound, a peroxide or a hydroperoxide.

Specific preferred radical sources are 2,2'-azobisisobutyronitrile, 2,2'-azobis(2-methyl-butyronitrile), 2,2'-azobis(2,4-dimethylvaleronitrile), 2,2'-azobis(4-methoxy-2,4-dimethylvaleronitrile), 1,1'-azobis(1-cyclohexanecarbonitrile), 2,2'-azobis(isobutyramide)dihydrate, 2-phenylazo-2,4-dimethyl-4-methoxyvaleronitrile, dimethyl-2,2'-azobisisobutyrate, 2-(carbamoylazo)isobutyronitrile, 2,2'-azobis(2,4,4-trimethylpentane), 2,2'-azobis(2-methylpropane), 2,2'-azobis(N,N'-dimethyleneisobutyramidine), free base or hydrochloride, 2,2'-azobis(2-amidinopropane), free base or hydrochloride, 2,2'-azobis{2-methyl-N-[1,1-bis(hydroxymethyl)ethyl]propionamide} or 2,2'-azobis{2-methyl-N-[1,1-bis(hydroxymethyl)-2-hydroxyethyl]propionamide; acetyl cyclohexane sulphonyl peroxide, diisopropyl peroxy dicarbonate, t-amyl perneodecanoate, t-butyl perneodecanoate, t-butyl perpivalate, t-amylperpivalate, bis(2,4-dichlorobenzoyl)peroxide, diisononanoyl peroxide, didecanoyl peroxide, dioctanoyl peroxide, dilauroyl peroxide, bis(2-methylbenzoyl) peroxide, disuccinic acid peroxide, diacetyl peroxide, dibenzoyl peroxide, t-butyl per 2-ethylhexanoate, bis-(4-chlorobenzoyl)-peroxide, t-butyl perisobutyrate, t-butyl permaleinate, 1,1-bis(t-butylperoxy) 3,5,5-trimethylcyclohexane, 1,1-bis (t-butylperoxy)cyclohexane, t-butyl peroxy isopropyl carbonate, t-butyl perisononaoate, 2,5-dimethylhexane 2,5-dibenzoate, t-butyl peracetate, t-amyl perbenzoate, t-butyl perbenzoate, 2,2-bis(t-butylperoxy)butane, 2,2 bis (t-butylperoxy)propane, dicumyl peroxide, 2,5-dimethylhexane-2,5-di-t-butylperoxide, 3-t-butylperoxy 3-phenylphthalide, di-t-amyl peroxide, α,α'-bis(t-butylperoxy isopropyl)benzene, 3,5-bis(t-butylperoxy)3,5-dimethyl 1,2-dioxolane, di-t-butyl peroxide, 2,5-dimethylhexyne-2,5-di-t-butylperoxide, 3,3,6, 6,9,9-hexamethyl 1,2,4,5-tetraoxa cyclononane, p-menthane hydroperoxide, pinane hydroperoxide, diisopropylbenzene mono-α-hydroperoxide, cumene hydroperoxide or t-butyl hydroperoxide.

It is also possible to use combinations of Fe-compounds or Co-compounds with peroxo salts or salts of bisulfites or hydrosulfites. These combinations are known as redox systems.

The polymerization temperature depends on the initiator used. Usually the polymerization temperature is in the range of 5° C. to 95° C. and preferably from 30° C. to 90°. If pressure is applied the temperature can raise up to 120° C., however, polymerization under normal pressure is the usual process.

Alternatively the polymerization can be initiated by photoinitiators and electromagnetic radiation, in particular actinic radiation.

Photoinitiators suitable for use in the process according to the invention are in principle any compounds and mixtures that form one or more free radicals when irradiated with electromagnetic waves. These include initiator systems consisting of a plurality of initiators and systems that function independently of one another or synergistically. In addition to coinitiators, for example amines, thiols, borates, enolates, phosphines, carboxylates and imidazoles, it is also possible to use sensitisers, for example acridines, xanthenes, thiazenes, coumarins, thioxanthones, triazines and dyes. A description of such compounds and initiator systems can be found e.g. in Crivello J. V., Dietliker K. K., (1999): Chemistry & Technology of UV & EB Formulation for Coatings, Inks & Paints, and in Bradley G. (ed.) Vol. 3: Photo-initiators for Free Radical and Cationic Polymerisation 2nd Edition, John Wiley & Son Ltd. The photoinitiator suitable for the process according to the invention in step b) may be either an initiator having an unsaturated group or an initiator not having such a group Such compounds and derivatives are derived, for example, from the following classes of compounds: benzoins, benzil ketals, acetophenones, hydroxyalkylphenones, aminoalkylphenones, acylphosphine oxides, acylphosphine sulfides, acyloxyiminoketones, alkylamino-substituted ketones, such as Michler's ketone, peroxy compounds, dinitrile compounds, halogenated acetophenones, phenylglyoxylates, dimeric phenylglyoxalates, benzophenones, oximes and oxime esters, thioxanthones, coumarins, ferrocenes, titanocenes, onium salts, sulfonium salts, iodonium salts, diazonium salts, borates, triazines, bisimidazoles, polysilanes and dyes. It is also possible to use combinations of the compounds from the mentioned classes of compounds with one another and combinations with corresponding coinitiator systems and/or sensitisers.

Surprisingly it has been found that after polymerization has been completed, the volatile components, water mainly, can be removed without agglomeration of the particles. The polymer particles can therefore readily be re-dispersed, if desired.

Vaporization of the volatile components can be carried out using standard methods, such as for example spray drying.

Consequently another aspect of the invention is a polymer powder obtainable by vaporizing the volatile components of the concentrated aqueous polymer dispersion as described above.

The polymer powder containing highly concentrated light stabilizers can be used for example in the formulation of powder coatings or for plastic applications in mold, blow mold or extrusion processes.

The instant invention pertains further to a composition stabilized against thermal, oxidative or light-induced degradation which comprises,
  (a) an organic material susceptible to thermal, oxidative or light induced degradation, and
  (b) a concentrated aqueous polymer dispersion as described above.

For instance the organic material is a recording material.

For example the recording material is a photographic material or an ink jet material.

In another embodiment of the invention the recording material is a printed material containing the concentrated aqueous polymer dispersion in an overprint varnish.

Materials to be stabilized with the instant novel polymer dispersions are for example recording materials. By such materials are meant, for example, those described in Research Disclosure 1990, 31429 (pages 474-480) for photographic reproduction and other reprographic techniques.

The recording materials comprise, for example, those for pressure-sensitive copying systems, microcapsule photocopier systems, heat-sensitive copier systems, photographic material and ink-jet printing.

The recording materials feature an unexpectedly high quality, especially in terms of their light stability.

The recording materials have a structure which is known per se and which corresponds to the utility. They consist of a base, for example paper or plastic film, on which one or more coatings are applied. Depending on the type of material, these coats contain the suitable components required, in the case of photographic material for example silver halide emulsions, colour couplers, dyes and the like. The material intended especially for ink-jet printing has a customary base on which there is an absorption layer suitable for ink. Uncoated paper can likewise be employed for ink-jet printing; in this case, the paper functions simultaneously as a base and has the absorbent for the ink. Suitable material for ink-jet printing is described, inter alia, in U.S. Pat. No. 5,073,448, the disclosure content of which is regarded as part of the present description.

The recording material can also be transparent, for example in the case of projection films.

The polymer dispersions can be incorporated into the material even in the course of manufacture; in papermaking, for example, by addition to the pulp. Another method of use is the spraying of the material or the addition thereof to the coating.

Coatings for transparent recording materials for projection must not contain any light-scattering particles such as pigments or fillers.

The colour-binding coatings can contain further additives, for example antioxidants, light stabilizers, viscosity improvers, brighteners, biocides and/or antistats.

The coating is usually prepared as follows:

The water-soluble components, for example the binder, are dissolved in water and mixed. The solid components, for example fillers and other additives as already described, are dispersed in this aqueous medium. Dispersion is advantageously brought about with the aid of equipment such as ultrasonic devices, turbine agitators, homogenizers, colloid mills, bead mills, sand mills, high-speed stirrers and the like. A particular advantage of the instant polymer dispersions is their ease of incorporation into the coating.

As mentioned, the recording materials cover a broad field of use. The polymer dispersions can be employed, for example, in pressure-sensitive copier systems. They can be added to the paper to protect the microencapsulated dye precursors against light, or to the binder of the developer layer for protecting the dyes formed therein.

Photocopier systems with light-sensitive microcapsules which are developed by pressure are described, inter alia, in U.S. Pat. Nos. 4,416,966; 4,483,912; 4,352,200; 4,535,050; 4,5365,463; 4,551,407; 4,562,137 and 4,608,330; and also in EP-A-139,479; EP-A-162,664; EP-A-164,931; EP-A-237,024; EP-A-237,025 and EP-A-260,129. In all these systems the polymer dispersions can be added to the colour-accepting layer. Alternatively, they can be added to the donor layer for protecting the colour formers against light.

The polymer dispersions can also be employed in recording materials which are based on the principle of photopolymerization, photosoftening or the rupture of microcapsules, or when heat-sensitive or photosensitive diazonium salts, leuco dyes with oxidizing agent or colour lactones with Lewis acids are used.

Heat-sensitive recording material exploits the colour-imparting reaction between a colourless or weakly coloured base dye and an organic or inorganic colour developer, the recorded image being produced by heat-induced contact of the two materials. This type of heat-sensitive recording material is very widespread, not only as the recording medium for faxes, computers, etc., but also in many other fields, for example in label printing.

The heat-sensitive recording material is composed of a base, a heat-sensitive colour-forming recording layer on this base, and, optionally, a protective layer on the heat-sensitive, colour-forming recording layer. The heat-sensitive, colour-forming recording layer contains as its principal constituent a colour-imparting compound and a colour-developing compound, and also a polymer dispersions according to the instant invention. If the said protective layer is present, the polymer dispersions can also be incorporated into the protective layer.

Heat-sensitive recording materials are described, for example, in JP-A 8-267 915.

Further fields of use are recording materials for dye diffusion transfer printing, thermal wax transfer printing and dot matrix printing, and for use with electrostatic, electrographic, electrophoretic, magnetographic and laser-electrophotographic printers, recorders or plotters. Of the materials mentioned, preference is given to recording materials for dye diffusion transfer printing, as are described, for example, in EP-A-507,734.

The polymer dispersions can also be employed in inks, preferably for ink-jet printing, for example those as described in U.S. Pat. No. 5,098,477, the disclosure content of which is regarded as part of the present description. The ink, especially for ink-jet printing, contains preferably water. Inks contain the polymer dispersions usually in a concentration of from 0.01 to 20% by weight, in particular from 0.5 to 10% by weight.

Examples of colour photographic materials are colour negative films, colour reversal films, colour positive films, colour photographic paper, colour reversal photographic paper, colour-sensitive materials for the dye diffusion transfer process or the silver dye bleach process.

Examples of suitable bases for the production of colour photographic materials are films and sheets of semisynthetic and synthetic polymers, such as cellulose nitrate, cellulose acetate, cellulose butyrate, polystyrene, polyvinyl chloride, polyethylene terephthalate and polycarbonate, and paper laminated with a barytes layer or an $\alpha$-olefin polymer layer (e.g. polyethylene). These bases can have been coloured with dyes or pigments, for example titanium dioxide. They can also have been coloured black for the purposes of light shielding. The surface of the base is generally subjected to a treatment for improving the adhesion of the photographic emulsion layer, for example corona discharge with subsequent application of a substrate layer.

The recording material preferably comprises the silver halide emulsion layers starting from the base, in the sequence blue-sensitive, green-sensitive and red-sensitive layer. In the colour photographic material the polymer dispersion is preferably in a layer above the green-sensitive layer, particularly preferably in a layer above the silver halide emulsion layer(s).

The polymer dispersion is preferably present in the photographic material in an amount of from 0.001 to 10 g per $m^2$, for example from 0.1 to 8 $g/m^2$, especially from 0.005 to 6 and, in particular, from 0.01 to 4 $g/m^2$.

Preference is generally given to a photographic recording material comprising the polymer dispersion in a layer above the silver halide emulsion layer(s). Preference is also given to photographic recording material comprising at least one each of a red-sensitive and green-sensitive silver halide emulsion layer and, in between them, an interlayer, where at least one of the instant polymer dispersions is present in the interlayer between the red-sensitive and the green-sensitive silver halide emulsion layer. Very particularly preferred photographic recording material comprises at least one each of a red-sensitive, a green-sensitive and a blue-sensitive silver halide emulsion layer and also at least two interlayers between the aforementioned layers and a protective layer, where at least one of the instant polymer dispersions is present in at least one layer above the green-sensitive silver halide emulsion layer, and the silver halide emulsion layers contain dark-storage stabilizers and/or light stabilizers.

Essential constituents of the colour-photographic emulsion layers are binders, silver halide particles and colour couplers.

Of especial interest, for example, is a colour photographic recording material comprising, on a base, at least one blue-sensitive silver halide emulsion layer containing at least one yellow coupler, at least one green-sensitive silver halide emulsion layer containing at least one magenta coupler, at least one red-sensitive silver halide emulsion layer containing at least one cyan coupler, and customary top layer(s) and interlayer(s), at least one of the layers comprising a polymer dispersion according to the instant invention.

The photographic emulsions can be spectrally sensitized using methine dyes or other dyes. Particularly suitable dyes are cyanine dyes and merocyanine dyes, including complex merocyanine dyes.

An overview of the polymethine dyes which are suitable as spectral sensitizers, their appropriate combinations and supersensitizing combinations is given in Research Disclosure 17643 (December 1978), Chapter IV.

The differently sensitized emulsion layers are allocated non-diffusing monomeric or polymeric colour couplers, which may be located in the same layer or in an adjacent layer. It is common to assign cyan couplers to the red-sensitive layers, magenta couplers to the green-sensitive layers and yellow couplers to the blue-sensitive layers.

Preferred is a composition wherein the organic material is an adhesive, an aqueous emulsion of a natural or synthetic rubber, a water based ink or a water based coating.

In step (ii) preferably a non-ionic, cationic or anionic surfactant is present.

Preferably the amount of component b) is from 0.1 to 40%, in particular from 0.1 to 20% and especially from 0.1 to 10% by weight based on the weight of the solid content of component a).

For very thin film applications the amount of component b) may be as high as 60% by weight based on the weight of the solid content of component a).

Adhesives are preferably selected from the group consisting of polyurethanes, polyacrylics, epoxys, phenolics, polyimides, poly(vinyl butyral), polycyanoacrylates, polyacrylates, ethylene/acrylic acid copolymers and their salts (ionomers), silicon polymers, poly(ethylene/vinyl acetate), atatic polypropylene, styrene-diene copolymers, polyamides, hydroxyl-terminated polybutadiene, polychloroprene, poly(vinyl acetate), carboxylated styrene/butadiene copolymers and poly(vinyl alcohol).

Aqueous emulsions of natural or synthetic rubber, are for example natural latex or latices of carboxylated styrene/butadiene copolymers.

The concentrated aqueous polymer dispersions can also be employed in inks, preferably for ink jet printing.

When water-soluble, water miscible or water dispersible coatings are desired ammonium salts of acid groups are present in the resin backbone.

The coatings can be physically drying systems or crosslinked polymers. For example crosslinked polymers are derived from aldehydes on the one hand and phenols, ureas and melamines on the other hand, such as phenol/formaldehyde resins, urea/formaldehyde resins and melamine/formaldehyde resins.

Drying and non-drying alkyd resins are also possible.

Unsaturated polyester resins derived from copolyesters of saturated and unsaturated dicarboxylic acids with polyhydric alcohols and vinyl compounds as crosslinking agents, and also halogen-containing modifications thereof of low flammability can be used.

Preferred are crosslinkable acrylic resins derived from substituted acrylates, for example epoxy acrylates, urethane acrylates or polyester acrylates.

Alkyd resins, polyester resins and acrylate resins crosslinked with melamine resins, urea resins, polyisocyanates or epoxy resins.

Also crosslinked epoxy resins derived from polyepoxides can be formulated, for example from bisglycidyl ethers or from cycloaliphatic diepoxides.

The alkyd resin lacquers are the conventional stoving lacquers which are used in particular for coating automobiles (automobile finishing lacquers), for example lacquers based on alkyd/melamine resins and alkyd/acrylic/melamine resins (see H. Wagner and H. F. Sarx, "Lackkunstharze" (1977), pages 99-123). Other crosslinking agents include glycouril resins, blocked isocyanates or epoxy resins.

The lacquers are suitable both for metal finish coatings and solid shade finishes, especially in the case of retouching finishes, as well as various coil coating applications. The lacquers stabilized in accordance with the invention are preferably applied in the conventional manner by two methods, either by the single-coat method or by the two-coat method. In the latter method, the pigment-containing base coat is applied first and then a covering coat of clear lacquer over it.

The coatings may also be applied onto wood substrates to prevent the wood from discoloration.

Aqueous coating materials can be based on water-soluble, water-thinnable polymers or polymer dispersions. Highly polar organic film formers, such as polyvinyl alcohols, polyacrylamides, polyethylene glycols, cellulose derivatives, acrylates and polyesters with very high acid value are examples for water-soluble polymers. Water-thinnable film formers consist of relatively short-chain polymers with acid or basic groups capable of salt formation incorporated into the side chains. They are neutralized with suitable bases or acids, which evaporates during film formation leads to insoluble polymers. Examples thereof are short and medium oil carboxylic acid alkyd resins, water-thinnable melamine resins, emulsifiable epoxy resins or silicone-based emulsions. Several polymer types are used as water-dilutable film formers. Most important of these are vinyl acetate copolymers with dibutyl maleinates, vinyl esters of Versatic acids, acrylic ester acids or terpolymers with ethylene and vinyl chloride, vinyl propionates, pure acrylates consisting of polyacrylates and polymethacrylates, acrylate copolymers with styrene and styrene-butadiene copolymers.

The coating material may also be a water-borne radiation-curable formulation of photopolymerisable compounds.

The coating material may also contain further ingredients such as pigments or dyes, fillers, solvents as coalescing agent, accelerators (hardeners) for the binders, waxes or other hydrophobing agents, defoaming agents, levelling agent, wetting agent, rheological additives (thickeners or thixotropic agents), amines or bases for pH adjustment, photoinitiators, biocides, preservatives, fungicides or insecticides.

The coating material may be dried physically or cured chemically at room temperature, by stoving or by radiation. Provided the binders are curable binders, they are normally used together with the hardener and/or accelerator.

Any coating composition suitable for coating of wood or wood-based material may be used as aqueous wood coating material. Examples for wood or wood based material are furniture, parquet, window frames, panels, doors, wood core plywood, chipboard and fibreboard. Depending on their function or transparency the wood coating materials can be primers/impregnating stains, stain blocking primers and exterior topcoats like woodstains and opaque coatings. Preferable binders are nowadays straight acrylic dispersions, in many cases self-crosslinking acrylic dispersions or alkyd resin emulsions or hybrid coatings as mixtures thereof. For interior applications such as furniture and parquet water-based lacquers based on mostly self-crosslinking acrylic dispersions, polyurethane dispersions, acrylic polyurethane copolymer dispersions are preferably used. When film properties should fulfill high requirements, radiation-curable polymer dispersions or two pack systems consisting of hydroxyl-functional polymer dispersion and water-dispersible polyisocyanates are preferred.

The aqueous wood coating material can be applied to the wood by conventional techniques, for example by impregnating, spreading, brushing, dipping, deluging, spraying or with roller or curtain machines. Also impregnating under high pressure or under vacuum is possible.

In general compositions are preferred wherein component a) is a water based coating.

A specific embodiment of the invention is a powder coating composition stabilized against thermal, oxidative or light-induced degradation comprising
  a) a solid binder material; and
  b) a polymer powder containing a light stabilizer as described above.

By "powder coating compositions" or "powder coatings" is meant the definition as described in "Ullmann's Encyclopedia of Industrial Chemistry, 5th, Completely Revised Edition, Vol. A 18", pages 438 to 444 (1991) in Section 3.4. By powder coatings are meant thermoplastic or bakable, crosslinkable polymers, which are applied in powder form to predominantly metallic substrates. The way in which the powder is brought into contact with the workpiece that is to be coated typifies the various application techniques, such as electrostatic powder spraying, electrostatic fluidized-bed sintering, fixed bed sintering, fluidized-bed sintering, rotational sintering or centrifugal sintering.

Preferred organic film-forming binders for the powder coating compositions of the invention are stoving systems based, for example, on epoxy resins, polyester-hydroxyalkylamides, polyester-glycolurils, epoxy-polyester resins, polyester-triglycidyl isocyanurates, hydroxy-functional polyester-blocked polyisocyanates, hydroxy-functional polyester-uretdiones, acrylate resins with hardener, or mixtures of such resins.

Polyesters are in general hydroxy- or carboxy-functional and are normally prepared by condensation of diols and dicarboxylic acids. By adding polyols and/or polyacids, branched polyesters are obtained which then give rise, in the course of baking in the presence of crosslinkers, to network structures which give the coating the desired physical properties, such as scratch resistance, impact strength and flexural strength. Instead of multifunctional acids it is also possible to use anhydrides or acid chlorides, such as maleic anhydride, itaconic anhydride, phthalic anhydride, terephthalic anhydride, hexahydroterephthalic anhydride, trimellitic anhydride, pyromellitic dianhydride, succinic anhydride, etc. It is also possible to use simple esters such as dimethyl terephthalate for example, in which case the polymerization proceeds by transesterification with elimination of the volatile alcohol. Likewise practicable is a preparation by a combination of transesterification and condensation. Polyesters can be prepared, furthermore, by polycondensation of hydroxycarboxylic acids such as 12-hydroxystearic acid and hydroxypivalic acid, or of the corresponding lactones, such as ε-caprolactone, for example. Examples of dicarboxylic acids and polyacids include terephthalic, isophthalic, adipic, azelaic, sebacic, 1,12-dodecanedioic, pyromellitic, 3,6-dichlorophthalic, succinic, 1,3-cyclohexanedicarboxylic and 1,4-cyclohexanedicarboxylic acids. Examples of diols and polyols include ethylene glycol, propylene glycol, glycerol, hexanetriol, hexane-2,5-diol, hexane-1,6-diol, pentaerythritol, sorbitol, neopentyl glycol, trimethylolethane, trimethylolpropane, tris-1,4-cyclohexanedimethanol, trimethylpentanediol, 2,2-diethyl-1,3-propanediol, 2-methyl-2-butyl-1,3-propanediol, esterdiol 204 (ester of hydroxypivalic acid and neopentyl glycol), hydrogenated bisphenol A, bisphenol A, hydroxypivalic acid, hydroxypivalate esters, 2-butyl-2-ethyl-1,3-propanediol, 1,4-butanediol, 2-butene-1,4-diol, 2-butyne-1,4-diol or 2-methyl-1,3-propanediol.

Suitable crosslinking agents for carboxy-functional polyesters are epoxy compounds such as Novolac®-epoxy resins, diglycidyl ethers of bisphenol A, hydrogenated bisphenol A and bis-phenol A modified by reaction with, for example, aliphatic dicarboxylic acids. Also suitable are reactive epoxy compounds, such as triglycidyltriazolidine-3,5-dione, the glycidyl esters of polyacids, such as diglycidyl terephthalate and diglycidyl hexahydroterephthalate, hydantoin epoxides (U.S. Pat. No. 4,402,983) and, especially, triglycidyl isocyanurate, epoxidized unsaturated fatty acid esters (for example Uranox® from DSM) and Araldit®PT 910 (Ciba Spezialitätenchemie AG). Further crosslinking agents for carboxy-functional polyesters are β-hydroxyalkylamides (U.S. Pat. No. 4,076,917), such as the predominantly tetrafunctional β-hydroxyalkylamide derivative of adipic acid (Primid® XL552 from Rohm & Haas), for example. Derivatives of melamine, benzoguanimine and glycoluril that have been alkylated with low molecular mass alcohols have also proved suitable. Examples are tetramethylmethoxyglycoluril (Powderlink® 1174 from American Cyanamid). In addition, bis- and trisoxazolidines, such as 1,4-bisoxazolidinobenzene, for example, are also known as crosslinking agents.

More recent are carboxy-functional polyester, which contain chemically bonded epoxy groups and are thus able to crosslink with themselves (Molhoek et al., 22nd Fatipec Congress, 15-19.5.95, Budapest, Vol. 1, 119-132).

In all systems in which an epoxy group or a glycidyl radical reacts with a carboxyl group or with an anhydride in a crosslinking reaction, it is possible to employ catalysts. Examples are amines or metal compounds such as aluminium acetylacetonate or tin octoate, for example.

The polyisocyanate crosslinkers are of particular importance as crosslinking agents for hydroxy-functional polyesters. In order to prevent premature crosslinking, because of the high reactivity of isocyanates, and to obtain good levelling of the melted powder, the polyisocyanates are blocked (internally in the form of a uretdione, or as an adduct with a blocking agent). Blocking agents most commonly employed are ε-caprolactam, methyl ethyl ketoxime or butanone oxime. Other suitable blocking agents for isocyanates are described in the publications by G. B. Guise, G. N. Freeland and G. C. Smith, J. Applied Polymer Science, 23, 353 (1979) and by M. Bock and H.-U. Maier-Westhues in "Progress in Product Development for Powder Coating Technology, XIX th Int. Conf. on Organic Coatings, Science and Technol., Athens, 12-16 July", 1993. Examples of blocked and unblocked polyisocyanates include 2-methylpentane 1,5-diisocyanate, 2-ethylbutane 1,4-diisocyanate, 3(4)-isocyanatomethyl-1-methylcyclohexyl isocyanate, 3-isocyanatomethyl-3,5,5-trimethylcyclohexane diisocyanate, tris(isocyanatomethyl) benzene, 4,4'-diisocyanatodicyclohexylmethane, 1,4-bis (isocyanatomethyl)cyclohexane, m-tetramethylxylene diisocyanate, p-tetramethylxylene diisocyanate and, in particular, isophorone diisocyanate. For deblocking it is common to add a metallic catalyst, such as tin octoate, dibutyltin oxide or dibutyltin dilaurate, for example, to the polyisocyanate formulation.

Further suitable crosslinking agents for hydroxy-functional polyesters are anhydrides such as trimellitic anhydride and its reaction products with diols and diamines. Further examples of such crosslinking agents are described by T. A. Misev in "Powder Coatings: Chemistry and Technology", published by J. Wiley & Sons, Chichester on pages 123 and 124.

Polyacrylates, which commonly possess hydroxyl, carboxyl or glycidyl functionality, are also employed as binders for powder coatings. They are prepared by the customary methods, principally from monomers such as styrene and linear or branched $C_1$-$C_8$alkyl esters of acrylic or methacrylic acid. In addition, other ethylenically unsaturated compounds, such as divinylbenzene, acrylamide, methacrylamide, butoxymethylacrylamide, acrylonitrile, butadiene, etc., can be added and copolymerized. Hydroxyl functionality is ensured by the copolymerization of hydroxy-functional monomers such as hydroxyethyl acrylate, hydroxyethyl methacrylate, hydroxypropyl acrylate, hydroxypropyl methacrylate, for example. For carboxyl functionality use is made of ethylenically unsaturated acids and anhydrides, such as acrylic, methacrylic, itaconic and crotonic acid, and maleic, itaconic, acrylic or methacrylic anhydrides (U.S. Pat. No. 3,836,604). Glycidyl functionality is provided, as taught in EP-A-0 256 369 and U.S. Pat. No. 3,876,578, by the copolymerization of monomers such as glycidyl acrylate and glycidyl methacrylate. As crosslinking agents for polyacrylates with hydroxyl or carboxyl functionality it is possible in principle to use the same compounds as already described for the polyesters with hydroxyl or carboxyl functionality. Further suitable crosslinking agents are the epoxy compounds of U.S. Pat. No. 0,045,040. Suitable crosslinking agents for polyacrylates with glycidyl functionality are dicarboxylic acids, such as sebacic acid and 1,12-dodecanedicarboxylic acid, and anhydrides, such as bistrimellitic anhydride, for example, and the compounds described in U.S. Pat. No. 3,880,946. DE-A-3 310 545, furthermore, discloses self-crosslinking polyacrylates.

Epoxy resins for powder coatings are usually either Novolac®-epoxy resins or, in particular, those based on aromatic polyols, especially those based on bisphenols such as bisphenol A. Also known are modified bisphenol epoxy resins, from JP-A-58 187 464 (1982). The epoxy resins are employed in combination with crosslinkers from the classes of the solid aliphatic amines, solid aromatic amines, amine adducts, phenolic resins, polyacids and the already described carboxy-functional polyesters. Hardeners deserving of very special mention are the dicyandiamides, which are frequently employed together with a catalyst, examples of which are Lewis acids, boron trifluoride-amine complexes, metal complexes, tertiary or quaternary amines, and imidazoline derivatives, such as 2-methylimidazoline.

A further aspect of the invention is a composition stabilized against thermal, oxidative or light-induced degradation comprising
a) a thermoplastic polymer and
b) a polymer powder as described above.

Thermoplastic polymers are for example polyolefins and all those polymers summarized under the term engineering plastics, such as for example polyester, polyamide, polystyrene or polycarbonate.

Still further aspects of the invention are the use of a concentrated aqueous polymer dispersion as described above as stabilizer against thermal, oxidative or light-induced degradation of organic materials, which are susceptible to thermal, oxidative or light induced degradation and the use of a polymer powder as described above as stabilizer against thermal, oxidative or light-induced degradation of a powder coating.

The preferences mentioned for the concentrated aqueous polymer dispersion apply also for the stabilized compositions and all other subjects of the invention.

The compositions stabilized against thermal, oxidative or light-induced degradation described above may contain further additives, for example, plasticizers, lubricants, emulsifiers, pigments, optical brighteners, flameproofing agents or anti-static agents.

They may also contain light or heat stabilizers which have been added in a conventional product form. When additional UV-absorbers or sterically hindered amines (HALS) are added they may be selected from the products mentioned above.

Further additives are those given below.

1. Antioxidants 1.1. Alkylated monophenols, for example 2,6-di-tert-butyl-4-methylphenol, 2-tert-butyl-4,6-dimethylphenol, 2,6-di-tert-butyl-4-ethylphenol, 2,6-di-tert-butyl-4-n-butylphenol, 2,6-di-tert-butyl-4-isobutylphenol, 2,6-dicyclopentyl-4-methylphenol, 2-($\alpha$-methylcyclohexyl)-4,6-dimethylphenol, 2,6-dioctadecyl-4-methylphenol, 2,4,6-tricyclohexylphenol, 2,6-di-tert-butyl-4-methoxymethylphenol, nonylphenols which are linear or branched in the side chains, for example 2,6-di-nonyl-4-methylphenol, 2,4-dimethyl-6-(1'-methylundec-1'-yl)phenol, 2,4-dimethyl-6-(1'-methylheptadec-1'-yl)phenol, 2,4-dimethyl-6-(1'-methyltridec-1'-yl)phenol and mixtures thereof.

1.2. Alkylthiomethylphenols, for example 2,4-dioctylthiomethyl-6-tert-butylphenol, 2,4-dioctylthiomethyl-6-methylphenol, 2,4-dioctylthiomethyl-6-ethylphenol, 2,6-di-dodecylthiomethyl-4-nonylphenol.

1.3. Hydroquinones and alkylated hydroquinones, for example 2,6-di-tert-butyl-4-methoxyphenol, 2,5-di-tert-butylhydroquinone, 2,5-di-tert-amylhydroquinone, 2,6-diphenyl-4-octadecyloxyphenol, 2,6-di-tertbutylhydroquinone, 2,5-di-tert-butyl-4-hydroxyanisole, 3,5-di-tert-butyl-4-hydroxyanisole, 3,5-di-tert-butyl-4-hydroxyphenyl stearate, bis (3,5-di-tert-butyl-4-hydroxyphenyl)adipate.

1.4. Tocopherols, for example $\alpha$-tocopherol, $\beta$-tocopherol, $\gamma$-tocopherol, $\delta$-tocopherol and mixtures thereof (vitamin E).

1.5. Hydroxylated thiodiphenyl ethers, for example 2,2'-thiobis(6-tert-butyl-4-methylphenol), 2,2'-thiobis(4-octylphenol), 4,4'-thiobis(6-tert-butyl-3-methylphenol), 4,4'-thiobis (6-tert-butyl-2-methylphenol), 4,4'-thiobis(3,6-di-sec-amylphenol), 4,4'-bis(2,6-dimethyl-4-hydroxyphenyl)-disulfide.

1.6. Alkylidenebisphenols, for example 2,2'-methylenebis(6-tert-butyl-4-methylphenol), 2,2'-methylenebis(6-tert-butyl-4-ethylphenol), 2,2'-methylenebis[4-methyl-6-($\alpha$-methylcyclohexyl)-phenol], 2,2'-methylenebis(4-methyl-6-cyclohexylphenol), 2,2'-methylenebis(6-nonyl-4-methylphenol), 2,2'-methylenebis(4,6-di-tert-butylphenol), 2,2'-ethylidenebis(4,6-di-tert-butylphenol), 2,2'-ethylidenebis(6-tert-butyl-4-isobutylphenol), 2,2'-methylenebis[6-($\alpha$-methylbenzyl)-4-nonylphenol], 2,2'-methylenebis[6-($\alpha,\alpha$-dimethylbenzyl)-4-nonylphenol], 4,4'-methylenebis(2,6-di-tert-butylphenol), 4,4'-methylenebis(6-tert-butyl-2-methylphenol), 1,1-bis(5-tert-butyl-4-hydroxy-2-methylphenyl)butane, 2,6-bis(3-tert-butyl-5-methyl-2-hydroxybenzyl)-4-methylphenol, 1,1,3-tris(5-tert-butyl-4-hydroxy-2-methylphenyl)butane, 1,1-bis(5-tert-butyl-4-hydroxy-2-methylphenyl)-3-n-dodecylmercaptobutane, ethylene glycol bis[3,3-bis(3'-tert-butyl-4'-hydroxyphenyl)butyrate], bis(3-tert-butyl-4-hydroxy-5-methyl-phenyl)dicyclopentadiene, bis[2-(3'-tert-butyl-2'-hydroxy-5'-methylbenzyl)-6-tert-butyl-4-methylphenyl]terephthalate, 1,1-bis-(3,5-dimethyl-2-hydroxyphenyl)butane, 2,2-bis(3,5-di-tert-butyl-4-hydroxyphenyl)propane, 2,2-bis-(5-tert-butyl-4-hydroxy-2-methylphenyl)-4-n-dodecylmercaptobutane, 1,1,5,5-tetra(5-tert-butyl-4-hydroxy-2-methylphenyl)pentane.

1.7. O-, N- and S-benzyl compounds, for example 3,5,3',5'-tetra-tert-butyl-4,4'-dihydroxydibenzyl ether, octadecyl-4-hydroxy-3,5-dimethylbenzylmercaptoacetate, tridecyl-4-hydroxy-3,5-di-tert-butylbenzylmercaptoacetate, tris(3,5-di-tert-butyl-4-hydroxybenzyl)amine, bis(4-tert-butyl-3-hydroxy-2,6-dimethylbenzyl)dithioterephthalate, bis(3,5-di-tert-butyl-4-hydroxybenzyl)sulfide, isooctyl-3,5-di-tert-butyl-4-hydroxybenzylmercaptoacetate.

1.8. Hydroxybenzylated malonates, for example dioctadecyl-2,2-bis(3,5-di-tert-butyl-2-hydroxybenzyl)malonate, di-octadecyl-2-(3-tert-butyl-4-hydroxy-5-methylbenzyl)malonate, didodecylmercaptoethyl-2,2-bis(3,5-di-tert-butyl-4-hydroxybenzyl)malonate, bis[4-(1,1,3,3-tetramethylbutyl)phenyl]-2,2-bis(3,5-di-tert-butyl-4-hydroxybenzyl)malonate.

1.9. Aromatic hydroxybenzyl compounds, for example 1,3,5-tris(3,5-di-tert-butyl-4-hydroxybenzyl)-2,4,6-trimethylbenzene, 1,4-bis(3,5-di-tert-butyl-4-hydroxybenzyl)-2,3,5,6-tetramethylbenzene, 2,4,6-tris(3,5-di-tert-butyl-4-hydroxybenzyl)phenol.

1.10. Triazine compounds, for example 2,4-bis(octylmercapto)-6-(3,5-di-tert-butyl-4-hydroxyanilino)-1,3,5-triazine, 2-octylmercapto-4,6-bis(3,5-di-tert-butyl-4-hydroxyanilino)-1,3,5-triazine, 2-octylmercapto-4,6-bis(3,5-di-tert-butyl-4-hydroxyphenoxy)-1,3,5-triazine, 2,4,6-tris-(3,5-di-tert-butyl-4-hydroxyphenoxy)-1,2,3-triazine, 1,3,5-tris(3,5-di-tert-butyl-4-hydroxybenzyl)isocyanurate, 1,3,5-tris(4-tert-butyl-3-hydroxy-2,6-dimethylbenzyl)isocyanurate, 2,4,6-tris-(3,5-di-tert-butyl-4-hydroxyphenylethyl)-1,3,5-triazine, 1,3,5-tris(3,5-di-tert-butyl-4-hydroxyphenylpropionyl)-hexahydro-1,3,5-triazine, 1,3,5-tris(3,5-dicyclohexyl-4-hydroxybenzyl)isocyanurate.

1.11. Benzylphosphonates, for example dimethyl-2,5-di-tert-butyl-4-hydroxybenzylphosphonate, diethyl-3,5-di-tert-butyl-4-hydroxybenzylphosphonate, dioctadecyl3,5-di-tert-butyl-4-hydroxybenzylphosphonate, dioctadecyl-5-tert-butyl- 4-hydroxy-3-methylbenzylphosphonate, the calcium salt of the monoethyl ester of 3,5-di-tert-butyl-4-hydroxybenzylphosphonic acid.

1.12. Acylaminophenols, for example 4-hydroxylauranilide, 4-hydroxystearanilide, octyl N-(3,5-di-tert-butyl-4-hydroxyphenyl)carbamate.

1.13. Esters of β-(3,5-di-tert-butyl-4-hydroxyphenyl)propionic acid with mono- or polyhydric alcohols, e.g. with methanol, ethanol, n-octanol, i-octanol, octadecanol, 1,6-hexanediol, 1,9-nonanediol, ethylene glycol, 1,2-propanediol, neopentyl glycol, thiodiethylene glycol, diethylene glycol, triethylene glycol, pentaerythritol, tris(hydroxyethyl)isocyanurate, N,N'-bis(hydroxyethyl)oxamide, 3-thiaundecanol, 3-thiapentadecanol, trimethylhexanediol, trimethylolpropane, 4-hydroxymethyl-1-phospha-2,6,7-trioxabicyclo[2.2.2]octane.

1.14. Esters of β-(5-tert-butyl-4-hydroxy-3-methylphenyl) propionic acid with mono- or polyhydric alcohols, e.g. with methanol, ethanol, n-octanol, i-octanol, octadecanol, 1,6-hexanediol, 1,9-nonanediol, ethylene glycol, 1,2-propanediol, neopentyl glycol, thiodiethylene glycol, diethylene glycol, triethylene glycol, pentaerythritol, tris(hydroxyethyl)isocyanurate, N,N'-bis(hydroxyethyl)oxamide, 3-thiaundecanol, 3-thiapentadecanol, trimethylhexanediol, trimethylolpropane, 4-hydroxymethyl-1-phospha-2,6,7-trioxabicyclo[2.2.2]octane; 3,9-bis[2-{3-(3-tert-butyl-4-hydroxy-5-methylphenyl)propionyloxy}-1,1-dimethylethyl]-2,4,8,10-tetraoxaspiro[5,6]-undecane.

1.15. Esters of β-(3,5-dicyclohexyl-4-hydroxyphenyl)propionic acid with mono- or polyhydric alcohols, e.g. with methanol, ethanol, octanol, octadecanol, 1,6-hexanediol, 1,9-nonanediol, ethylene glycol, 1,2-propanediol, neopentyl glycol, thiodiethylene glycol, diethylene glycol, triethylene glycol, pentaerythritol, tris(hydroxyethyl)isocyanurate, N,N'-bis(hydroxyethyl)oxamide, 3-thiaundecanol, 3-thiapentadecanol, trimethylhexanediol, trimethylolpropane, 4-hydroxymethyl-1-phospha-2,6,7-trioxabicyclo[2.2.2]octane.

1.16. Esters of 3,5-di-tert-butyl-4-hydroxyphenyl acetic acid with mono- or polyhydric alcohols, e.g. with methanol, ethanol, octanol, octadecanol, 1,6-hexanediol, 1,9-nonanediol, ethylene glycol, 1,2-propanediol, neopentyl glycol, thiodiethylene glycol, diethylene glycol, triethylene glycol, pentaerythritol, tris(hydroxyethyl)isocyanurate, N,N'-bis(hydroxyethyl)oxamide, 3-thiaundecanol, 3-thiapentadecanol, trimethylhexanediol, trimethylolpropane, 4-hydroxymethyl-1-phospha-2,6,7-trioxabicyclo[2.2.2]octane.

1.17. Amides of β-(3,5-di-tert-butyl-4-hydroxyphenyl)propionic acid e.g. N,N'-bis(3,5-di-tert-butyl-4-hydroxyphenylpropionyl)hexamethylenediamide, N,N'-bis(3,5-di-tert-butyl-4-hydroxyphenylpropionyl)trimethylenediamide, N,N'-bis(3,5-di-tert-butyl-4-hydroxyphenylpropionyl)hydrazide, N,N'-bis[2-(3-[3,5-di-tert-butyl-4-hydroxyphenyl]propionyloxy)ethyl]oxamide (Naugard®XL-1, supplied by Uniroyal).

1.18. Ascorbic acid (vitamin C)

1.19. Aminic antioxidants, for example N,N'-di-isopropyl-p-phenylenediamine, N,N'-di-sec-butyl-p-phenylenediamine, N,N'-bis(1,4-dimethylpentyl)-p-phenylenediamine, N,N'-bis(1-ethyl-3-methylpentyl)-p-phenylenediamine, N,N'-bis(1-methylheptyl)-p-phenylenediamine, N,N'-dicyclohexyl-p-phenylenediamine, N,N'-diphenyl-p-phenylenediamine, N,N'-bis(2-naphthyl)-p-phenylenediamine, N-isopropyl-N'-phenyl-p-phenylenediamine, N-(1,3-dimethylbutyl)-N'-phenyl-p-phenylenediamine, N-(1-methylheptyl)-N'-phenyl-p-phenylenediamine, N-cyclohexyl-N'-phenyl-p-phenylenediamine, 4-(p-toluenesulfamoyl)diphenylamine, N,N'-dimethyl-N,N'-disec-butyl-p-phenylenediamine, diphenylamine, N-allyldiphenylamine, 4-isopropoxydiphenylamine, N-phenyl-1-naphthylamine, N-(4-tert-octylphenyl)-1-naphthylamine, N-phenyl-2-naphthylamine, octylated diphenylamine, for example p,p'-di-tert-octyldiphenylamine, 4-n-butylaminophenol, 4-butyrylaminophenol, 4-nonanoylaminophenol, 4-dodecanoylaminophenol, 4-octadecanoylaminophenol, bis(4-methoxyphenyl)amine, 2,6-di-tert-butyl-4-dimethylaminomethylphenol, 2,4'-diaminodiphenylmethane, 4,4'-diaminodiphenylmethane, N,N,N',N'-tetramethyl-4,4'-diaminodiphenylmethane, 1,2-bis[(2-methylphenyl)amino]ethane, 1,2-bis(phenylamino)propane, (o-tolyl)biguanide, bis[4-(1',3'-dimethylbutyl)phenyl]amine, tert-octylated N-phenyl-1-naphthylamine, a mixture of mono- and dialkylated tert-butyl/tert-octyldiphenyl-amines, a mixture of mono- and dialkylated nonyldiphenylamines, a mixture of mono- and dialkylated dodecyldiphenylamines, a mixture of mono- and dialkylated isopropyl/isohexyldiphenylamines, a mixture of mono- and dialkylated tert-butyldiphenylamines, 2,3-dihydro-3,3-dimethyl-4H-1,4-benzothiazine, phenothiazine, a mixture of mono- and dialkylated tert-butyl/tert-octylphenothiazines, a mixture of mono- and dialkylated tert-octylphenothiazines, N-allylphenothiazine, N,N,N',N'-tetraphenyl-1,4-diaminobut-2-ene, N,N-bis(2,2,6,6-tetramethylpiperid-4-yl-hexamethylenediamine, bis(2,2,6,6-tetramethylpiperid-4-yl)sebacate, 2,2,6,6-tetramethylpiperidin-4-one, 2,2,6,6-tetramethylpiperidin-4-ol.

2. Metal deactivators, for example N,N'-diphenyloxamide, N-salicylal-N'-salicyloyl hydrazine, N,N'-bis(salicyloyl)hydrazine, N,N'-bis(3,5-di-tert-butyl-4-hydroxyphenylpropionyl)hydrazine, 3-salicyloylamino-1,2,4-triazole, bis(benzylidene)oxalyl dihydrazide, oxanilide, isophthaloyl dihydrazide, sebacoyl bisphenylhydrazide, N,N'-diacetyladipoyl dihydrazide, N,N'-bis(salicyloyl)oxalyl dihydrazide, N,N'-bis(salicyloyl)thiopropionyl dihydrazide.

3. Phosphites and phosphonites, for example triphenyl phosphite, diphenylalkyl phosphites, phenyldialkyl phosphites, tris(nonylphenyl)phosphite, trilauryl phosphite, trioctadecyl phosphite, distearylpentaerythritol diphosphite, tris(2,4-di-tert-butylphenyl)phosphite, diisodecyl pentaerythritol diphosphite, bis(2,4-di-tert-butylphenyl)pentaerythritol diphosphite, bis(2,4-dicumylphenyl)pentaerythritol diphosphite, bis(2,6-di-tert-butyl-4-methylphenyl)pentaerythritol diphosphite, diisodecyloxypentaerythritol diphosphite, bis (2,4-di-tert-butyl-6-methylphenyl)-pentaerythritol diphosphite, bis(2,4,6-tris(tert-butylphenyl)pentaerythritol diphosphite, tristearyl sorbitol triphosphite, tetrakis(2,4-di-tert-butylphenyl) 4,4'-biphenylene diphosphonite, 6-isooctyloxy-2,4,8,10-tetra-tert-butyl-12H-dibenz[d,g]-1,3,2-dioxaphosphocin, bis(2,4-di-tert-butyl-6-methylphenyl) methyl phosphite, bis(2,4-di-tert-butyl-6-methylphenyl) ethyl phosphite, 6-fluoro-2,4,8,10-tetra-tert-butyl-12-methyl-dibenz[d,g]-1,3,2-dioxaphosphocin, 2,2',2"-nitrilo-[triethyltris(3,3',5,5'-tetra-tert-butyl-1,1'-biphenyl-2,2'-diyl) phosphite], 2-ethylhexyl(3,3',5,5'-tetra-tert-butyl-1,1'-biphenyl-2,2'-diyl)phosphite, 5-butyl-5-ethyl-2-(2,4,6-tri-tert-butylphenoxy)-1,3,2-dioxaphosphirane.

The following phosphites are especially preferred:

Tris(2,4-di-tert-butylphenyl)phosphite (Irgafos® 168, Ciba-Geigy), tris(nonylphenyl)phosphite,

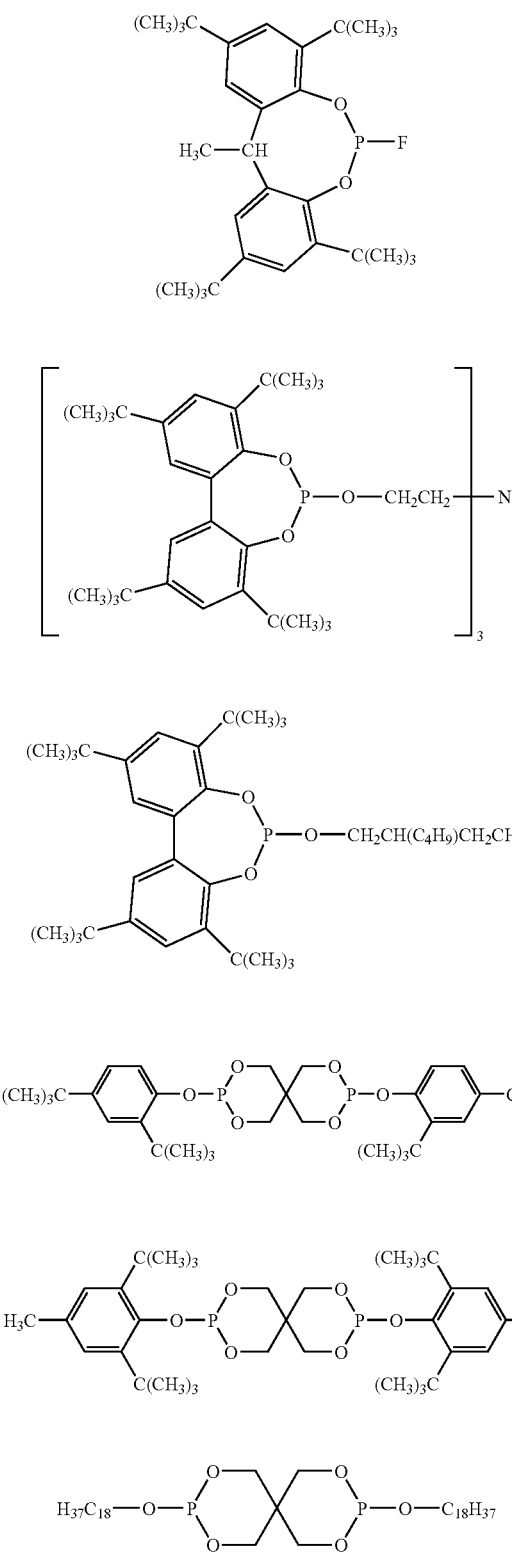

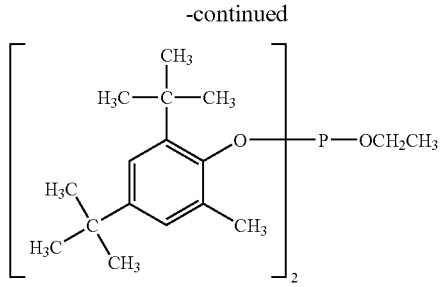

4. Hydroxylamines, for example N,N-dibenzylhydroxylamine, N,N-diethylhydroxylamine, N,N-dioctylhydroxylamine, N,N-dilaurylhydroxylamine, N,N-ditetradecylhydroxylamine, N,N-dihexadecylhydroxylamine, N,N-dioctadecylhydroxylamine, N-hexadecyl-N-octadecylhydroxylamine, N-heptadecyl-N-octadecylhydroxylamine, N,N-dialkylhydroxylamine derived from hydrogenated tallow amine.

5. Nitrones, for example N-benzyl-alpha-phenylnitrone, N-ethyl-alpha-methylnitrone, N-octyl-alpha-heptylnitrone, N-lauryl-alpha-undecylnitrone, N-tetradecyl-alpha-tridecylnitrone, N-hexadecyl-alpha-pentadecylnitrone, N-octadecyl-alpha-heptadecyinitrone, N-hexadecyl-alpha-heptadecylnitrone, N-ocatadecyl-alpha-pentadecylnitrone, N-heptadecyl-alpha-heptadecylnitrone, N-octadecyl-alpha-hexadecyinitrone, nitrone derived from N,N-dialkylhydroxylamine derived from hydrogenated tallow amine.

6. Thiosynergists, for example dilauryl thiodipropionate or distearyl thiodipropionate.

7. Peroxide scavengers, for example esters of β-thiodipropionic acid, for example the lauryl, stearyl, myristyl or tridecyl esters, mercaptobenzimidazole or the zinc salt of 2-mercaptobenzimidazole, zinc dibutyldithiocarbamate, dioctadecyl disulfide, pentaerythritol tetrakis(β-dodecylmercapto)propionate.

8. Polyamide stabilisers, for example copper salts in combination with iodides and/or phosphorus compounds and salts of divalent manganese.

9. Basic co-stabilisers, for example melamine, polyvinylpyrrolidone, dicyandiamide, triallyl cyanurate, urea derivatives, hydrazine derivatives, amines, polyamides, polyurethanes, alkali metal salts and alkaline earth metal salts of higher fatty acids, for example calcium stearate, zinc stearate, magnesium behenate, magnesium stearate, sodium ricinoleate and potassium palmitate, antimony pyrocatecholate or zinc pyrocatecholate.

10. Nucleating agents, for example inorganic substances, such as talcum, metal oxides, such as titanium dioxide or magnesium oxide, phosphates, carbonates or sulfates of, preferably, alkaline earth metals; organic compounds, such as mono- or polycarboxylic acids and the salts thereof, e.g. 4-tert-butylbenzoic acid, adipic acid, diphenylacetic acid, sodium succinate or sodium benzoate; polymeric compounds, such as ionic copolymers (ionomers). Especially preferred are 1,3:2,4-bis(3',4'-dimethylbenzylidene)sorbitol, 1,3:2,4-di(paramethyldibenzylidene)sorbitol, and 1,3:2,4-di(benzylidene)sorbitol.

11. Fillers and reinforcing agents, for example calcium carbonate, silicates, glass fibres, glass bulbs, asbestos, talc, kaolin, mica, barium sulfate, metal oxides and hydroxides, carbon black, graphite, wood flour and flours or fibers of other natural products, synthetic fibers.

12. Other additives, for example plasticisers, lubricants, emulsifiers, pigments, rheology additives, catalysts, flow-control agents, optical brighteners, flameproofing agents, antistatic agents and blowing agents.

13. Benzofuranones and indolinones, for example those disclosed in U.S. Pat. No. 4,325,863; U.S. Pat. No. 4,338,244; U.S. Pat. No. 5,175,312; U.S. Pat. No. 5,216,052; U.S. Pat. No. 5,252,643; DE-A-4316611; DE-A-4316622; DE-A-4316876; EP-A-0589839 or EP-A-0591 102 or 3-[4-(2-acetoxyethoxy)phenyl]-5,7-di-tert-butylbenzofuran-2-one, 5,7-di-tert-butyl-3-[4-(2-stearoyloxyethoxy)phenyl]-benzofuran-2-one, 3,3'-bis[5,7-di-tert-butyl-3-(4-[2-hydroxyethoxy]phenyl)benzofuran-2-one], 5,7-di-tert-butyl-3-(4-ethoxyphenyl)benzofuran-2-one, 3-(4-acetoxy-3,5-dimethylphenyl)-5,7-di-tert-butylbenzofuran-2-one, 3-(3,5-dimethyl-4-pivaloyloxyphenyl)-5,7-di-tert-butylbenzofuran-2-one, 3-(3,4-dimethylphenyl)-5,7-di-tert-butylbenzofuran-2-one, 3-(2,3-dimethylphenyl)-5,7-di-tert-butylbenzofuran-2-one.

Aside form the above mentioned components, coating composition of the invention may contain further additives as typically used in paints and lacquers: like slip- and leveling agents, wetting agents, pigments, pigment dispersants, defoamers, matting agents, waxes, anti skinning additives, adhesion promoters, in can stabilizers, coalescents, rheology modifiers, sag control agents and thixotropic agents.

The following examples illustrate the invention.

General

Particle size distribution is measured by dynamic light scattering (DLS, 90° scattering angle, Nicomp Model 380, Particle Sizing System, Santa Barbara, Calif., USA) and to determine the mean intensity diameter ($D_{INT}$).

The ultrasonic sound treatment is carried out with a SONOPLUS HD 2200 (commercial equipment from BANDELIN electronic GmbH & Co. KG, generator GM 2200 with ultrasonic converter UW 2200, booster horn SH 213 G and titanium flat tip TT19). Typically a treatment of 3 min at 60 percent power is applied for 500 ml oil/water emulsion.

Monomers are used as received without further purification.

Water-borne product forms of the following hydrophobic UV-absorbers are prepared Compound 101

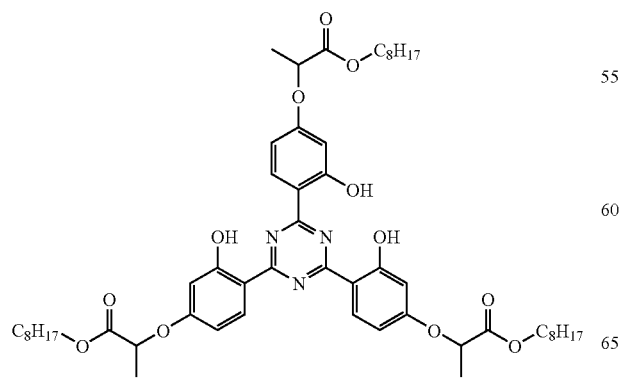

Compound 102

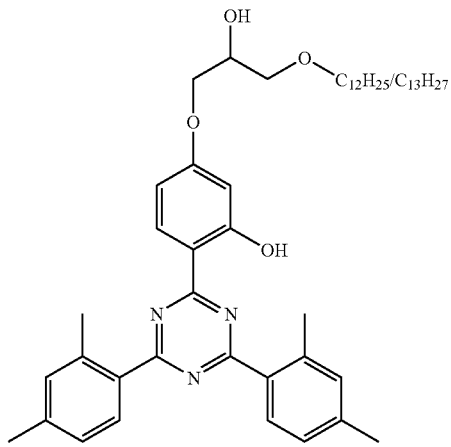

A PREPARATION EXAMPLES

Example A1

For the preparation of a stable oil/water emulsion 20 g of compound 101 are dissolved in 20 g methyl methacrylate (MMA), 1.6 g stearyl methacrylate (SMA) and 0.06 g butandioldiacrylate (BDDA). The oil phase is added dropwise to a stirred solution of 1.6 g sodium dodecylsulphate in 56.5 g deionised water. After stirring for 30 min and ultrasonically converting a kinetically stable emulsion is obtained with an average droplet size below 250 nm. The emulsion is heated up to 55° C. and the redox initiator (0.06 g ascorbic acid dissolved in 3 g deionised water; 0.25 ml $H_2O_2$ (35%) diluted in 0.5 g deionised water) is subsequently added to the reaction mixture. The reaction mixture is continuously stirred by a mechanical stirrer and is maintained at 55° C. for three hours, then cooled to room temperature (RT) and filtered via a 20 μm filter. The resulting particle size $D_{INT}$ is 141 nm. The active content of compound 101 is 20 wt %, based on the total weight of the emulsion.

Example A2

For the preparation of a stable oil/water emulsion 24 g of compound 101 are dissolved in 16 g methyl methacrylate (MMA), 1.6 g stearyl methacrylate (SMA) and 0.05 g butandioldiacrylate (BDDA). The oil phase is added dropwise to a stirred solution of 1.6 g sodium dodecylsulphate in 56.5 g deionised water. After stirring for 30 min and ultrasonically converting a kinetically stable emulsion is obtained with an average droplet size below 250 nm. The emulsion is heated up to 55° C. and the redox initiator (0.08 g ascorbic acid dissolved in 3 g deionised water; 0.32 ml $H_2O_2$ (35%) diluted in 0.5 g deionised water) is subsequently added to the reaction mixture. The reaction mixture is continuously stirred by a mechanical stirrer and is maintained at 55° C. for three hours, then cooled to RT and filtered via a 20 μm filter. The resulting particle size $D_{INT}$ is 182 nm. The active content of compound 101 is 24 wt %, based on the total weight of the emulsion.

Example A3

For the preparation of a stable oil/water emulsion 20 g of compound 101 are dissolved in 20 g ethyl acrylate (EA), 1.6 g stearyl methacrylate (SMA) and 0.06 g butandioldiacrylate (BDDA). The oil phase is added dropwise to a stirred solution of 1.6 g sodium dodecylsulphate in 56.5 g deionised water. After stirring for 30 min and ultrasonically converting a kinetically stable emulsion is obtained with an average droplet size below 250 nm. The emulsion is heated up to 55° C. and the redox initiator (0.06 g ascorbic acid dissolved in 3 g deionised water; 0.25 ml $H_2O_2$ (35%) diluted in 0.5 g deionised water) is subsequently added to the reaction mixture. The reaction mixture is continuously stirred by a mechanical stirrer and is maintained at 55° C. for three hours, then cooled to RT and filtered via a 20 µm filter. The resulting particle size $D_{INT}$ is 156 nm. The active content of compound 101 is 20 wt %, based on the total weight of the emulsion.

Example A4

For the preparation of a stable oil/water emulsion 24 g of compound 101 is dissolved in 16 g ethyl acrylate (EA), 1.6 g stearyl methacrylate (SMA) and 0.05 g butandioldiacrylate (BDDA). The oil phase is added dropwise to a stirred solution of 1.6 g sodium dodecylsulphate in 56.5 g deionised water. After stirring for 30 min and ultrasonically converting a kinetically stable emulsion is obtained with an average droplet size below 250 nm. The emulsion is heated up to 55° C. and the redox initiator (0.08 g ascorbic acid dissolved in 3 g deionised water; 0.32 ml $H_2O_2$ (35%) diluted in 0.5 g deionised water) is subsequently added to the reaction mixture. The reaction mixture is continuously stirred by a mechanical stirrer and is maintained at 55° C. for three hours, then cooled to RT and filtered via a 20 µm filter. The resulting particle size $D_{INT}$ is 199 nm. The active content of compound 101 is 24 wt %, based on the total weight of the emulsion.

Example A5

For the preparation of a stable oil/water emulsion 40 g of compound 101 are dissolved in 40 g methyl methacrylate (MMA), 4.8 g stearyl methacrylate (SMA) and 0.12 g butandioldiacrylate (BDDA). The oil phase is added dropwise to a stirred solution of 10.3 g Disponil® FES 32 IS (31 wt % active, Cognis Deutschland GmbH&Co.KG) in 115 g deionised water. After stirring for 30 min and ultrasonically converting a kinetically stable emulsion is obtained with an average droplet size below 250 nm. The emulsion is heated up to 55° C. and the redox initiator (0.2 g ascorbic acid dissolved in 3 g deionised water; 0.81 ml $H_2O_2$ (35%) diluted in 2.0 g deionised water) is subsequently added to the reaction mixture. The reaction mixture is continuously stirred by a mechanical stirrer and is maintained at 55° C. for three hours, then cooled to RT and filtered via a 20 µm filter. The resulting particle size $D_{INT}$ is 170 nm. The active content of compound 101 is 20 wt %, based on the total weight of the emulsion.

Example A6

The following samples were prepared with a monomer mixture (Mix I), containing 11% hydroxyethyl methacrylate, 15% vinyl toluol, 15% cyclohexyl methacrylate, 28% methyl methacrylate and 31% iso-butyl methacrylate. For the preparation of a stable oil/water emulsion 40 g of compound 102 are dissolved in 40 g of Mix I, 3.2 g stearyl methacrylate (SMA) and 0.12 g butandioldiacrylate (BDDA). The oil phase is added dropwise to a stirred solution of 10.3 g Disponil® FES 32 IS (31 wt % active, Cognis Deutschland GmbH&Co.KG) in 110 g deionised water. After stirring for 30 min and ultrasonically converting a kinetically stable emulsion is obtained with an average droplet size below 250 nm. The emulsion is heated up to 55° C. and the redox initiator (0.2 g ascorbic acid dissolved in 5 g deionised water; 0.81 ml $H_2O_2$ (35%) diluted in 5.0 g deionised water) is subsequently added to the reaction mixture. The reaction mixture is continuously stirred by a mechanical stirrer and is maintained at 55° C. for three hours, then cooled to RT and filtered via a 20 µm filter. The resulting particle size $D_{INT}$ is 198 nm. The final active content of compound 102 is 20 wt %, based on the total weight of the emulsion.

Example A7

For the preparation of a stable oil/water emulsion 40 g compound 102 are dissolved in 40 g of Mix I and 3.2 g stearyl methacrylate (SMA). The oil phase is added dropwise to a stirred solution of 10.3 g Disponi®I FES 32 IS (31 wt % active, Cognis Deutschland GmbH&Co.KG) in 110 g deionised water. After stirring for 30 min and ultrasonically converting a kinetically stable emulsion is obtained with an average droplet size below 250 nm. The emulsion is heated up to 55° C. and the redox initiator (0.2 g ascorbic acid dissolved in 5 g deionised water; 0.81 ml $H_2O_2$ (35%) diluted in 5.0 g deionised water) is subsequently added to the reaction mixture. The reaction mixture is continuously stirred by a mechanical stirrer and is maintained at 55° C. for three hours, then cooled to RT and filtered via a 20 µm filter. The resulting particle size $D_{INT}$ is 198 nm. The final active content of compound 102 is 20 wt %, based on the total weight of the emulsion.

Example A8

For the preparation of a stable oil/water emulsion 40 g of compound 102 are dissolved in 40 g of Mix I, 3.2 g stearyl methacrylate (SMA) and 0.06 g dodecyl mercaptane (DDM). The oil phase is added dropwise to a stirred solution of 10.3 g Disponil® FES 32 IS (31 wt % active, Cognis Deutschland GmbH&Co.KG) in 110 g deionised water. After stirring for 30 min and ultrasonically converting a kinetically stable emulsion is obtained with an average droplet size below 250 nm. The emulsion is heated up to 55° C. and the redox initiator (0.2 g ascorbic acid dissolved in 5 g deionised water; 0.81 ml $H_2O_2$ (35%) diluted in 5.0 g deionised water) is subsequently added to the reaction mixture. The reaction mixture is continuously stirred by a mechanical stirrer and is maintained at 55° C. for three hours, then cooled to RT and filtered via a 20 µm filter. The resulting particle size $D_{INT}$ is 198 nm. The final active content of compound 102 is 20 wt %, based on the total weight of the emulsion.

B COATING APPLICATION EXAMPLES

Example B1

Testing of Light Stabilizers in a Clear, Waterborne Penetrating Wood Coating

The test formulation is a commercial waterborne wood coating, which imparts water repellent properties to the coated wood by hydrophobic components (Woodcare QS with propiconazole from Böhme, Switzerland, ~12% solid content). The different UV-absorber products are added to the formulation by stirring for 2 h. The fully formulated paints are evaluated for storage stability at room temperature in closed bottles by rating the homogeneity of the formulation after different time intervals (see Table 1). In addition, the nonaged paints are applied on fir wood panels (one coat with a brush) and tested in accelerated weathering equipment (QUV tester from Q Panel Company: UV-A 340 nm fluorescent lamps; test cycle: 5 h light 58° C., 1 h dark water spray 22° C.).

1 h dark water spray 22° C.). Weathering performance is rated by wood color change compared to the initial color (before exposure) and by start of crack formation with the mean of a microscope.

TABLE 1

Storage tests and weathering results

| No. | % LS (product form on total formulation) | storage stability after 48 h | storage stability after 16 weeks | colour change of coated fir wood panels after QUV accelerated weathering; ΔE versus unexposed sample after 200 h | after 400 h | after 800 h | after 1000 h |
|---|---|---|---|---|---|---|---|
| C1 | no LS | slight separation | slight separation e.t.h.* | 18.5 | — | — | — |
| C2 | 2% LIGNOSTAB 1198 2% Tinuvin 1130 | strong separation | strong separation e.t.h.* | 5.6 | 8.2 | — | — |
| 1 | 2% LIGNOSTAB 1198 5% product of example A5 (20% active UVA) | slight separation | strong separation e.t.h.* | 1.4 | 4.7 | 7.8 | — |
| 2 | 2% LIGNOSTAB 1198 10% product of example A5 (20% active UVA) | slight separation | strong separation e.t.h.* | 2.5 | 1.6 | 6.2 | 6.9 |

*e.t.h.: easy to homogenize; these formulations could be easily re-homogenized by simple shaking or stirring.
C1 and C2 are comparative
Weathering performance is rated according to colour change ΔE* (Din 6174) measured with a spectrophotometer versus the corresponding initial unexposed sample. ΔE* measurement is stopped, when wood graying starts due to lignin degradation.

LIGNOSTAB® 1198 is a commercial sterically hindered amine from Ciba Specialty Chemicals, which is used to prevent lignin degradation in conjunction with UV absorbers.
Tinuvin® 1130 is a commercial UV-absorber from Ciba Specialty Chemicals.

Example B2

Testing of Light Stabilizers in a Clear, Waterborne Film Forming Wood Coating

As test formulation a clear waterborne wood coating based on an acrylic dispersion with the following composition is used (solid content approximately 43% by weight):

| | |
|---|---|
| Neocryl ® XK 90 (from NeoResins) | 91.2 parts |
| Water | 4.7 parts |
| Ethyldiglykol | 3.4 parts |
| Borchigel ® L75 N (from Borchers)/Water (1/1) | 0.4 parts |
| Dehydran ® 1293 (from Cognis) | 0.3 parts |
| Total: | 100.0 parts |

The additives given in Table 2 are added to the formulation under stirring for 2 h. The formulations are applied by brush to fir wood panels. Totally three coats are applied with a drying time of one day between each coat (approximately 100 g/m² per coat). The fully formulated paints are evaluated for storage stability at room temperature in closed bottles by rating the homogeneity of the formulation after different time intervals The coated wood panels are tested in accelerated weathering equipment (QUV tester from Q Panel Company: UV-A 340 nm fluorescent lamps; test cycle: 5 h light 58° C.,

TABLE 2

Storage tests and accelerated weathering results in a clear, film forming acrylic wood coating

| No | % LS (product form on solid content) | storage stability after 6 month | colour change of coated fir wood panels after QUV accelerated weathering; ΔE versus unexposed sample After 400 h | After 800 h | first cracking after |
|---|---|---|---|---|---|
| C1 | no LS | ok | 27.3 | 27.1 | 2000 h |
| C2 | 2% Tin 1130 | ok | 19.0 | 23.0 | 2000 h |
| 1 | 10% product of example A1 (20% UVA) | separation e.t.h.* | 14.9 | 18.4 | >2800 h |
| 2 | 10% product of example A2 (24% UVA) | separation e.t.h.* | 14.3 | 17.2 | 1600 h |
| 3 | 10% product of example A3 (20% UVA) | separation e.t.h.* | 15.2 | 19.0 | >2800 h |
| 4 | 10% product of example A4 (24% UVA) | separation e.t.h.* | 14.8 | 19.7 | >2800 h |

*e.t.h.: easy to homogenize - these formulations can be easily re-homogenized by simple shaking or stirring.
C1 and C2 are comparative.

The results in table 2 demonstrate that the product forms according to the invention show good compatibility and formulation stability combined with in most cases significantly improved weathering performance (prolonged durability).

Example B3

Testing of Light Stabilizers in a Waterborne, Slightly Pigmented Penetrating Wood Coating As coating system a commercially available product from Behr (USA) (Deckplus wood-toned waterproofing wood finish, natural clear) is used. The different UV-absorber products are added to the formulation by stirring for 2 h. The formulations are applied on fir wood panels (one coat) and tested in accelerated weathering equipment (QUV tester from Q Panel Company: UV-A 340 nm fluorescent lamps; test cycle: 5 h light 58° C., 1 h dark water spray 22° C.). Weathering performance is rated visually by extent of wood graying due to lignin degradation. LIGNOSTAB 1198 is additionally used to improve wood stabilization. The tested products did not show any negative influence on storage stability of the formulation.

TABLE 3

Wood graying of Deckplus wood-toned waterproofing wood finish from Behr (solid content around 20%) upon accelerated weathering exposure

| No | % LS (product form on total formulation) | Rating of wood greying after 800 h | after 1200 h |
|---|---|---|---|
| C1 | no LS | strong | strong |
| C2 | 1% LIGNOSTAB 1198 1% Tin 1130 | slight | slight |
| C3 | 1% LIGNOSTAB 1198 2% Tin 1130 | slight | slight |
| C4 | 1% LIGNOSTAB 1198 3% Tin 1130 | slight | slight |
| C5 | 1% LIGNOSTAB 1198 5% Tin 1130 | ok | very slight |

TABLE 3-continued

Wood graying of Deckplus wood-toned waterproofing wood finish from Behr (solid content around 20%) upon accelerated weathering exposure

| No | % LS (product form on total formulation) | Rating of wood greying after 800 h | after 1200 h |
|---|---|---|---|
| 1 | 1% LIGNOSTAB 1198 2.5% product of example A5 (20% active UVA) | ok | very slight |

The product form according to the invention shows improved durability (later start of wood graying) even at much lower treating level (weight %) of the active component in the formulation.

Example B4

Testing of Light Stabilizers in Waterborne 1p and 2p Acrylic/Isocyanate Industrial Coatings The light stabilizer product forms of examples A6, A7 and A8 are tested in comparison to Tinuvin 1130 in a water borne 1-pack acrylic/blocked polyisocyanate and two different water borne 2-pack acrylic/polyisocyanate coating formulations.

Light stabilizers (1% Tin 292 and 2% active UVA, both based on the total binder solid content of the paint system) were added to the fully formulated paints and tested for homogeneous incorporation, shelf stability at room temperature and at 40° C., pot-life (in the case of 2p formulations) and durability (UVCON and CAM 180 exposure).

In case of the 2p formulations, shelf stability is tested in the corresponding formulations without the hardener component. Comparison is always made to the formulation without light stabilizer.

Test Series B4.1: Formulations of Light Stabilizers in Waterborne 1p Formulation (Joncryl-Binder)

TABLE 4.1

| | 1 No LS | 2 Tin 1130 | 3 Product of example A6 | 4 Product of example A7 | 5 Product of example A8 |
|---|---|---|---|---|---|
| Joncryl 8300[1] | 31.2 | 31.2 | 31.2 | 31.2 | 31.2 |
| AMP 90 | 0.3 | 0.3 | 0.3 | 0.3 | 0.3 |
| Byk 022[2] | 0.3 | 0.3 | 0.3 | 0.3 | 0.3 |
| Surfynol 104 S[3] | 0.3 | 0.3 | 0.3 | 0.3 | 0.3 |
| DI water | 5.3 | 5.3 | 5.3 | 5.3 | 5.3 |
| Joncryl 8300 | 47.8 | 47.8 | 47.8 | 47.8 | 47.8 |
| Dowanol TPNB | 3.5 | 3.5 | 3.5 | 3.5 | 3.5 |
| Rhodocoat WT 1000[4] | 11.2 | 11.2 | 11.2 | 11.2 | 11.2 |
| Byk 022 | 0.1 | 0.1 | 0.1 | 0.1 | 0.1 |
| Tinuvin 292[5] | 0.4 | 0.4 | 0.4 | 0.4 | 0.4 |
| Tinuvin 1130 | — | 0.8 | — | — | — |
| Product of example A6 | — | — | 4.2 | — | — |
| Product of example A7 | — | — | — | 4.2 | — |
| Product of example A8 | — | — | — | — | 4.2 |
| Total | 100.4 | 101.2 | 104.6 | 104.6 | 104.6 |

[1]Acrylic dispersion, Johnson Polymers
[2]Defoamer, Byk
[3]Wetting agent, Air Products
[4]Hardener, Rhodia
[5]HALS, Ciba Specialty Chemicals Test Series B4.2: Formulations of Light Stabilizers in Waterborne 2p Formulation (Macrynal-Binder)

TABLE 4.2

| | 1 No LS | 2 Tin 1130 | 3 Product of example A6 | 4 Product of example A7 | 5 Product of example A8 |
|---|---|---|---|---|---|
| Macrynal VSM 6299w[1] | 87.6 | 87.6 | 87.6 | 87.6 | 87.6 |
| Surfynol 104/BG[2] | 1.8 | 1.8 | 1.8 | 1.8 | 1.8 |
| Borchigel LW 44[3] (50% in deionised water) | 0.3 | 0.3 | 0.3 | 0.3 | 0.3 |
| Bayowet FT 248[4] | 0.3 | 0.3 | 0.3 | 0.3 | 0.3 |
| Borchigol LAC 80[5] (10% in butoxyl) | 1.5 | 1.5 | 1.5 | 1.5 | 1.5 |
| Deionized water | 8.5 | 8.5 | 8.5 | 8.5 | 8.5 |
| Tinuvin 292[6] | 0.6 | 0.6 | 0.6 | 0.6 | 0.6 |
| Tinuvin 1130 | — | 1.2 | — | — | — |
| Product of example A6 | — | — | 6.0 | — | — |
| Product of example A7 | — | — | — | 6.0 | — |
| Product of example A8 | — | — | — | — | 6.0 |
| Total base | 100.6 | 101.8 | 106.6 | 106.6 | 106.6 |
| Rhodocoat WT 2104[7] | 8.0 | 8.0 | 8.0 | 8.0 | 8.0 |
| Tolonate HDT-LV2[8] | 18.7 | 18.7 | 18.7 | 18.7 | 18.7 |
| Butoxyl | 6.6 | 6.6 | 6.6 | 6.6 | 6.6 |
| Total hardener | 33.3 | 33.3 | 33.3 | 33.3 | 33.3 |
| Total base + hardener | 133.9 | 135.1 | 139.9 | 139.9 | 139.9 |

[1] Acrylic dispersion, Solutia
[2] Wetting agent, Air Products
[3] Thickener, Borchers
[4] Wetting agent, Borchers
[5] Slipping agent, Borchers
[6] HALS, Ciba Specialty Chemicals
[7] Hardener, Rhodia
[8] Hardener, Rhodia Test Series 4.3: Formulations of Light Stabilizers in Waterborne 2p Formulation (Setalux-Binder)

TABLE 4.3

| | 1 No LS | 2 Tin 1130 | 3 Product of example A6 | 4 Product of example A7 | 5 Product of example A8 |
|---|---|---|---|---|---|
| Setalux 6511 AQ-47[1] | 60.2 | 60.2 | 60.2 | 60.2 | 60.2 |
| Tafigel PUR 60[2] | 0.5 | 0.5 | 0.5 | 0.5 | 0.5 |
| Dehydran 1293[3] | 0.2 | 0.2 | 0.2 | 0.2 | 0.2 |
| Surfynol 104 BG[4] | 1.2 | 1.2 | 1.2 | 1.2 | 1.2 |
| Byk 301[5] | 0.1 | 0.1 | 0.1 | 0.1 | 0.1 |
| Byk 348[6] | 0.1 | 0.1 | 0.1 | 0.1 | 0.1 |
| DI water | 27.2 | 27.2 | 27.2 | 27.2 | 27.2 |
| Setalux 6511 AQ-47 | 4.8 | 4.8 | 4.8 | 4.8 | 4.8 |
| DI water | 5.7 | 5.7 | 5.7 | 5.7 | 5.7 |
| Tinuvin 292[7] | 0.6 | 0.6 | 0.6 | 0.6 | 0.6 |
| Tinuvin 1130 | — | 1.2 | — | — | — |
| Product of example A6 | — | — | 6.0 | — | — |
| Product of example A7 | — | — | — | 6.0 | — |
| Product of example A8 | — | — | — | — | 6.0 |
| Total base | 100.6 | 101.8 | 106.6 | 106.6 | 106.6 |
| Rhodocoat WT 2104[8] | 25.0 | 25.0 | 25.0 | 25.0 | 25.0 |
| Butylacetate | 1.7 | 1.7 | 1.7 | 1.7 | 1.7 |
| Butylglycolacetate | 0.6 | 0.6 | 0.6 | 0.6 | 0.6 |

TABLE 4.3-continued

|  | 1 No LS | 2 Tin 1130 | 3 Product of example A6 | 4 Product of example A7 | 5 Product of example A8 |
|---|---|---|---|---|---|
| Methoxypropylacetate | 3.0 | 3.0 | 3.0 | 3.0 | 3.0 |
| Xylene | 3.0 | 3.0 | 3.0 | 3.0 | 3.0 |
| Total hardener | 33.3 | 33.3 | 33.3 | 33.3 | 33.3 |
| Total base + hardener | 133.9 | 135.1 | 139.9 | 139.9 | 139.9 |

[1] Acrylic dispersion, Akzo Nobel Resins
[2] Thickener, Münzig Chemie
[3] Defoamer, Cognis
[4] Wetting agent, Air Products
[5] Surface tension agent, Byk
[6] Wetting agent, Byk
[7] HALS, Ciba Specialty Chemicals
[8] Hardener, Rhodia In all test series 4.1, 4.2 and 4.3, the product forms of examples A6, A7 and A8 can be easily and uniformly incorporated into the paints by simple mixing, in the same way as the comparative example with Tin 1130. In contrast, compound 102, which is the UVA used in the product forms CG43-0365, CG43-0366 and CG43-0367 as such can not be uniformly incorporated in these formulations.

After 4 weeks of storage at room temperature as well as at 40° C. all test paints including the control without LS showed no signs of incompatibilities (i.e. no decrease or increase of viscosity greater than 20% of the initial value).

Test Series 4.4: Shelf Stability Test of Formulations 4.2, Viscosity of Formulations after 4 Weeks Storage length" are not altered in the presence of the UVA product forms according to examples A6, A8 and A8.

TABLE 4.4 viscosities measured at shear rate 1000 s$^{-1}$

|  | 1 No LS | 2 Tin 1130 | 3 Product of example A6 | 4 Product of example A7 | 5 Product of example A8 |
|---|---|---|---|---|---|
| Initial viscosity [mPas] | 189 | 212 | 163 | 161 | 161 |
| Viscosity after 4 weeks at RT [mPas] | 179 | 210 | 147 | 145 | 148 |
| Viscosity after 4 weeks at 40° C. [mPas] | 188 | 204 | 148 | 160 | 142 |

Test Series 4.5: Shelf Stability Test of Formulations 4.3, Viscosity of Formulations after 4 Weeks Storage

TABLE 4.5 viscosities measured at shear rate 1000 s$^{-1}$

|  | 1 No LS | 2 Tin 1130 | 3 Product of example A6 | 4 Product of example A6 | 5 Product of example A6 |
|---|---|---|---|---|---|
| Initial viscosity [mPas] | 9.5 | 10.6 | 9.4 | 9.5 | 9.3 |
| Viscosity after 4 weeks at RT [mPas] | 9.5 | 10.4 | 9.2 | 9.1 | 9.2 |
| Viscosity after 4 weeks at 40° C. [mPas] | 9.4 | 10.2 | 9.3 | 9.1 | 9.1 |

The paint formulations (without hardener) show no significant viscosity increase on storage (see table 4.4 and 4.5). This demonstrates that the new product forms do not impair the shelf stability of such 2p paint formulations.

Test Series 4.6: Appearance of the Paint Film According to Formulations 4.3.

The general features of the appearance of the cured clear coat in terms of "Distinction Of Image, short and long wave

TABLE 4.6

DFT~40-45 μm

|  | 1 No LS | 2 Tin 1130 | 3 Product of example A6 | 4 Product of example A7 | 5 Product of example A8 |
|---|---|---|---|---|---|
| DOI | 93.6 | 93.4 | 93.5 | 93.9 | 93.5 |
| short wavelength value | 9.2 | 9.6 | 8.0 | 8.6 | 7.4 |
| long wavelength value | 4.3 | 4.9 | 4.3 | 4.6 | 4.2 |

Test Series 4.7: UVCON Durability Test of Formulation Series 4.2

TABLE 4.7a

DFT~40-45 μm, variation of ΔE* upon UVCON exposure

|  | 1 No LS | 2 Tin 1130 | 3 Product of example A6 | 4 Product of example A7 | 5 Product of example A8 |
|---|---|---|---|---|---|
| 500 h UVCON | 21.2 | 8.2 | 1.7 | 1.7 | 1.8 |
| 1000 h UVCON | 24.5 | 8.5 | 2.0 | 2.0 | 1.8 |
| 1500 h UVCON | 25.0 | 10.4 | 3.3 | 3.3 | 2.8 |

TABLE 4.7b

DFT~40-45 μm, variation of 60° gloss upon UVCON exposure

|  | 1 No LS | 2 Tin 1130 | 3 Product of example A6 | 4 Product of example A7 | 5 Product of example A8 |
|---|---|---|---|---|---|
| Initial | 92 | 92 | 91 | 91 | 91 |
| 500 h UVCON | 91 | 92 | 89 | 90 | 90 |
| 1000 h UVCON | 92 | 92 | 91 | 92 | 91 |
| 1500 h UVCON | 81 | 91 | 88 | 91 | 88 |

TABLE 4.7c

DFT ~40-45 μm, variation of ΔE* upon CAM 180 exposure

|  | 1 No LS | 2 Tin 1130 | 3 Product of example A6 | 4 Product of example A7 | 5 Product of example A8 |
|---|---|---|---|---|---|
| 500 h CAM 180 | 2.2 | 0.2 | 0.4 | 0.3 | 0.4 |
| 1000 h CAM 180 | 2.3 | 0.3 | 0.3 | 0.2 | 0.2 |
| 1500 h CAM 180 | 2.9 | 0.5 | 0.2 | 0.1 | 0.2 |
| 2000 h CAM 180 | 3.1 | 0.7 | 0.2 | 0.2 | 0.2 |

TABLE 4.7d

DFT ~40-45 μm, variation of 60° gloss upon CAM 180 exposure

|  | 1 No LS | 2 Tin 1130 | 3 Product of example A6 | 4 Product of example A7 | 5 Product of example A8 |
|---|---|---|---|---|---|
| initial | 92 | 92 | 90 | 92 | 89 |
| 500 h CAM 180 | 92 | 92 | 91 | 92 | 91 |
| 1000 h CAM 180 | 92 | 92 | 91 | 92 | 90 |
| 1500 h CAM 180 | 90 | 92 | 90 | 91 | 89 |
| 2000 h CAM 180 | 89 | 90 | 89 | 90 | 89 |

Test series 4.8: UVCON Durability Test of Formulation Series 4.3.

TABLE 4.8a

DFT ~40-45 μm, variation of ΔE* upon UVCON exposure

|  | 1 No LS | 2 Tin 1130 | 3 Product of example A6 | 4 Product of example A7 | 5 Product of example A8 |
|---|---|---|---|---|---|
| 500 h UVCON | 22.0 | 9.5 | 3.2 | 2.8 | 2.7 |
| 1000 h UVCON | 27.8 | 9.9 | 4.7 | 5.0 | 5.1 |
| 1500 h UVCON | 31.6 | 11.3 | 5.3 | 5.1 | 5.0 |
| 2000 h UVCON | 28.8 | 16.3 | 6.6 | 6.9 | 9.0 |

TABLE 4.8b

DFT ~40-45 μm, variation of 60° gloss upon UVCON exposure

|  | 1 No LS | 2 Tin 1130 | 3 Product of example A6 | 4 Product of example A7 | 5 Product of example A8 |
|---|---|---|---|---|---|
| Initial | 95 | 96 | 96 | 96 | 95 |
| 500 h UVCON | 85 | 96 | 96 | 96 | 94 |
| 1000 h UVCON | 83 | 92 | 91 | 92 | 91 |
| 1500 h UVCON | 75 | 94 | 94 | 94 | 94 |
| 2000 h UVCON | 72 | 96 | 88 | 91 | 94 |

TABLE 4.8c

DFT ~40-45 μm, variation of ΔE* upon CAM 180 exposure

|  | 1 No LS | 2 Tin 1130 | 3 Product of example A6 | 4 Product of example A7 | 5 Product of example A8 |
|---|---|---|---|---|---|
| 500 h CAM 180 | 1.7 | 0.5 | 0.2 | 0.3 | 0.3 |
| 1000 h CAM 180 | 2.4 | 0.9 | 0.1 | 0.1 | 0.3 |
| 1500 h CAM 180 | 1.5 | 0.5 | 0.2 | 0.2 | 0.3 |
| 2000 h CAM 180 | 1.8 | 1.0 | 0.3 | 0.4 | 0.6 |

TABLE 4.8d

DFT ~40-45 μm, variation of 60° gloss upon CAM 180 exposure

|  | 1 No LS | 2 Tin 1130 | 3 Product of example A6 | 4 Product of example A7 | 5 Product of example A8 |
|---|---|---|---|---|---|
| initial | 95 | 96 | 96 | 96 | 94 |
| 500 h CAM 180 | 96 | 96 | 96 | 96 | 92 |
| 1000 h CAM 180 | 95 | 96 | 95 | 96 | 95 |
| 1500 h CAM 180 | 88 | 96 | 95 | 96 | 95 |
| 2000 h CAM 180 | 91 | 96 | 95 | 95 | 94 |

In comparison to the non-stabilized sample and to Tinuvin® 1130 (Tin 1130), the increase of ΔE* upon accelerated exposure is significantly reduced when using the products of examples A6, A7 and A8. Also gloss retention is improved when the paints are stabilized with the product forms according to the instant invention.

C INK JET APPLICATION EXAMPLES

Example C1

A gelatin coat of following composition

| Component: | Amount (per $m^2$) |
|---|---|
| Gelatin | 1200 mg |
| Wetting agent | 100 mg |
| Product of example 1 | 300 mg (active) | is applied over cyan, magenta and yellow step images made on swellable and nanoporous ink jet photo papers using HP 970Cxi, Lexmark Z65, Canon BJC 8200 and Epson Stylus 890 ink jet printers. After drying of the top coat, the overcoated prints are irradiated in an Atlas Ci-35 weathering device and checked for light resistance relative to prints protected by a control coating (no UV absorber). The overcoat containing CGL 362 clearly prevent photo fade of the prints in comparison to the control coating, independent of the ink system or print medium.

D PHOTOGRAPHIC EXAMPLES

Example D1

Incorporation into a Gelatin Layer and Action as UV Absorber

A gelatin coat of the following composition (per $m^2$) is applied in the customary manner to a polyester base. The polymer dispersion of example A1 is incorporated into the gelatin casting solution under gentle mixing (no emulsification step is required)

| Component: | Amount (per $m^2$) |
|---|---|
| Gelatin | 1200 mg |
| Hardener | 40 mg |
| Wetting agent | 100 mg |
| Product of example A1 | 320 mg (active) |

The hardener is potassium salt of 2-hydroxy-4,6-dichloro-1,3,5-triazine. The wetting agent is sodium 4,8-diisobutyl-naphthalene-2-sulfonate.

The gelatin coat is dried at 20° C. for 2 days.

A transparent UV absorbing layer is obtained which is suitable for a photographic recording material, for example as a UV filter coat.

The UV absorption spectrum of the layer is recorded using a Perkin Elmer Lambda 15 spectrophotometer. The wavelength of maximum absorption ($\lambda_{max}$) as well as the optical density at $\lambda_{max}$ ($OD_{max}$) are reported in the table below.

| UV absorber | $\lambda_{max}$ | $OD_{max}$ |
|---|---|---|
| CGL 362 | 355 nm | 1.23 |

Example D2

A polyethylene-coated base material is coated with a gelatin coat comprising silver bromide and magenta coupler (M-9) of the formula

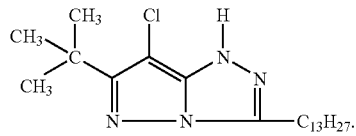

The gelatin coat includes the following components (per $m^2$ of base material):

| Component | AgBr coat |
|---|---|
| Gelatin | 5.15 g |
| Hardener | 300 mg |
| Wetting agent | 85 mg |
| Silver bromide | 260 mg |
| Magenta coupler | 325 mg |
| Tricresyl phosphate | 162 mg |

The hardener used is the potassium salt of 2,4-dichloro-6-hydroxytriazine; the wetting agent used is the sodium salt of diisobutylnaphthalenesulfonic acid.

Step wedges having a density difference of 0.3 log E per step are exposed onto the resulting sample, which is then processed in accordance with the manufacturer's instructions in the P94 processing process of Agfa Gevaert for colour negative papers.

After exposure and processing, the density of reflectance in the green region is measured at a density of between 0.9 and 1.1 of the wedge.

A gelatin layer comprising the product of example A1 is prepared on transparent base material as described in Example 1. A control layer without UV absorber is prepared in the same manner.

Magenta step wedges are subsequently exposed behind the layer containing the product of example A1 and the control layer in an Atlas exposure instrument at 15 kJ/$cm^2$ and the reflectance density is measured again. The magenta dye density loss (−ΔD) is greatly reduced by the CGL 362 layer in comparison with the control layer.

Example D3

A photographic material having the following layer structure is produced:

```
top layer
red-sensitive layer
second gelatine interlayer
green-sensitive layer
first gelatine interlayer
blue-sensitive layer
polyethylene base
```

The gelatin layers consist of the following components (per m² of base material):

Blue-Sensitive Layer
α-(3-benzyl-4-ethoxyhydantoin-1-yl)-α-pivaloyl-2-chloro-5-[α-(2,4-ditamylphenoxy)butanamido]acetanilide (400 mg)
α-(1-butylphenylurazol-4-yl)-α-pivaloyl-5-(3-dodecanesulfonyl-2-methylpropanamido)-2-methoxyacetamide (400 mg)
Dibutyl phthalate (130 mg)
Dinonyl phthalate (130 mg)
Gelatin (1200 mg)
1,5-Dioxa-3-ethyl-3-[β-(3,5-di-t-butyl-4-hydroxyphenyl)propionyloxymethyl]-8,10-diphenyl-9-thia[5.5]spiroundecane (150 mg)
bis(1-acryloyl-2,2,6,6-tetramethyl-4-piperidyl) 2,2-bis(3,5-di-t-butyl-4-hydroxybenzyl)malonate (150 mg)
3,5-di-t-butyl-4-hydroxy(2,4-di-t-amylphenyl)benzoate (150 mg)
poly(N-t-butylacrylamide) (50 mg)
blue-sensitive silver chlorobromide emulsion (240 mg)

First Gelatin Interlayer
gelatin (1000 mg)
2,5-di-t-octylhydroquinone (100 mg)
hexyl 5-[2,5-dihydroxy-4-(4-hexyloxycarbonyl-1,1-dimethylbutyl)phenyl]-5-methylhexanoate (100 mg)
dibutyl phthalate (200 mg)
diisodecyl phthalate (200 mg)

Green-Sensitive Layer
7-chloro-2-{2-[2-(2,4-di-t-amylphenoxy)octanamido]-1-methylethyl}-6-methyl-1H-pyrazolo[1,5-b][1,2,4]triazole (100 mg)
6-t-butyl-7-chloro-3-(3-dodecanesulfonylpropyl)-1H-pyrazolo[5,1-o][1,2,4]triazole (100 mg)
dibutyl phthalate (100 mg)
dicresyl phosphate (100 mg)
trioctyl phosphate (100 mg)
gelatin (1400 mg)
3,3,3',3'-tetramethyl-5,5',6,6'-tetrapropoxy-1,1'-spirobiindane (100 mg)
4-(i-tridecyloxyphenyl)thiomorpholine 1,1-dioxide (100 mg)
4,4'-butylidenebis(3-methyl-6-t-butylphenol) (50 mg)
2,2'-isobutylidenebis(4,6-dimethylphenol) (10 mg)
3,5-dichloro-4-(hexadecyloxycarbonyloxy)ethylbenzoate (20 mg)
3,5-bis[3-(2,4-di-t-amylphenoxy)propylcarbamoyl]sodium benzenesulfinate (20 mg) green-sensitive silver chlorobromide emulsion (150 mg)

Second Gelatin Interlayer
gelatin (1000 mg)
5-chloro-2-(3,5-di-t-butyl-2-hydroxyphenyl)benzo-1,2,3-triazole (200 mg)
2-(3-dodecyl-2-hydroxy-5-methylphenyl)benzo-1,2,3-triazole (200 mg) trinonyl phosphate (300 mg)
2,5-di-t-octylhydroquinone (50 mg)
hexyl 5-[2,5-dihydroxy-4-(4-hexyloxycarbonyl-1,1-dimethylbutyl)phenyl]-5-methylhexanoate (50 mg)

Red-Sensitive Layer
2-[α-(2,4-di-t-amylphenoxy)butanamido]-4,6-di-chloro-5-ethylphenol (150 mg)
2,4-dichloro-3-ethyl-6-hexadecanamidophenol (150 mg)
4-chloro-2-(1,2,3,4,5-pentafluorobenzamido)-5-[2-(2,4-di-t-amylphenoxy)-3-methylbutanamido]phenol (100 mg)
dioctyl phthalate (100 mg)
dicyclohexyl phthalate (100 mg)
gelatin (1200 mg)
5-chloro-2-(3,5-di-t-butyl-2-hydroxyphenyl)benzo-1,2,3-triazole (100 mg)
2-(3-dodecyl-2-hydroxy-5-methylphenyl)benzo-1,2,3-triazole (100 mg)
3,5-di-t-butyl-4-hydroxy(2,4-di-t-amylphenyl)benzoate (50 mg) poly(N-t-butylacrylamide) (300 mg)
N,N-diethyl-2,4-di-t-amylphenoxyacetamide (100 mg)
2,5-di-t-octylhydroquinone (50 mg)
red-sensitive silver chlorobromide emulsion (200 mg)

The topmost layer is prepared with and without UV absorber;

With UV Absorber:
2,5-di-t-octylhydroquinone (20 mg)
hexyl 5-[2,5-dihydroxy-4-(4-hexyloxycarbonyl-1,1-dimethylbutyl)phenyl]-5-methylhexanoate (20 mg)
gelatin (400 mg)
trinonyl phosphate (120 mg)
UV absorber: product of example A1 (385 mg active)

Without UV Absorber:
gelatin (800 mg)
The hardener used is 2,4-dichloro-6-hydroxytriazine K salt solution, the wetting agent is the sodium salt of diisobutylnaphthalenesulfonic acid.

Three step wedges with a density difference of 0.3 log E per step are exposed onto each of the samples (with blue, green and red light, respectively). Then the processing process RA-4 (Kodak) for colour papers is carried out.

After exposure and processing, the reflectance densities in the red for the cyan step, in the green for the magenta step and in the blue for the yellow step are measured at a density of between 0.9 and 1.1 of the wedges. The wedges are then exposed in an Atlas exposure instrument at a total of 15 kJ/cm², and the reflectance densities are measured again.

In the case of the magenta wedge as well, the reflectance density before and after exposure is measured in the blue for the yellowing.

The presence of the product of example A1 reduces the dye density loss of the cyan, magenta and yellow image dye.

The invention claimed is:

1. A concentrated aqueous polymer dispersion of particles with an average particle size of less than 1000 nm said particles comprising
    a) a polymer carrier prepared by heterophase oil in water radical polymerization of at least one ethylenically unsaturated monomer selected from the group consisting of $C_1$-$C_{18}$acrylates, $C_1$-$C_{18}$methacrylates, acrylic acid, (meth)acrylic acid, styrene, vinyltoluene, hydroxy-functional acrylates, hydroxy-functional (meth)acrylates, acrylates derived from alkoxylated alcohols, (meth)acrylates derived from alkoxylated alcohols, multifunctional acrylates and multifunctional (meth)acrylates in the presence of
    b) a non-polar organic light stabilizer, 1 wherein the non-polar organic light stabilizer has a water solubility of less than 1% by weight at room temperature and atmospheric pressure,
wherein the weight ratio of non-polar organic light stabilizer to polymer carrier is greater than 100 parts of light stabilizer per 100 parts of carrier and particle content of the aqueous polymer dispersion is more than 20% by weight based on the total weight of the aqueous polymer dispersion.

2. A concentrated aqueous polymer dispersion according to claim 1 comprising additionally a non-ionic, cationic or anionic surfactant.

3. A concentrated aqueous polymer dispersion according to claim 1 wherein the weight ratio of non-polar organic light stabilizer to polymer carrier is equal or greater than 120 parts per 100 parts.

4. A concentrated aqueous polymer dispersion according to claim 1 wherein the average particle size is less than 500 nm.

5. A concentrated aqueous polymer dispersion according to claim 1 wherein the non-polar organic light stabilizer is selected from the group consisting of a hydroxyphenyl benzotriazol UV-absorber, a hydroxyphenyl triazine UV-absorber, a hydroxybenzophenone UV-absorber, an oxalic anilide UV-absorber and a sterically hindered amine light stabilizer or mixtures thereof.

6. A concentrated aqueous polymer dispersion according to claim 5 wherein the hydroxybenzophenone is of formula I

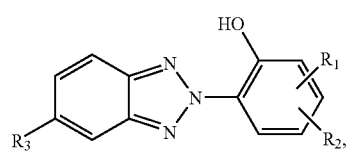

the 2-hydroxyphenylbenzotriazole is of formula IIa, IIb or IIc

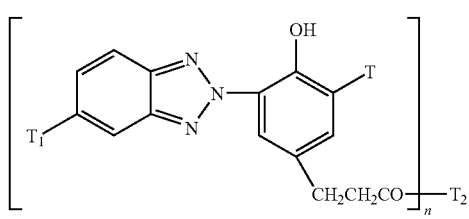

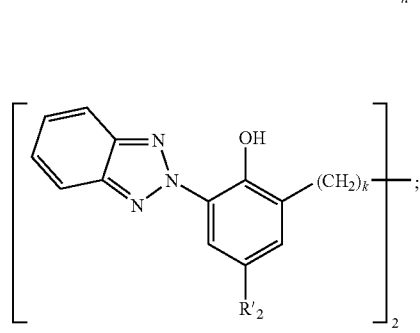

the 2-hydroxyphenyltriazine is of formula III

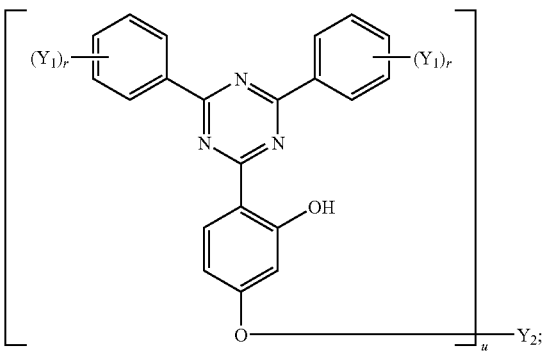

and the oxanilide is of formula (IV)

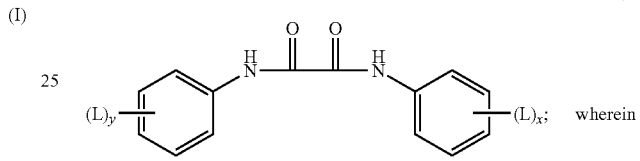

wherein in the compounds of the formula (I) v is an integer from 1 to 3 and w is 1 or 2 and the substituents Z independently of one another are hydrogen, halogen, hydroxyl or alkoxy having 1 to 12 carbon atoms;

in the compounds of the formula (IIa), $R_1$ is hydrogen, alkyl having 1 to 24 carbon atoms, phenylalkyl having 1 to 4 carbon atoms in the alkyl moiety, cycloalkyl having 5 to 8 carbon atoms or a radical of the formula

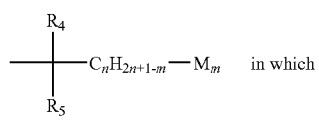

$R_4$ and $R_5$ independently of one another are alkyl having in each case 1 to 5 carbon atoms, or $R_4$, together with the radical $C_nH_{2n+1-m}$, forms a cycloalkyl radical having 5 to 12 carbon atoms, m is 1 or 2, n is an integer from 2 to 20 and M is a radical of the formula —$COOR_6$ in which $R_6$ is hydrogen, alkyl having 1 to 12 carbon atoms, alkoxyalkyl having in each case 1 to 20 carbon atoms in the alkyl moiety and in the alkoxy moiety or phenylalkyl having 1 to 4 carbon atoms in the alkyl moiety, $R_2$ is hydrogen, halogen, alkyl having 1 to 18 carbon atoms, and phenylalkyl having 1 to 4 carbon atoms in the alkyl moiety, and $R_3$ is hydrogen, chlorine, alkyl or alkoxy having in each case 1 to 4 carbon atoms or —$COOR_6$ in which $R_6$ is as defined above, at least one of the radicals $R_1$ and $R_2$ being other than hydrogen;

in the compounds of the formula (IIb)

T is hydrogen or alkyl having 1 to 6 carbon atoms, $T_1$ is hydrogen, chlorine or alkyl or alkoxy having in each case 1 to 4 carbon atoms, n is 1 or 2 and,
if n is 1,
$T_2$ is chlorine or a radical of the formula —$OT_3$ or

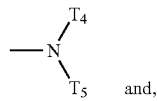

and, if n is 2, $T_2$ is a radical of the formula

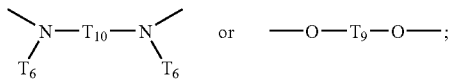

in which
$T_3$ is hydrogen, alkyl which has 1 to 18 carbon atoms and is unsubstituted or substituted by 1 to 3 hydroxyl groups or by —$OCOT_6$, alkyl which has 3 to 18 carbon atoms, is interrupted once or several times by —O— or —$NT_6$- and is unsubstituted or substituted by hydroxyl or —$OCOT_6$, cycloalkyl which has 5 to 12 carbon atoms and is unsubstituted or substituted by hydroxyl and/or alkyl having 1 to 4 carbon atoms, alkenyl which has 2 to 18 carbon atoms and is unsubstituted or substituted by hydroxyl, phenylalkyl having 1 to 4 carbon atoms in the alkyl moiety, or a radical of the formula —$CH_2CH(OH)$-$T_7$ or 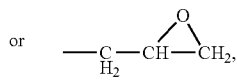

$T_4$ and $T_5$ independently of one another are hydrogen, alkyl having 1 to 18 carbon atoms, alkyl which has 3 to 18 carbon atoms and is interrupted once or several times by —O— or —$NT_6$-, cycloalkyl having 5 to 12 carbon atoms, phenyl, phenyl which is substituted by alkyl having 1 to 4 carbon atoms, alkenyl having 3 to 8 carbon atoms, phenylalkyl having 1 to 4 carbon atoms in the alkyl moiety or hydroxyalkyl having 2 to 4 carbon atoms,
$T_6$ is hydrogen, alkyl having 1 to 18 carbon atoms, cycloalkyl having 5 to 12 carbon atoms, alkenyl having 3 to 8 carbon atoms, phenyl, phenyl which is substituted by alkyl having 1 to 4 carbon atoms, phenylalkyl having 1 to 4 carbon atoms in the alkyl moiety,
$T_7$ is hydrogen, alkyl having 1 to 18 carbon atoms, phenyl which is unsubstituted or substituted by hydroxyl, phenylalkyl having 1 to 4 carbon atoms in the alkyl moiety, or —$CH_2OT_8$,
$T_8$ is alkyl having 1 to 18 carbon atoms, alkenyl having 3 to 8 carbon atoms, cycloalkyl having 5 to 10 carbon atoms, phenyl, phenyl which is substituted by alkyl having 1 to 4 carbon atoms, or phenylalkyl having 1 to 4 carbon atoms in the alkyl moiety,
$T_9$ is alkylene having 2 to 8 carbon atoms, alkenylene having 4 to 8 carbon atoms, alkynylene having 4 carbon atoms, cycloheylene, alkylene which has 2 to 8 carbon atoms and is interrupted once or several times by —O—, or a radical of the formula —$CH_2CH(OH)CH_2OT_{11}OCH_2CH(OH)CH_2$— or —$CH_2$—$C(CH_2OH)_2$—$CH_2$—,
$T_{10}$ is alkylene which has 2 to 20 carbon atoms and can be interrupted once or several times by —O—, or cyclohexylene,
$T_{11}$ is alkylene having 2 to 8 carbon atoms, alkylene which has 2 to 18 carbon atoms and is interrupted once or several times by —O—, 1,3-cyclohexylene, 1,4-cyclohexylene, 1,3-phenylene or 1,4-phenylene, or
$T_{10}$ and $T_6$, together with the two nitrogen atoms, are a piperazine ring;
in the compounds of formula (IIc)
$R'_2$ is $C_1$-$C_{12}$alkyl and k is a number from 1 to 4
in the compounds of the formula (III)
u is 1 or 2 and r is an integer from 1 to 3, the substituents $Y_1$ independently of one another are hydrogen, hydroxyl, phenyl or halogen, halogenomethyl, alkyl having 1 to 12 carbon atoms, alkoxy having 1 to 18 carbon atoms, alkoxy having 1 to 18 carbon atoms which is substituted by a group —$COO(C_1$-$C_{18}$alkyl);
if u is 1,
$Y_2$ is alkyl having 1 to 18 carbon atoms, phenyl which is unsubstituted or substituted by hydroxyl, halogen, alkyl or alkoxy having 1 to 18 carbon atoms;
alkyl which has 1 to 12 carbon atoms and is substituted by —COOH, —$COOY_8$, —$CONH_2$, —$CONHY_9$, —$CONY_9Y_{10}$, —$NH_2$, —$NHY_9$, —$NY_9Y_{10}$, —NH-$COY_{11}$, —CN and/or —$OCOY_{11}$;
alkyl which has 4 to 20 carbon atoms, is interrupted by one or more oxygen atoms and is unsubstituted or substituted by hydroxyl or alkoxy having 1 to 12 carbon atoms, alkenyl having 3 to 6 carbon atoms, glycidyl, cyclohexyl which is unsubstituted or substituted by hydroxyl, alkyl having 1 to 4 carbon atoms and/or —$OCOY_{11}$, phenylalkyl which has 1 to 5 carbon atoms in the alkyl moiety and is unsubstituted or substituted by hydroxyl, chlorine and/or methyl, —$COY_{12}$ or —$SO_2Y_{13}$, or,
if u is 2,
$Y_2$ is alkylene having 2 to 16 carbon atoms, alkenylene having 4 to 12 carbon atoms, xylylene, alkylene which has 3 to 20 carbon atoms, is interrupted by one or more —O— atoms and/or is substituted by hydroxyl, —$CH_2CH(OH)CH_2$—O—$Y_{15}$—$OCH_2CH(OH)CH_2$, —CO—$Y_{16}$—CO—, —CO—NH—$Y_{17}$—NH—CO— or —$(CH_2)_m$—$CO_2$—$Y_{16}$—OCO—$(CH_2)_m$, in which m is 1, 2 or 3,
$Y_8$ is alkyl having 1 to 18 carbon atoms, alkenyl having 3 to 18 carbon atoms, alkyl which has 3 to 20 carbon atoms, is interrupted by one or more oxygen or sulfur atoms or —$NT_6$- and/or is substituted by hydroxyl, alkyl which has 1 to 4 carbon atoms and is substituted by —P(O)$(OY_{14})_2$, —$NY_9Y_{10}$ or —$OCOY_{11}$ and/or hydroxyl, alkenyl having 3 to 18 carbon atoms, glycidyl, or phenylalkyl having 1 to 5 carbon atoms in the alkyl moiety,
$Y_9$ and $Y_{10}$ independently of one another are alkyl having 1 to 12 carbon atoms, alkoxyalkyl having 3 to 12 carbon atoms, dialkylaminoalkyl having 4 to 16 carbon atoms or cyclohexyl having 5 to 12 carbon atoms, or $Y_9$ and $Y_{10}$ together are alkylene, oxaalkylene or azaalkylene having in each case 3 to 9 carbon atoms,
$Y_{11}$ is alkyl having 1 to 18 carbon atoms, alkenyl having 2 to 18 carbon atoms or phenyl,
$Y_{12}$ is alkyl having 1 to 18 carbon atoms, alkenyl having 2 to 18 carbon atoms, phenyl, alkoxy having 1 to 12 carbon atoms, phenoxy, alkylamino having 1 to 12 carbon atoms or phenylamino,
$Y_{13}$ is alkyl having 1 to 18 carbon atoms, phenyl or alkylphenyl having 1 to 8 carbon atoms in the alkyl radical,
$Y_{14}$ is alkyl having 1 to 12 carbon atoms or phenyl, $Y_{15}$ is alkylene having 2 to 10 carbon atoms, phenylene or a group -phenylene-M-phenylene- in which M is —O—, —S—, —SO$_2$—, —CH$_2$— or —C(CH$_3$)$_2$—, $Y_{16}$ is alkylene, oxaalkylene or thiaalkylene having in each case 2 to 10 carbon atoms, phenylene or alkenylene having 2 to 6 carbon atoms, $Y_{17}$ is alkylene having 2 to 10 carbon atoms, phenylene or alkylphenylene having 1 to 11 carbon atoms in the alkyl moiety, and $Y_{18}$ is alkylene having 2 to 10 carbon atoms or alkylene which has 4 to 20 carbon atoms and is 3 interrupted once or several times by oxygen;

in the compounds of the formula (IV) x is an integer from 1 to 3 and the substituents L independently of one another are hydrogen, alkyl, alkoxy or alkylthio having in each case 1 to 22 carbon atoms, phenoxy or phenylthio.

7. A concentrated aqueous polymer dispersion according to claim 5 wherein the sterically hindered amine is selected from the group consisting of bis(2,2,6,6-tetramethyl-4-piperidyl)sebacate, bis(2,2,6,6-tetramethyl-4-piperidyl)succinate, bis(1,2,2,6,6-pentamethyl-4-piperidyl)sebacate, bis(1-octyloxy-2,2,6,6-tetramethyl-4-piperidyl)sebacate, bis(1,2,2,6,6-pentamethyl-4-piperidyl) n-butyl-3,5-di-tert-butyl-4-hydroxybenzylmalonate, the condensate of 1-(2-hydroxyethyl)-2,2,6,6-tetramethyl-4-hydroxypiperidine and succinic acid, linear or cyclic condensates of N,N'-bis(2,2,6,6-tetramethyl-4-piperidyl)hexamethylenediamine and 4-tert-octylamino-2,6-dichloro-1,3,5-triazine, tris(2,2,6,6-tetramethyl-4-piperidyl)nitrilotriacetate, tetrakis(2,2,6,6-tetramethyl-4-piperidyl)-1,2,3,4-butane-tetracarboxylate, 1,1'-(1,2-ethanediyl)-bis(3,3,5,5-tetramethylpiperazinone), 4-benzoyl-2,2,6,6-tetramethylpiperidine, 4-stearyloxy-2,2,6,6-tetramethylpiperidine, bis(1,2,2,6,6-pentamethylpiperidyl)-2-n-butyl-2-(2-hydroxy-3,5-di-tert-butylbenzyl)malonate, 3-n-octyl-7,7,9,9-tetramethyl-1,3,8-triazaspiro[4.5]decan-2,4-dione, bis(1-octyloxy-2,2,6,6-tetramethylpiperidyl)succinate, linear or cyclic condensates of N,N'-bis-(2,2,6,6-tetramethyl-4-piperidyl)hexamethylenediamine and 4-morpholino-2,6-dichloro-1,3,5-triazine, the condensate of 2-chloro-4,6-bis(4-n-butylamino-2,2,6,6-tetramethylpiperidyl)-1,3,5-triazine and 1,2-bis(3-aminopropylamino)ethane, the condensate of 2-chloro-4,6-di-(4-n-butylamino-1,2,2,6,6-pentamethylpiperidyl)-1,3,5-triazine and 1,2-bis-(3-aminopropylamino)ethane, 8-acetyl-3-dodecyl-7,7,9,9-tetramethyl-1,3,8-triazaspiro[4.5]decane-2,4-dione, 3-dodecyl-1-(2,2,6,6-tetramethyl-4-piperidyl)pyrrolidin-2,5-dione, 3-dodecyl-1-(1,2,2,6,6-pentamethyl-4-piperidyl)pyrrolidine-2,5-dione, a mixture of 4-hexadecyloxy- and 4-stearyloxy-2,2,6,6-tetramethylpiperidine, a condensation product of N,N'-bis(2,2,6,6-tetramethyl-4-piperidyl)hexamethylenediamine and 4-cyclohexylamino-2,6-dichloro-1,3,5-triazine, a condensation product of 1,2-bis(3-aminopropylamino)ethane and 2,4,6-trichloro-1,3,5-triazine as well as 4-butylamino-2,2,6,6-tetramethylpiperidine; N-(2,2,6,6-tetramethyl-4-piperidyl)-n-dodecylsuccinimide, N-(1,2,2,6,6-pentamethyl-4-piperidyl)-n-dodecylsuccinimide, 2-undecyl-7,7,9,9-tetramethyl-1-oxa-3,8-diaza-4-oxo-spiro[4,5]decane, a reaction product of 7,7,9,9-tetramethyl-2-cycloundecyl-1-oxa-3,8-diaza-4-oxospiro [4,5]decane und epichlorohydrin, 1,1-bis(1,2,2,6,6-pentamethyl-4-piperidyloxycarbonyl)-2-(4-methoxyphenyl)ethene, N,N-bisformyl-N,N-bis(2,2,6,6-tetramethyl-4-piperidyl)hexamethylenediamine, diester of 4-methoxy-methylene-malonic acid with 1,2,2,6,6-pentamethyl-4-hydroxypiperidine, poly[methylpropyl-3-oxy-4-(2,2,6,6-tetramethyl-4-piperidyl)]siloxane and reaction product of maleic acid anhydride-α-olefin-copolymer with 2,2,6,6-tetramethyl-4-aminopiperidine, 1,2,2,6,6-pentamethyl-4-aminopiperidine, 2,4-bis[N-(1-cyclohexyloxy-2,2,6,6-tetramethylpiperidine-4-yl)-N-butylamino]-6-(2-hydroxyethyl)amino-1,3,5-triazine, 1-(2-Hydroxy-2-methylpropoxy)-4-octadecanoyloxy-2,2,6,6-tetramethylpiperidine, 5-(2-ethylhexanoyl)oxymethyl-3,3,5-trimethyl-2-morpholinone or a compound

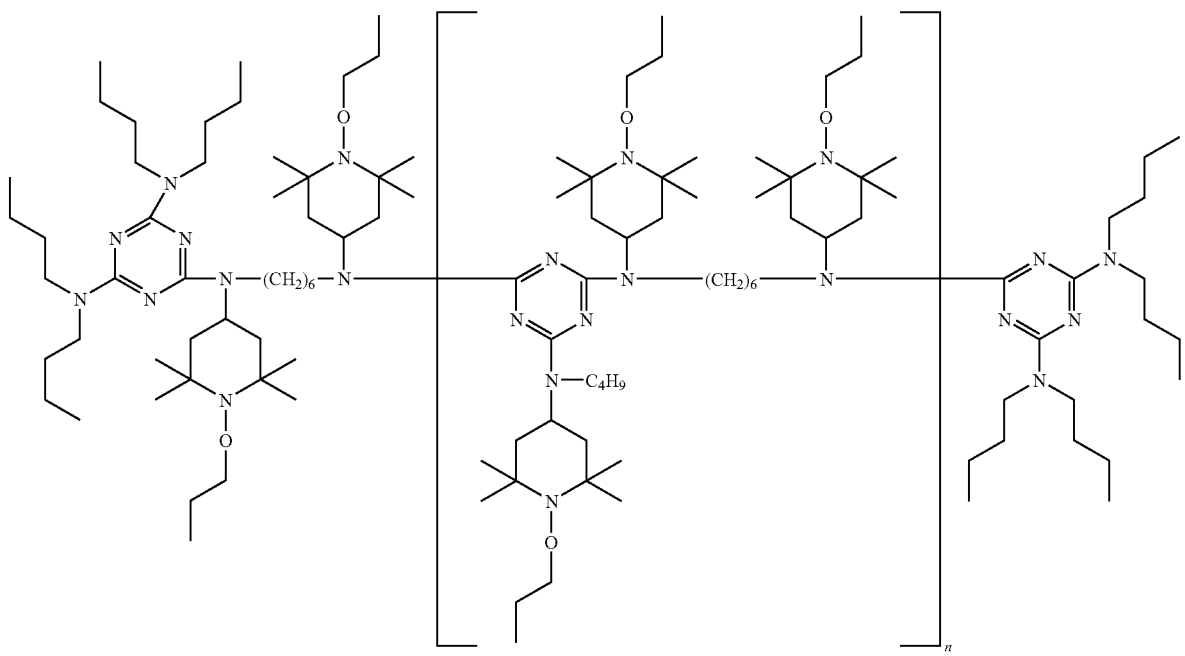

in which n is from 1 to 15.

8. A process for the preparation of a concentrated aqueous polymer dispersion with an average particle size of less than 1000 nm comprising the step of polymerizing at least one ethylenically unsaturated monomer in the presence of a non-polar organic light stabilizer by heterophase radical polymerization;
wherein the weight ratio of non-polar organic light stabilizer to polymer carrier formed from the ethylenically unsaturated monomer is greater than 100 parts of light stabilizer per 100 parts of polymer carrier.

9. A process according to claim 8 comprising the steps of
 a) dissolving, emulsifying or dispersing a non-polar organic light stabilizer in at least one ethylenically unsaturated monomer;
 b) preparing a conventional oil in water emulsion of said light stabilizer dissolved, emulsified or dispersed in at least one ethylenically unsaturated monomer;
 c) homogenizing the conventional emulsion to a miniemulsion wherein the droplets of the organic phase have an average diameter below 1000 nm
 d) polymerizing the miniemulsion by adding a polymerization initiator;
wherein the weight ratio of non-polar organic light stabilizer to polymer carrier formed from the ethylenically unsaturated monomer is greater than 100 parts of light stabilizer per 100 parts of polymer carrier.

10. A polymer powder obtained by vaporizing the volatile components of the concentrated aqueous polymer dispersion according to claim 1.

11. A composition stabilized against thermal, oxidative or light-induced degradation which comprises,
 (a) an organic material susceptible to thermal, oxidative or light induced degradation, and
 (b) a concentrated aqueous polymer dispersion according to claim 1.

12. A composition according to claim 11 wherein the amount of component b) is from 0.1 to 40% by weight based on the weight of the solid content of component a).

13. A composition according to claim 11 wherein the organic material is a recording material.

14. A composition according to claim 13 wherein the recording material is a photographic material or an ink jet material.

15. A composition according to claim 13 wherein the recording material is a printed material containing the concentrated aqueous polymer dispersion in an overprint varnish.

16. A composition according to claim 11 wherein the organic material (a) is an adhesive, an aqueous emulsion of a natural or synthetic rubber, a water based ink or a water based coating.

17. A powder coating composition stabilized against thermal, oxidative or light-induced degradation comprising
 a) a solid binder material; and
 b) a polymer powder according to claim 10.

18. A composition stabilized against thermal, oxidative or light-induced degradation comprising
 a) a thermoplastic polymer and
 b) a polymer powder according to claim 10.

19. A method of stabilizing an organic material susceptible to thermal, oxidative or light induced degradation, which comprises incorporating therein a stabilizingly effective amount of a concentrated aqueous polymer dispersion according to claim 1.

20. A method of stabilizing a powder coating against thermal, oxidative or light-induced degradation, which comprises incorporating therein a stabilizingly effective amount of a polymer powder according to claim 10.

21. A concentrated aqueous polymer dispersion according to claim 1 wherein the dispersion contains 20% by weight or more of the light stabilizer b) based on the total weight of the dispersion.

* * * * *